US008047916B2

(12) United States Patent
Seelig et al.

(10) Patent No.: US 8,047,916 B2
(45) Date of Patent: Nov. 1, 2011

(54) GAMING DISPLAY FLEXIBLE BELT SYSTEM AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 951 days.

(21) Appl. No.: 12/020,501

(22) Filed: Jan. 25, 2008

(65) Prior Publication Data

US 2008/0188284 A1 Aug. 7, 2008

Related U.S. Application Data

(63) Continuation-in-part of application No. 11/848,817, filed on Aug. 31, 2007.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2011.01) |

(52) U.S. Cl. ................ 463/31; 463/20; 463/30; 463/32; 463/46; 463/47

(58) Field of Classification Search ........................ None
See application file for complete search history.

(56) References Cited

U.S. PATENT DOCUMENTS

| | | | | |
|---|---|---|---|---|
| 4,448,419 | A | 5/1984 | Telnaes | |
| 5,018,289 | A * | 5/1991 | Gelman | 40/472 |
| 5,456,465 | A | 10/1995 | Durham | |
| 5,752,881 | A * | 5/1998 | Inoue | 463/20 |
| 5,788,573 | A | 8/1998 | Baerlocher et al. | |
| 5,823,874 | A | 10/1998 | Adams | |
| 6,309,300 | B1 | 10/2001 | Glavich | |
| 6,336,863 | B1 | 1/2002 | Baerlocher et al. | |
| 6,364,314 | B1 * | 4/2002 | Canterbury | 273/274 |
| 6,439,995 | B1 | 8/2002 | Hughs-Baird et al. | |
| 7,311,604 | B2 * | 12/2007 | Kaminkow et al. | 463/20 |
| 7,465,226 | B2 * | 12/2008 | Ikeya et al. | 463/16 |
| 2006/0046830 | A1 * | 3/2006 | Webb | 463/20 |

* cited by examiner

*Primary Examiner* — David L Lewis
*Assistant Examiner* — Christine Liao
(74) *Attorney, Agent, or Firm* — Ian F. Burns & Associates, P.C.

(57) ABSTRACT

A gaming apparatus has several primary gaming devices. Each of the primary gaming devices is configured to accept a wager and to generate a bonus qualifying event. A central display device is mounted in association with the primary gaming devices. The central display device has several flexible belt displays having indicia thereon. A controller is in communication with the gaming devices and the central display device. The controller is configured to detect the bonus qualifying event and to position the flexible belt displays such that at least one of the indicia appearing on the flexible belt displays convey a game outcome. A gaming method using the gaming apparatus is also disclosed.

19 Claims, 46 Drawing Sheets

GAMING DISPLAY FLEXIBLE BELT SYSTEM AND METHOD

CROSS REFERENCE TO RELATED PATENT APPLICATIONS

This application is a continuation-in-part application of U.S. patent application having Ser. No. 11/848,837, filed Aug. 31, 2007, and entitled "Gaming Display with Moveable Indicator and Methods of Use.

This application also claims priority to U.S. provisional patent application having Ser. No. 60/887,990, filed Feb. 2, 2007, and entitled "Gaming Display with Movable Indicator and Methods of Use". The contents of the foregoing applications are herein incorporated by reference in entirety.

FIELD OF THE INVENTION

The present invention relates to gaming devices and, more particularly, to a gaming device having at least one moveable indicator that indicates a prize to a player.

BACKGROUND

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number (hereinafter, both types are referred to as a "random number").

The random number can be used to determine a game outcome. For example, the random number may then be compared to a predefined table to determine a corresponding outcome of the event. If the random number falls within a certain range of numbers on the table, the player may win the corresponding predefined prize. The table may also contain display information that allows the gaming device to generate a display that corresponds to the outcome of the game. The gaming device may present the outcome of the game on a large variety of display devices, such as mechanical spinning reels or video screens.

Some gaming devices award bonus prizes in addition to prizes that are awarded in a primary game. Of course, the prize in the primary game may simply be the opportunity to play the bonus game. A bonus prize is generally defined as a prize in addition to the prize obtained from the primary game and that is awarded to the player when a predefined event occurs. An example of a bonus game can be found in U.S. Pat. No. 5,848,932 to Adams. Adams discloses a primary game having three spinning game reels and a bonus game having a bonus display with one spinning wheel. The spinning wheel is divided into multiple sections, and each section has a symbol representing a prize. When predetermined indicia are displayed on the spinning game reels of the primary game, the wheel of the bonus display spins and stops. The bonus prize is displayed as the symbol on the wheel being pointed to by a pointer. The bonus prize is awarded in addition to any prizes awarded in the primary game. Another bonus game is disclosed in Baerlocher et al. (U.S. Pat. No. 6,336,863). Baerlocher et al. discloses a slot machine with a bonus award display. The bonus award display has a bonus wheel and a mechanical, movable pointer.

One of the problems associated with the devices disclosed in these references is that the outcome of the bonus game is communicated to the player almost immediately. When a bonus game is triggered, a bonus award is selected, displayed, and awarded to the player. The player can see what the outcome of the game is immediately after the pointers have stopped moving. What has long been needed is a device that utilizes intermediate steps between the occurrence of the bonus event and the awarding of the bonus prize to add an additional element of anticipation and excitement for the players. It is further desired that the intermediate steps involve an eye-catching display. Another problem associated with Adams and Baerlocher et al. is that they utilize a plain combination of wheel and pointer. The Applicants have discovered more things that can be done to display devices to make them more attractive and interesting to play.

Generally, bonus prizes are awarded in order to increase the excitement and enjoyment experienced by players, which attracts more players to the game and encourages players to play longer. When this occurs, the gaming devices tend to be more commercially successful relative to other gaming devices. A shortcoming of present bonus games is that they do not sufficiently allow players to interact with the gaming device, including during bonus games.

Other attempts have been made to provide player interaction. U.S. Pat. No. 5,788,573 to Baerlocher et al. (hereinafter, "Baerlocher") purports to suggest a gaming device with an electronic "wheel of fortune game." Several flippers appear to indicate positions on the wheel. Baerlocher appears to suggest that the player may be allowed to choose which flipper is used to select an indicia on the wheel. However, the player does not appear to have any control over the position of the flipper and the flippers do not appear to be capable of moving to different positions.

U.S. Pat. No. 6,309,300 to Glavich (hereinafter, "Glavich") and U.S. Pat. No. 6,439,995 to Hughs-Baird et al. (hereinafter, "Hughs-Baird") purport to suggest a gaming system having a bonus feature where a player may be allowed to select a number of selectable items, which may be prize representations, on a video display. Glavich and Hughs-Baird do not appear to suggest using prize indicators, moveable prize indicators, or allowing a player to position a prize indicator.

SUMMARY

Advantages

The various embodiments of the present invention may, but do not necessarily, achieve one or more of the following advantages:

provide a highly attractive and entertaining device for conducting games;

provide a highly attractive and entertaining device for displaying prizes;

the ability to attract more patrons to play a game;

the ability to encourage players to play longer on a gaming apparatus;

provide at least one attractive prize indicator;

provide a unique combination of reel-type display and moveable indicator;

provide a display for displaying indicia on a first axis and a moveable indicator configured to indicate an indicia from a second axis orthogonal to the first axis;

allow players to control, the movement of a prize indicator;

provide a moving display surface;

provide a moving display with a relatively long path length;

provide a display that allows for a relatively larger number of indicia to be displayed;

provide a display that allows for relatively larger indicia to be displayed;

creates additional suspense for players by increasing the length of time between the start of a game and the display of the game outcome;

allow players to control the movement of a moving display surface;

provide the illusion that the player can influence the outcome of a game;

provide a game that allows for more player interaction;

provide a bonus game display that can viewed from several gaming devices;

provide a community game that can be played by a group of game players;

utilize intermediate steps between the occurrence of the bonus event and the awarding of the bonus prize; and provide an additional element of anticipation and excitement for players.

These and other advantages may be realized by reference to the remaining portions of the specification, claims, and abstract.

BRIEF DESCRIPTION OF CERTAIN ASPECTS OF THE INVENTION

In one embodiment the present invention comprises a gaming apparatus that has several primary gaming devices. Each of the primary gaming devices is configured to accept a wager and to generate a bonus qualifying event. A central display device is mounted in association with the primary gaming devices. The central display device has several flexible belt displays having indicia thereon. A controller is in communication with the gaming devices and the central display device. The controller is configured to detect the bonus qualifying event and to position the flexible belt displays such that at least one of the indicia appearing on the flexible belt displays convey a game outcome.

In another embodiment, the present invention relates to a method of gaming. The method includes playing several games on several gaming devices and determining if a bonus qualifying event has occurred on at least one of the gaming devices. If the bonus qualifying event has occurred, several flexible belt displays are moved. The flexible belt displays are stopped and at least one indicia on at least one of the flexible belt displays is indicated as a game outcome.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Certain embodiments of the invention are shown in the accompanying drawings wherein.

DESCRIPTION OF AT LEAST ONE EMBODIMENT OF THE PRESENT INVENTION

In the following detailed description of at least one embodiment of the present invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1A:
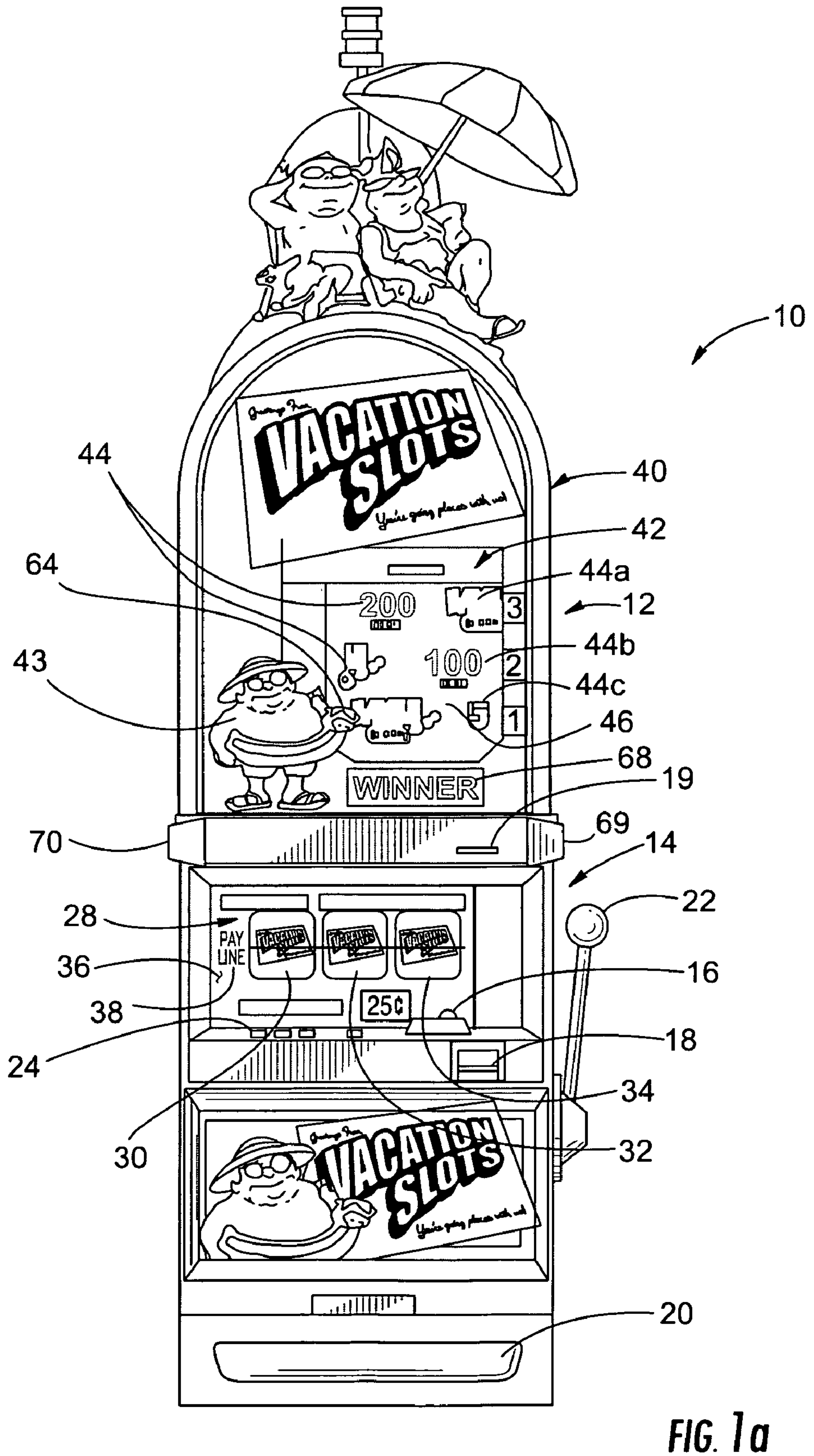
FIG. 1*a* is substantially a front elevation view of an embodiment of the gaming apparatus of the present invention.

As seen in FIG. 1*a*, the present invention comprises a gaming apparatus, generally indicated by reference number 10. In at least one embodiment, gaming apparatus 10 comprises a second display or bonus gaming device 12 and a primary gaming device 14. Gaming device 14 may be any of a large number of devices that are adapted to allow players to play a game, such as gaming devices typically found in arcade and casino environments, including arcade games, video games, gambling machines, video poker machines, slot machines, etc. In at least one embodiment, gaming device 14 is further adapted to allow a player to place a wager and play a game, such as a slot machine.

Gaming device 14 may include a value acceptor for accepting value (including currency and/or currency equivalents), such as a coin slot 16, card reader 18, or a voucher reader 19. In addition, a payout mechanism (not shown) and a coin receptacle 20 may be provided for awarding prizes or for dispensing value to players cashing out and retiring from a game. A printer (not shown) may also be provided for printing out cashless vouchers (not shown). A handle 22 and a button 24 may be provided for activating gaming device 14 to begin a game. A pay table (not shown) may further be provided to allow a player to see what symbol or combination of symbols provide a winning event. In at least one preferred embodiment, gaming device 14 may be a S2000 or S Plus model gaming device manufactured by International Game Technology in Reno, Nev.

Gaming device 14 may further include a gaming outcome display 28 that may be positioned in front of the gaming device 14 so that a player (not shown) playing gaming device 14 can see gaming outcome display 28. Gaming outcome display 28 may utilize physical game reels 30, 32, and 34. Game reels 30, 32, and 34 may be attached to a drive mechanism (not shown) of gaming device 14 to rotate the reels in a manner well known in the art. Each game reel 30, 32, and 34 may have a plurality of symbols positioned on the circumference of each game reel 30, 32, and 34. Game reels 30, 32, and 34 may be positioned side-by-side with coincident axes of rotation and a portion of their individual circumferences may face outward from gaming device 14.

A panel 36 may cover game reels 30, 32, and 34 such that only a portion of their individual circumferences are shown to the player. At least one symbol from any of game reels 30, 32, and 34 may be used to display a game outcome. At least one pay line 38 may be provided for the player to use in determining a game outcome based on the symbol or a combination of symbols positioned thereon. In an alternative embodiment, gaming outcome display 28 utilizes a video display (not shown) displaying images of game reels and an image of at least one pay line. A video display may also display game symbols in many other formats and arrangements, such as playing cards. Of course, the invention is not limited to any particular type of gaming outcome display 28. Those of skill in the art will recognize that many different types of gaming outcome displays could be substituted without departing from the scope of the present invention.

Gaming apparatus 10 may include a second display 12 configured to display at least one game and prize to a player. In at least one embodiment, second display 12 is configured to display a bonus game and at least one bonus prize to the player. In other embodiments, second prize display 12 may provide a primary game. Alternatively, second prize display 12 may be a stand-alone device allowing a player to place a wager and play a game.

In at least one embodiment, second display 12 is attached to gaming device 14 and positioned on top of gaming device 14. In other embodiments (not shown), second display 12 may be separate from gaming device 14 but in communication with gaming device 14. In this embodiment, second display 12 may be in communication with a plurality of different gaming devices 14 via a computer network in a manner that is well known in the art. Second display 12 may also be positioned adjacent to or remote from gaming device 14. In other embodiments, second display 12 is a stand-alone display not in communication with gaming device 14, and it may be capable of independently accepting wagers, conducting games, and awarding prizes to a player.

With continued reference to FIG. 1*a*, second display 12 may comprise a housing 40. Housing 40 may be arc-shaped and comprise a plurality of walls defining an internal space or cavity. Of course, housing 40 may be made in many different shapes. Second display 12 also may have an indicator 43. Indicator 43 may be a variety of indicators, including two and three-dimensional indicators.

Indicator 43 and display device 42 may be positioned within housing 40. Indicator 43 may be configured to move vertically (up and down) relative to second display 12 in response to signals sent either by a controller (not shown) or a combination of an input device (not shown) and a controller (not shown). The number of indicators 43 may vary, and the direction of their movement may vary, and may include horizontal, zigzag, and/or diagonal movements.

The shape or appearance of indicator 43 may be designed in various forms and preferably according to a theme of a game. In the example shown in FIG. 1*a*, the theme of the game is a gaming device that awards players with vacations. Accordingly, indicator 43 is in the form of a vacationing person in a swimming outfit and in a swimming floatation tube. Indicator 43 may include a pointer portion 64. Pointer portion 64 may be configured to point to at least one indicium 44. Alternatively, indicator 43 may itself be a pointer, such as an arrow. The present invention is not limited to any particular type of indicator or pointer, or any particular representation of an indicator or pointer.

Indicia 44 may be affixed, imprinted, engraved, or otherwise represented on a display device 42. Display device 42 may have indicia 44 arranged in rows 44*a-c*. Each row 44*a-c* may include multiple indicia 44. Indicia 44 may represent various things, including prize amounts, multipliers, a description or representation of merchandise or services, progressive prizes, or jackpot prizes. In the embodiment shown in FIG. 1*a*, display device 42 is configured to present moveable indicia 44, which may move in various directions. As shown in FIG. 1*a*, indicia 44 move horizontally, or on a rotational axis parallel to the vertical movement of indicator 43. Of course, indicia 44 could be configured to move up and down, that is, display device 42 may have a horizontal rotational axis.

Certain embodiments of the present invention may provide display devices 42 with indicia 44 moving on a first axis and an indicator 43 moving on a second axis, wherein the moveable indicator 43 is able to indicate an indicia 44 on the display device, which may be configured to move on an axis orthogonal to the axis of indicator 43.

Figure 1B:
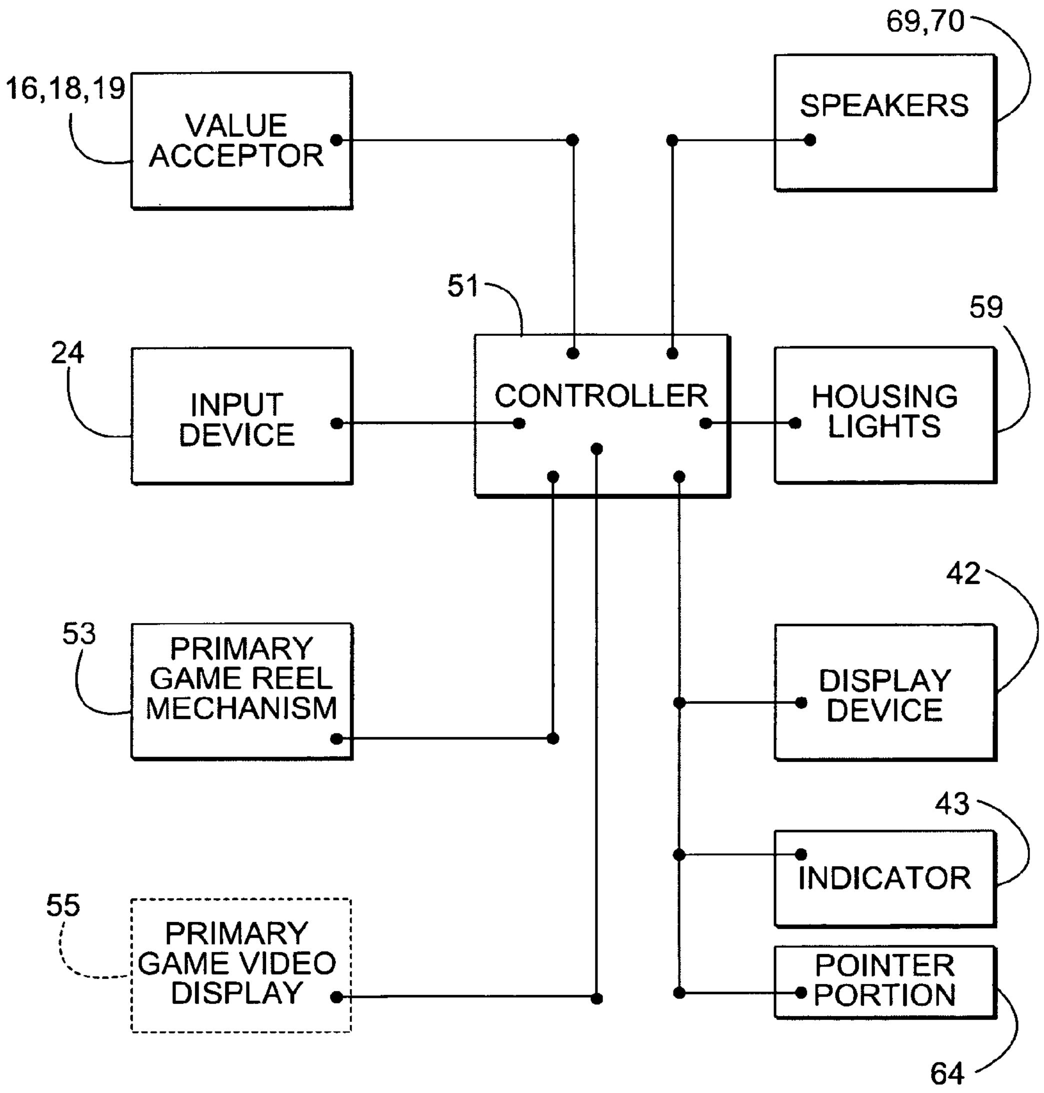
FIG. 1*b* is substantially a schematic diagram showing components of an embodiment of the gaming apparatus.

Referring now to FIG. 1*b*, a schematic diagram of some components that may be included in certain embodiments of gaming apparatus 10 (FIG. 1*a*) is shown. Gaming apparatus 10 may include a value acceptor 16 configured to accept value from the player in the form of paper currency, coins, player cards, tickets, vouchers, tokens, or other forms of value. Value acceptor 16 may be in communication with controller 51. Controller 51 may be in communication with an input device 24. Controller 51 may detect insertion of value into value acceptor 16 and may prompt the player to start a game by activating input device 24. Once controller 51 senses a signal to start the game, controller 51 may be configured to produce a random number and activate reel mechanism 53 of gaming device 14. Reel mechanism 53 may be configured to display indicia (including symbols, characters, numbers, letters, pictures, and the like) on reels 30, 32, and 34 according to the random number generated by controller 51. Alternatively, controller 51 may be configured to produce a random number and activate video display of reels 55 of gaming device 14. The video display of reels 55 may be configured to display indicia in video form according to the random number generated by controller 51. The primary game of gaming device 14, whether in physical form or in video form, is not limited to reel-type games, but may include card games, dominoes, roulette, craps, baccarat, and other games.

Gaming apparatus 10 may further include speakers 69 and 70, housing lights 59, display device 42, indicator 43, and pointer portion 64 in communication with controller 51. Controller 51 may store bonus event information and may have the ability to detect bonus events.

Upon an occurrence of a bonus event, controller 51 may activate speakers 69 and 70, housing lights 59, and display device 42, which causes indicia 44 to move. Controller 51 may cause indicator 43 to move around an area adjacent to display device 42. Controller 51 may then cause indicator 43 to stop, and pointer portion 64 to point to an indicia 44 on display device 42. Housing lights 59 and speakers 69 and 70 together may create a festive and lively winning atmosphere to elicit interest and entertainment from both the player and adjacent patrons.

In at least one embodiment, when gaming apparatus 10 is not in use, indicator 43, housing lights 59, and display speakers 60 may be activated by controller 51 in an attract mode. Housing lights 59 may operate, blink or flash, and indicator 43 may dance or move in a choreographed manner according to music coming from speakers 56. It may be desirable that indicator 43 not point to an indicia 44 at the conclusion of the attract mode in order that players close to gaming device 10 do not mistakenly believe they are entitled to a prize. Controller 51 may activate display device 42 and indicator 43 upon the occurrence of a bonus event.

Figures 2A, 2B:
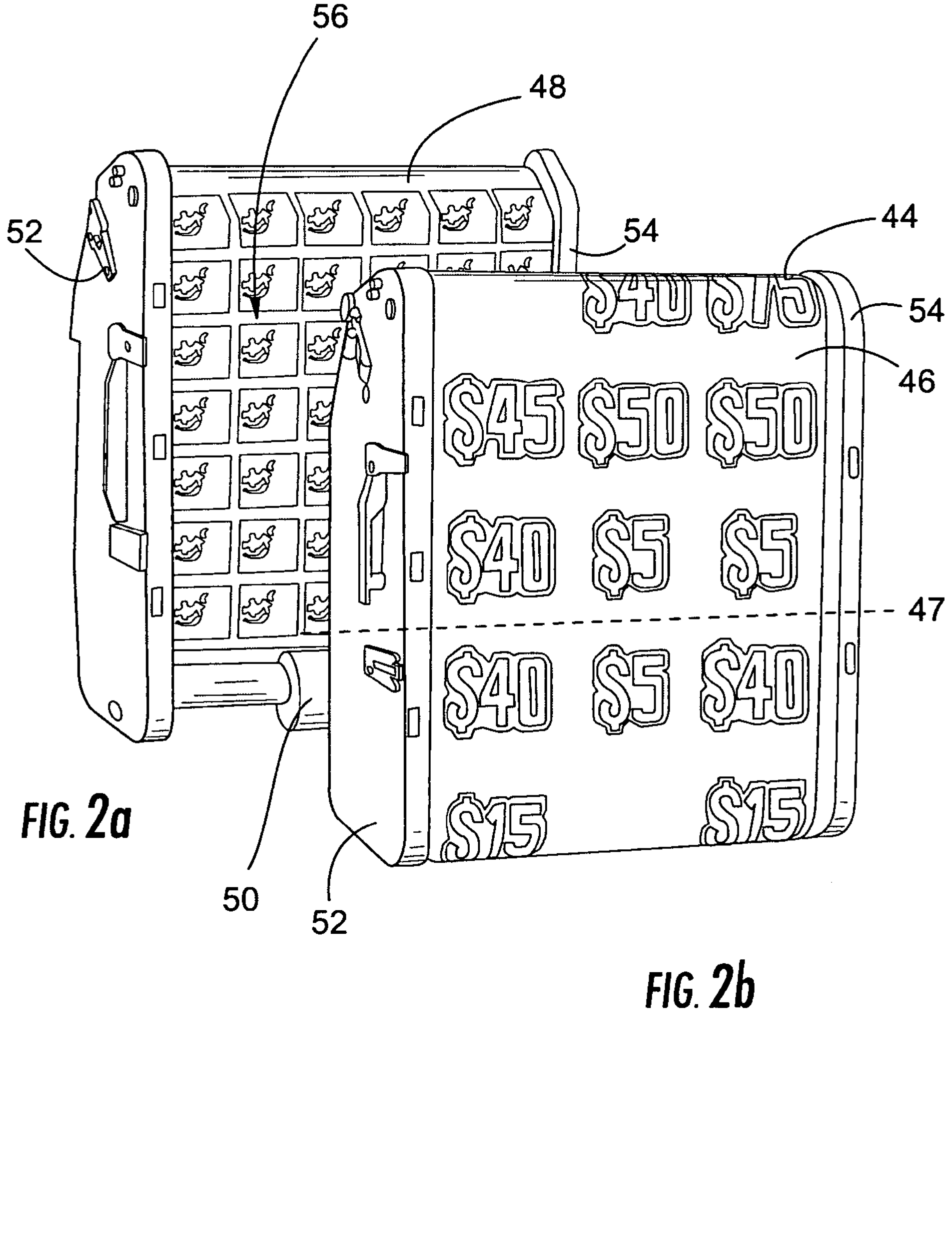
FIG. 2*a* is substantially a partial perspective view of an embodiment of a display device of a prize display.
FIG. 2*b* is substantially a perspective view of the display device shown in FIG. 2*a* with a band on which indicia are affixed.

Referring now to FIGS. 2*a* and 2*b*, in at least one embodiment, display device 42 (FIG. 1*a*) comprises a flat piece of material or band 46 wrapped around a plurality of rollers 48 and 50. Rollers 48 and 50 rotate band 46 about an axis 47. Rollers 48 and 50 may be rotatably connected to chassis 52 and 54 and may be connected to an actuator (not shown). Band 46 has indicia 44 thereon. Indicia 44 may be affixed to band 46 by various methods. Indicia 44 may be imprinted on band 46 in different configurations depending on the desired appearance of indicia 44 when band 46 is presented on second display 12. In the embodiment shown in FIG. 1*a*, band 46 may move from left to right relative to second display 12 or vice-versa. Thus, indicia 44 are displayed in horizontal rows.

In at least one embodiment, a light matrix 56 is positioned behind band 46 to back-light indicia 44. Light matrix 56 may comprise light emitting diodes (LEDs), fluorescent lights, incandescent lights, or other illumination devices that may make band 46 more attractive. A suitable display device 42 may be obtained from Starpoint Electronics Ltd. of Chessington, UK (model FM2).

In another embodiment, display device 42 may comprise at least one conventional reel assembly (not shown). A conventional reel assembly typically includes at least one chassis, an axle attached to the chassis, and a reel attached to the axle. The reel and chassis are typically coupled to an actuator that drives the axle, thereby rotating the reel. The reel typically has a strip of material attached to the circumference of the reel. Indicia are typically affixed to the strip of material by methods known in the art. Conventional reel assemblies may be joined in series, typically in a set of three.

The reel assembly may be positioned within housing 40 (FIG. 1*a*) so that the reel rotates about either a horizontal or vertical axis. Display device 42 may utilize the reel assemblies described in co-pending U.S. application Ser. No. 09/894,197, filed Jul. 27, 2001 and U.S. application Ser. No. 09/968,952, filed Oct. 1, 2001, which are incorporated herein by reference. U.S. application Ser. No. 09/894,197 discloses reel shelf assemblies arranged vertically so that each reel rotates about a vertical axis. U.S. application Ser. No. 09/968,952 discloses reel shelf assemblies having reels that are positioned at an angle relative to each other, side-by-side so that their chassis are away from the two reels positioned adjacent to each other, or combinations thereof.

Figure 3:
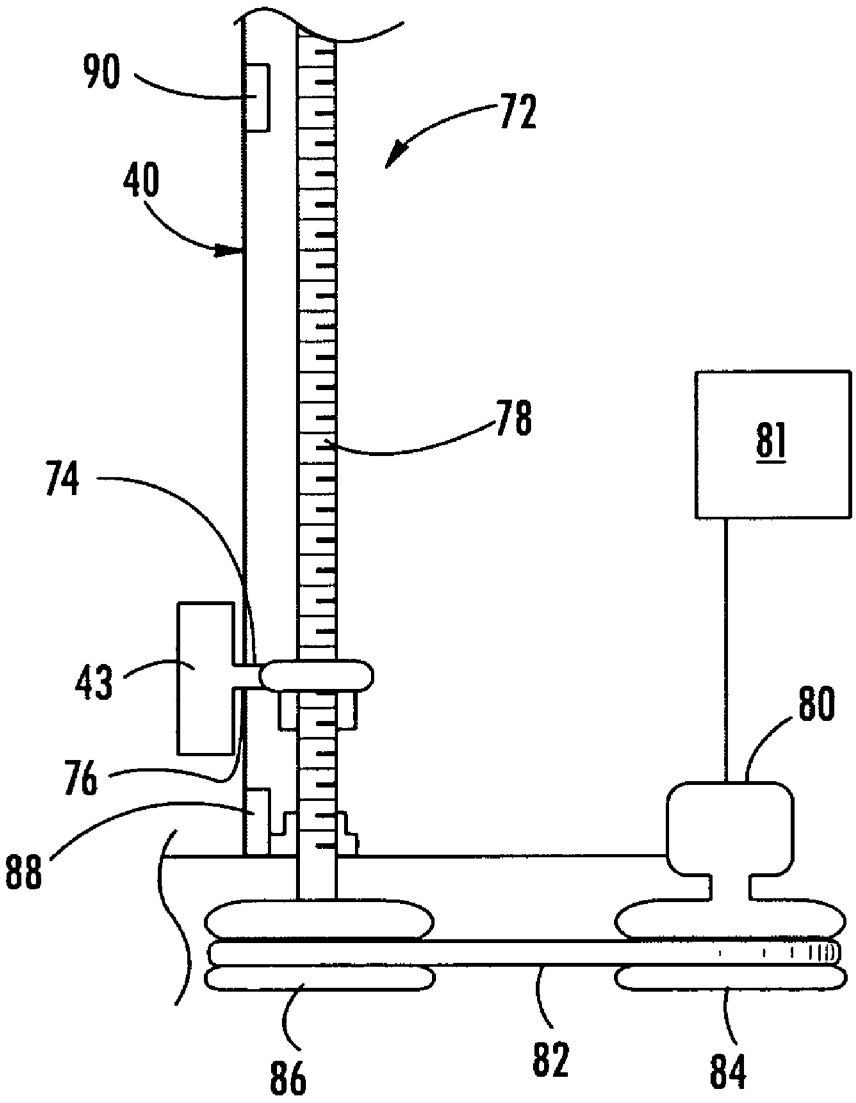
FIG. 3 is substantially a side elevation view of one embodiment of a positioning mechanism of the present invention.

Referring now to FIG. 3, indicator 43 (FIG. 1*a*) may be coupled to a positioning mechanism 72 by a bracket 74. Positioning mechanism 72 may be located within the confines of housing 40. A slot 76 in the front wall of housing 40 may be provided, which allows bracket 74 to pass through the front wall. Positioning mechanism 72 may comprise a worm gear 78 rotatable by an actuator 80. In at least one embodiment, actuator 80 is attached to a first wheel 84. Worm gear 78 may be attached to a second wheel 86. A drive belt 82 preferably rotates around the first wheel 84 and second wheel 86, thereby connecting actuator 80 and worm gear 78. Positioning mechanism 72 may communicate with a controller 81, which may store information regarding pre-determined positions of band 46 of display device 42. Sensors 88 and 90 are preferably in communication with controller 81 and may be provided to allow controller 81 to detect the position of indicator 43. Other devices may be used to detect, the position of indicator 43, such as optical readers and the like.

Figure 4:
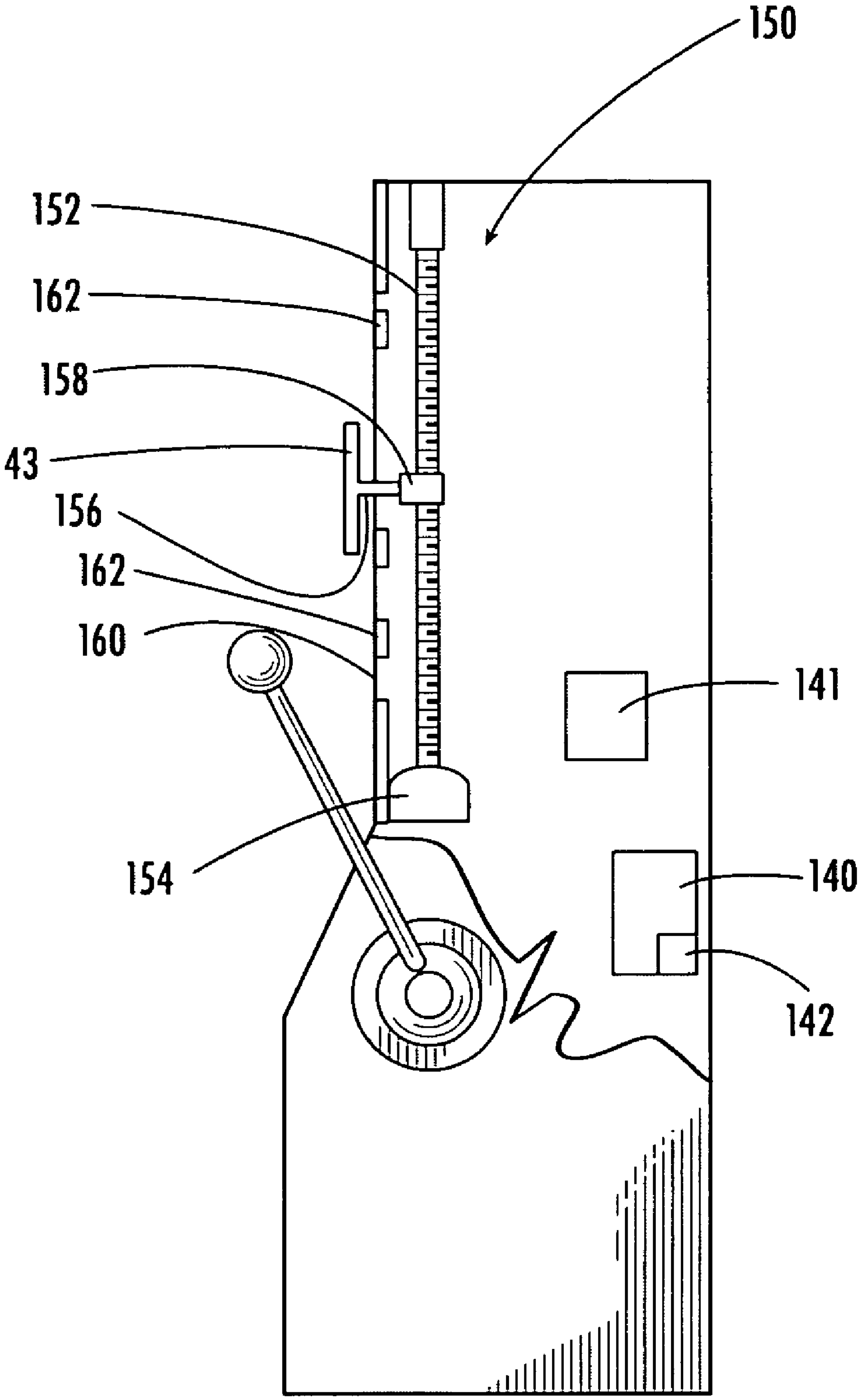
FIG. 4 is substantially a partial cross-sectional view of the gaming apparatus of FIG. 1*a*.

Referring now to FIG. 4, another embodiment of a positioning mechanism 150 is shown. Positioning mechanism 150 may be a vertically positioned worm gear 152 that is caused to rotate by an actuator 154. Indicator 43 may be attached to worm gear 152 by a bracket 156 that is attached to a nut 158 threaded on worm gear 152. A slot 160 may be provided in the front wall of second display 12 (FIG. 1*a*), which allows bracket 156 to pass through the wall. Sensors 162 may be provided to allow controller 140, or other control mechanisms (not shown), to detect the position of indicator 43. While indicator 43 is shown to move vertically in FIG. 4, it may be moved in any desired manner, including horizontally, diagonally, or in a non-linear fashion, such as in a rotating or zigzag manner.

In another embodiment, a wheel (not shown) may be attached to actuator 154. The periphery of the wheel may have at least one notch detectable by a sensor (not shown) and used by a bonus game controller 141 or a game controller 140 to monitor the position of indicator 43. Wheel and worm gear 152 may be rotated together by actuator 154. The sensor monitors the position of indicator 43 by detecting the notch. Bonus game controller 141 or game controller 140 may store information pertaining to the number of times the sensor has detected the notch and the corresponding position of moveable indicator 43. An optical interrupt (not shown) may be provided to reset the indicator position information. The sensor may be an infrared source and detector. In alternative embodiments, the periphery of the wheel may comprise portions with different reflective characteristics, such as absorbent paint lines, instead of a notch on the wheel. Actuators 80 (FIG. 3) and 154 may be a stepper motor, a servo motor, a gear motor, a solenoid, a rack and pinion, or other actuators known in the art.

With continued reference to FIG. 4, an electronic controller 140 that utilizes a random number generator 142 may control gaming device 14 (FIG. 1*a*). Random number generator 142 produces a random or pseudo random number for each game. The outcome of the game may be determined by comparing the random number produced by random number generator 142 to a table of outcomes stored in a memory and accessed by controller 140. A number of different tables of outcomes may be used and different tables may be used for different games. The tables can be designed so that different prizes have different probabilities of being awarded. Such design techniques are well known in gaming and are described above. Examples of such designs are shown in U.S. Pat. No. 4,448,419, issued to Telnaes, and U.S. Pat. No. 5,456,465, issued to Durham, which are hereby incorporated by reference. Controller 140 may cause gaming outcome display 28 (FIG. 1*a*), e.g., game reels 30, 32, and 34, to show the display an outcome that corresponds to the random number generated by random number generator 142. Of course, gaming device 14 may operate in many other ways and still achieve the objects of the present invention.

Gaming device 14 may also be capable, via controller 140 or other control mechanism (not shown), of producing a bonus-activating event. This event may be many different types of events. For example, a bonus-activating event may comprise a game outcome such as displaying a particular symbol, e.g., a "bonus" symbol, or combination of symbols, such as a "7" symbol on each of reels 30, 32, and 34 (FIG. 1*a*). If the game being played is poker based, the bonus-activating event may be an occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result. Sensors (not shown) may be provided external to gaming device 14 to detect external bonus-activating events.

Bonus game controller 141 may further be provided to detect when a bonus activating event occurs in gaming device 14. Gaming device controller 140 may determine the outcome of each game, and when a bonus-activating outcome occurs, gaming device controller 140 may transmit a signal to bonus game controller 141. Alternatively, bonus game controller 141 may periodically interrogate gaming device controller 140. Bonus game controller 141 and gaming device controller 140 may be a single controller or separate controllers. In at least one embodiment, gaming device controller 141 is the GAM 2000 controller, available from Eagle Engineering of Pottstown, Pa.

The bonus prize may be determined by a random number generator (not shown) and a virtual pay table, such as the pay table described in U.S. Pat. No. 5,823,874 to Adams, which is hereby incorporated by reference. A simple pay table may also appear as follows:

TABLE 1

| Random Number | Amount Paid |
|---|---|
| 0.00 to 0.50 | $ 10.00 |
| 0.51 to 0.75 | $ 50.00 |
| 0.76 to 0.95 | X2 |
| 0.96 to 1.00 | $10,000.00 |

For example, if the random number generator produced 0.45 as the game outcome, the controller may cause indicator 43 (FIG. 1*a*) to stop and pointer portion 64 (FIG. 1*a*) to point to an indicia representing ten dollars. Alternatively, if the random number generator produced a value of 0.85, the controller may cause indicator 43 to stop and pointer portion 64 to point to an indicia 44 representing a multiplier of 2. The controller may then cause bonus meter 68 (FIG. 1*a*) to display "10×2=20," (assuming a base prize often dollars) and $20.00 would be awarded to the player.

The bonus selection process may be repeated for a predetermined number of times to accumulate several bonus prizes that are added to form the award to the game player. For example, the bonus game could be repeated three times to accumulate an award. The present invention is not limited to the example pay table shown. Furthermore, different kinds of bonus prizes may be awarded, such as progressive prizes, jackpot prizes, merchandise, services, prize multipliers, and additional games. Other effects may also be presented, such as pre-recorded sound from speakers 69 and 70 (FIG. 1*a*).

Speakers 69 and 70 may be configured to announce a prize a player has won, play music during a prize winning event, announce features of the game offered by gaming apparatus 10, or play music to attract and entertain patrons. Additionally, a variety of graphics and lights, preferably designed according to a particular theme, are displayed on prize display 12 (FIG. 1*a*). If the awarded bonus prize is money, the amount of the bonus prize may be added to the player's credit meter (not shown), may be dispensed to the player via a voucher or other cashless device, may be dispensed to coin receptacle 20 (FIG. 1*a*), or an attendant may be summoned to award the prize to the player.

Figure 5:
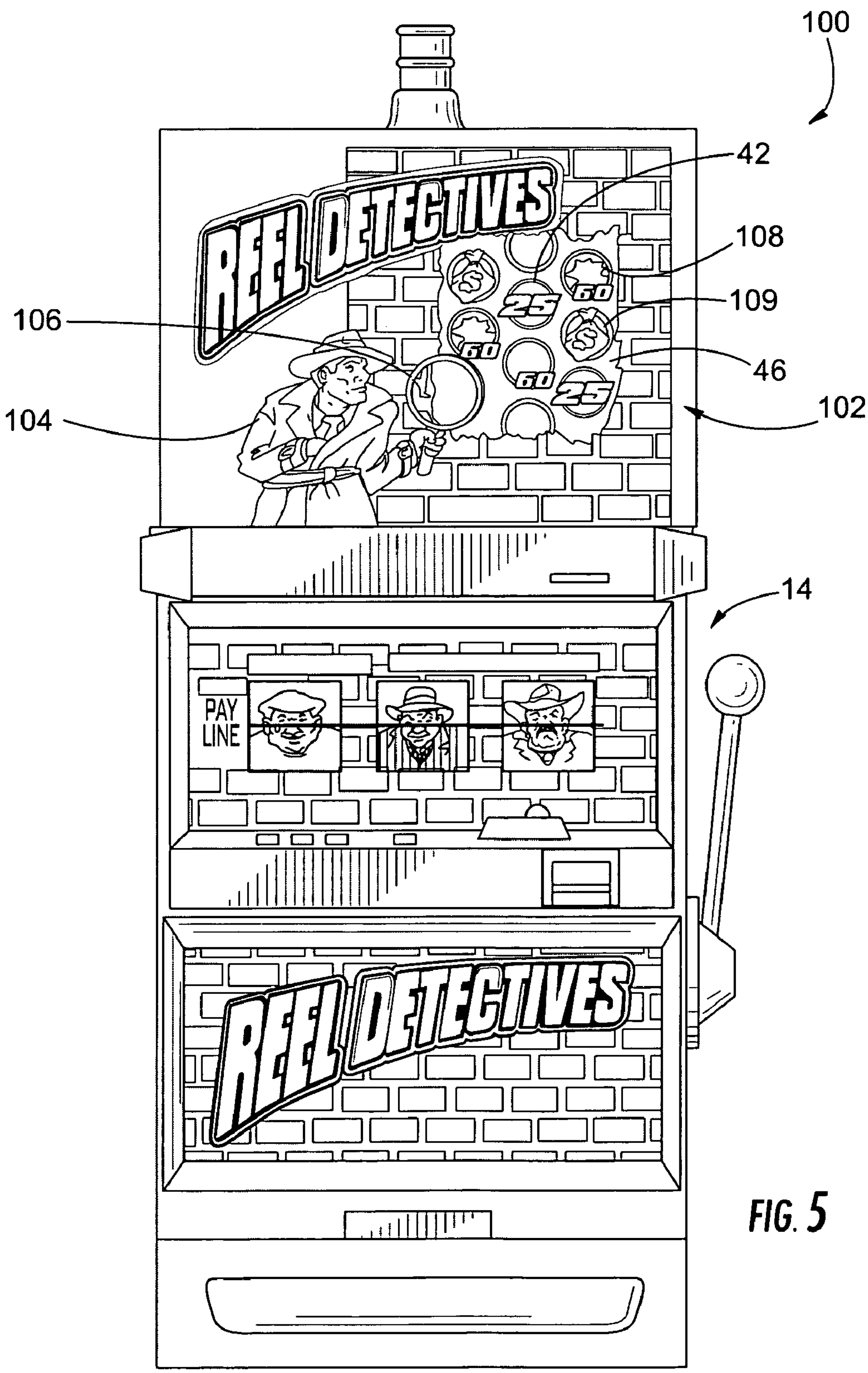
FIG. 5 is substantially a front elevation view of an embodiment of a gaming apparatus of the present invention.

Referring now to FIG. 5, another embodiment of a gaming apparatus 100, similar to gaming apparatus 10 (FIG. 1*a*), is shown. Prize display 102 of gaming apparatus 100 may comprise display device 42. In this embodiment, band 46 is configured to move vertically around a horizontal axis of rotation. Prize display 102 also may comprise an indicator 104 that is similar to indicator 43 (see FIG. 1*a*). Indicator 104 may have an appearance that conforms to a theme of the game, which is a detective game in this embodiment. Thus, indicator 104 may look like a detective, such as a man wearing a trench coat and a hat. In the embodiment illustrated in FIG. 5, indicator 104 moves horizontally. Indicator 104 may have a pointer portion 106. As shown in FIG. 5, pointer portion 106 is in the form of the detective's magnifying glass. The magnifying glass may be real or fake. If it is desired to have a functioning magnifying glass, the magnifying glass may comprise a standard magnifying lens, a fresnel lens, or other device known in the art. Pointer portion 106 may be configured to substantially cover an indicia selected by the controller (not shown) and magnify the indicia for the player to see. The mechanism for driving indicator 43, described above and shown in FIGS. 3 and 4, may be used for driving indicator 104.

Figure 6:
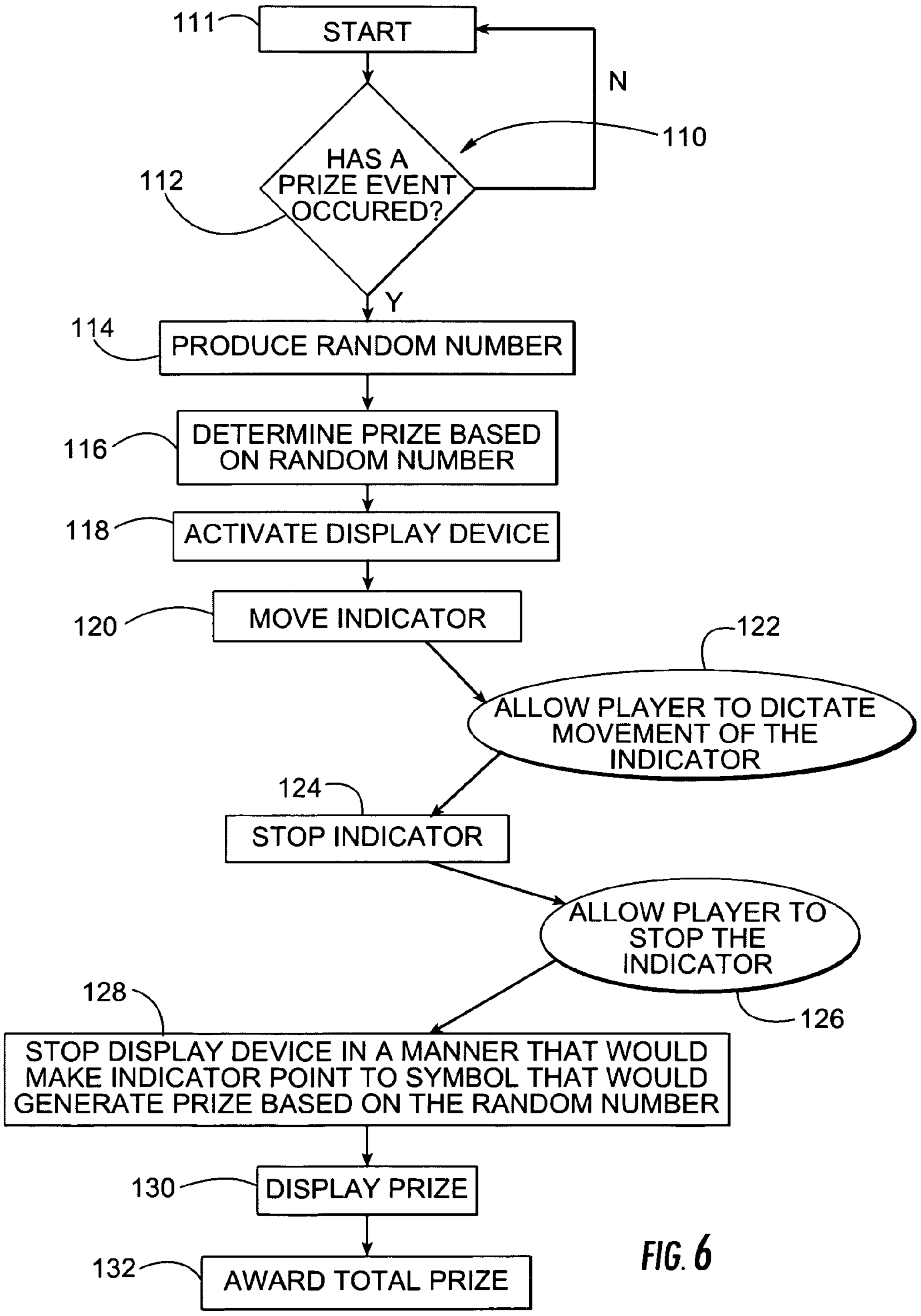
FIG. 6 is substantially a flowchart of a gaming method of the present invention.

Referring now to FIG. 6, a gaming method 110 is shown wherein a controller, such as controller 51, 81, 140 or 141, determines whether a prize event has occurred in step 112. If a prize event has occurred, the controller produces a random number at step 114. At step 116, the random number may be used to select a prize. At step 318, the controller may activate display device 42. At step 120, the controller may cause indicator 43 or 104 to move. Optionally, at step 122, the controller may allow a player to control the movement of indicator 43 or 104 by prompting the player to press one or more buttons (such as a button to move indicator 104 right and a button to move indicator 104 left) or another input device, such as a touch-pad, a joystick, or a mouse. At step 124, the controller causes indicator 43 or 104 to stop. Optionally, at step 126, the controller stops indicator 43 or 104 upon the activation of an input device by the player. At step 128, the controller causes the display device 42 to stop in a manner that would make indicator 43 or 104 point to the corresponding symbol that would indicate the prize selected based on the random number previously generated by the controller. At step 130, the prize may be displayed on the bonus meter. Steps 118 to 128 may be repeated a predetermined number of times, and the sum of the prize values may be displayed. Lights and sounds may be generated to create a festive atmosphere. At step 132, a total prize may be awarded to the player. The cumulative prize may be multiplied by a multiplier in order to obtain the total prize. The multiplier may be fixed or randomly determined.

It is noted that the flowchart in FIG. 6 shows only one possible embodiment. Some of the steps in the flowchart may be varied, changed in order, or eliminated and still fall within the scope of the present invention.

Figure 7:
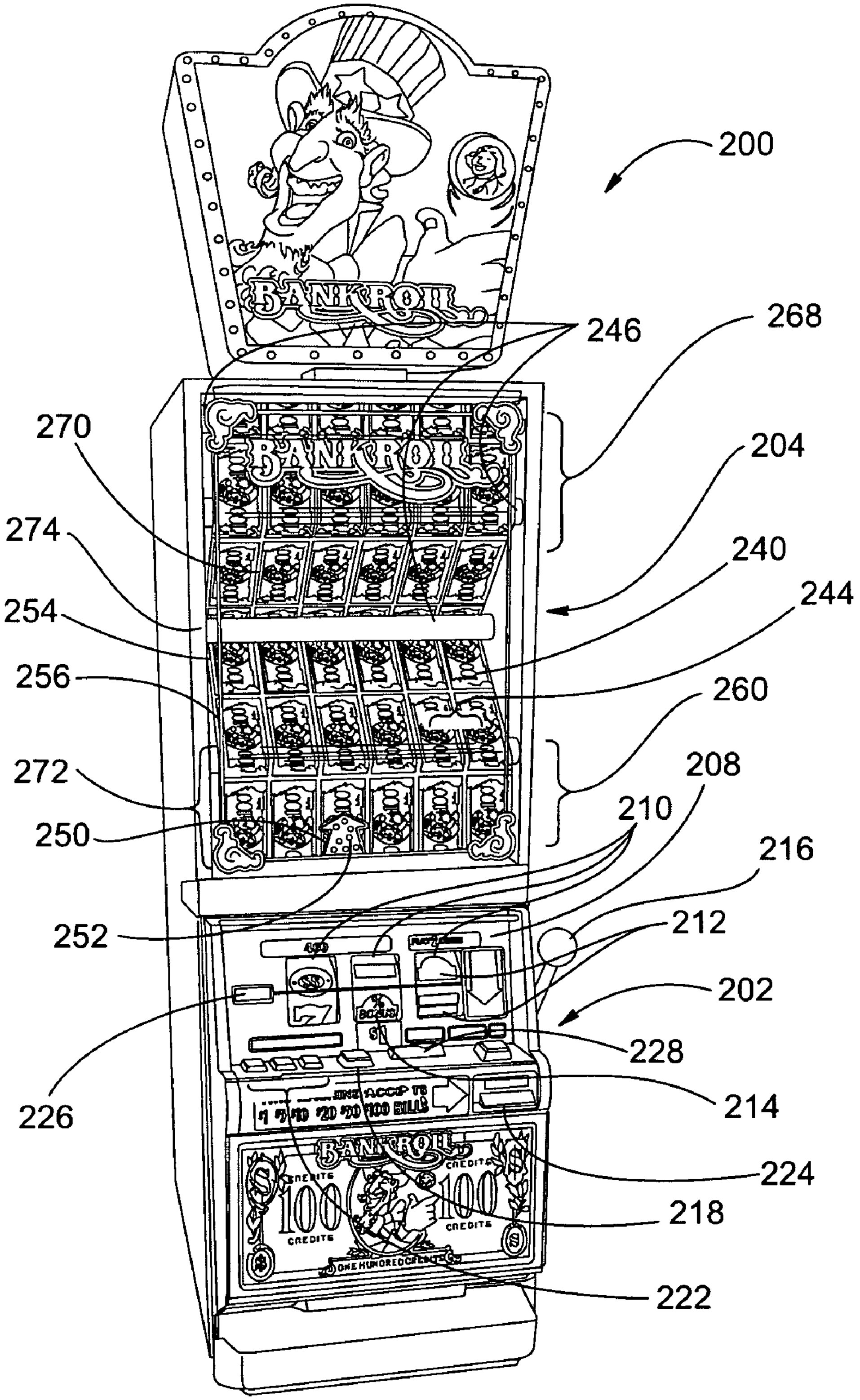
FIG. 7 is substantially a front perspective view of an embodiment of a gaming apparatus of the present invention.

FIG. 7 shows an additional alternate embodiment of a gaming device according to the present invention. FIG. 7 shows a gaming device 200 having a primary gaming device 202 and a gaming display 204, which may display all or part of a bonus game or primary game. Primary game 202 may be configured similarly to previously discussed embodiments, and may include a plurality of mechanical or video reels 210 located on primary game display 208. A plurality of indicia 212 may appear on reels 210. A pay line 226 may be included to assist players in determining whether they have won the game. Value acceptors, including coin acceptor 228 and bill acceptor 224, may be included. The player may activate the game via button 218 or arm 216.

Primary game 202 may operate in conjunction with gaming display 204. The appearance of one or more indicia 212 on pay line 226 may entitle the player to play gaming display 204. An example of bonus qualifying indicia is indicia 214.

Gaming display 204 may contain a band of material 240 that rotates about a plurality of rollers 246. Band 240 may have a plurality of indicia 244 appearing thereon. Indicia 244 may indicate various prizes.

Band 240 may resemble a printing press, including a magazine printing press, a newspaper printing press, and a money printing press. As shown in FIG. 7, a least a portion of rollers 246 are arranged such that band 240 is displayed at a first position 268 of gaming display 204 located towards the front of gaming display 204. Band 240 then may be directed to a second position 270 of gaming display 204, such as passing behind roller 274, where band 240 is located more in an interior portion of gaming display 204. Band 240 may then be directed to a third position 272, which may be in the same plane as first position 268, located towards the front of gaming display 204. In this way, band 240 may appear to be passing through a printing press.

As illustrated in FIG. 7, band 240 appears to be a sheet of uncut paper currency, such as might be produced by the U.S. Treasury Department. Indicia 244 may appear to be currency bills having various values. Indicia 244 may indicate prizes such as an award of currency or credits, merchandise, services, game play, jackpots, and progressive prizes. Band 240 may have a variety of different indicia 244 imprinted, or otherwise appearing thereon.

Band 240 may be constructed from any suitable material. Band 240 may be constructed from a flexible material, such as various types of vinyl, plastic, rubber materials, and the like. The use of a flexible material may prevent band 240 from tearing or creasing when it is moved. The material used to construct band 240 may be transparent or translucent, allowing band 240 to be backlit.

Band 240 may be coupled to a drive mechanism (not shown in FIG. 7) so that band 240 may be rotated about rollers 246. In operation, band 240 may be actuated prior to a bonus prize being awarded to the player. Indicia 244 that may be awarded may appear in a particular area, such as area 260, for display to the player. Display area 260 may be lighted or otherwise brought to the player's attention.

In at least one embodiment, an indicator 250 is included that may point to particular indicia 244. Indicator 250 may be configured to point to an indicia 244 that conveys the outcome of gaming display 204. As shown in FIG. 7, indicator 250 is moveable in a horizontal manner. However, gaming display 204 is not limited to any particular configuration, and indicator 250 may move vertically, diagonally, or in a non-linear manner, as desired by the game designer. Indicator 250 may be lit, such as by lights 252, in order to make indicator 250 more attractive and to call attention to indicator 250. In at least one embodiment, indicator 250 is illuminated only when gaming display 204 is active or when gaming display 204 is in an attract mode (such as has been previously described).

At least one advantage of band 240, as illustrated in FIG. 7, is that it may provide a relatively long path length. Accordingly, it may allow for more and/or larger indicia 244 to be included on band 240.

Figure 8:
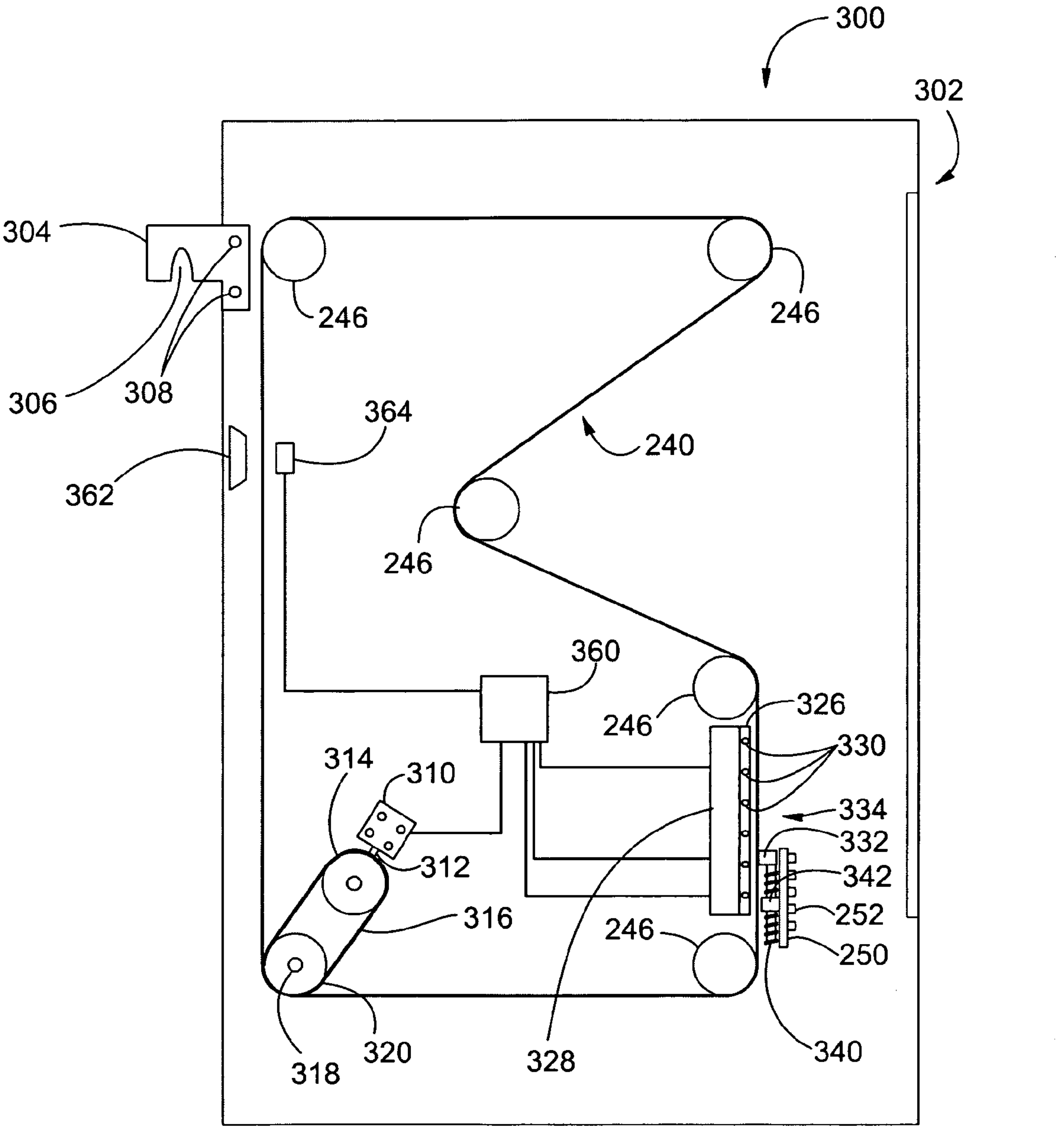
FIG. 8 is substantially a side elevation view of an embodiment of a gaming apparatus according to the present invention.

FIG. 8 illustrates certain components of a band display 300 that may be included in a gaming device according to the present invention, including that depicted in FIG. 7. FIG. 8 illustrates band 240 wrapped around a plurality of rollers 246. In at least one embodiment, all rollers 246 are idler rollers that simply guide band 240 about the interior of gaming display 204. One suitable roller is model number E8S001-01-ZZZZ available from Starpoint Electronics, Ltd. of Chessington, UK. A driven roller may be included to drive band 240. Driven roller 320 may be in communication with an actuator 310 in order to drive rotation of driven roller 320. One suitable driven roller is model E8S002-01-ZZZZ from Starpoint.

In at least one embodiment, band 240 is driven simply by frictional contact with roller 320. However, other arrangements may be substituted without departing from the scope of the present invention. For example, roller 320 may have a portion with teeth (not shown) that could engage slots or holes (not shown) in band 240.

Actuator 310 may be any number of suitable actuators, such as motors, including stepper motors, gear motors, and servo motors. Actuator 310 may rotate a shaft 312 in connection with a wheel 314. A belt 316 may link wheel 314 to shaft 318 of driven roller 320. Rotation of shaft 312 drives wheel 314 which in turn drives belt 316. The rotational force is passed from belt 316 to shaft 318. Rotation of shaft 318 may drive rotation of roller 320. Frictional contact with rotating driven roller 320 moves band 240. Optionally, an idler wheel or pulley (not shown) can be included on the opposing side of band 240 in order to increase the frictional contact of band 240 with driven roller 320.

In another embodiment, actuator 310 may be a stepper motor rotating a drive gear (not shown). The drive gear may be in communication with a spur gear (not shown) driving an idler shaft (not shown). The idler shaft in turn may be in communication with driven roller 320. The idler shaft may also used to help transfer power to the side of band 240 not located by actuator 310.

In at least one embodiment, band 240 may pass over an area proximate indicator 250. As shown in FIG. 8, indicator 250 may be attached to a worm gear 340. Worm gear 340 may be in communication with a suitable actuator 332, such as a servo motor, stepper motor, or the like. Indicator 250 may be attached to bracket 342. Bracket 342 may be threadably attached to worm gear 340.

In at least one embodiment, indicator 250 includes one more lights 252 in order to call attention to indicator 250 and make indicator 250 more attractive. Lights 252 may be of any suitable type, including light emitting diodes (LEDs). Both lights 252 and indicator actuator 332 may be in communication with a controller, such as controller 360.

Controller 360 may direct lights 252 to illuminate and deactivate in accordance with game events, such as the execution of an attract mode, or a game outcome qualifying a player to play gaming display 204. Controller 360 also may direct the movement of indicator 250. For example, controller 360 may move indicator 250 upon activation of gaming display 204. Controller 360 may direct indicator 250 to stop, such as when a player activates buttons 222.

Controller 360 also may determine the position of indicator 250, for example if the controller is preset with the starting position of indicator 250, controller 360 may track the position of indicator 250 by knowing in which direction (or directions) indicator 250 was moved, how fast it was moved, and for what period of time. Depending on the actuator 332 used, actuator 332 may provide feedback as to the position of indicator 250 (for example, if an indexing stepper motor is used).

It may be beneficial to provide an additional position sensor for indicator 250. Those of skill in the art will recognize that various types of sensors could be used to track the position of indicator 250. In one embodiment, optical sensors are used. For example, an infrared signal generator may be included on one side of worm gear 340. An infrared detector may be placed on the other side of worm gear 340. When indicator 250 is not in between the generator and detector, the detector detects the infrared signal. When indicator 250 is interposed between the signal generator and detector, the detector does not detect a signal. Therefore, when the signal is interrupted, controller 360 knows the position of indicator 250. Such a positioning system may be a useful way to calibrate indicator 250.

Of course, other systems can be used, or additional signal generators and detectors used, including those that may allow for constant tracking of indicator 250. For example, an optical sensor may be attached to bracket 342. Optical readable indicia and patterns may be placed along worm gear 340. As bracket 342 travels along worm gear 340 the sensor may read the indicia or patterns and communicate the position of indicator 250 to controller 360.

Controller 360 may also be in communication with a housing 328 that may have a plurality of lights 330. Lights 330 may be any suitable illumination device, including LEDs, fluorescent lamps, and incandescent lamps. Lights 330 may be activated by signals sent from controller 360 in response to game events. Lights 330 may be used to backlight band 240. Illumination of band 240 may result in a more appealing look for gaming display 204 and call more attention to the area of band 240 on which indicator 250 may indicate a prize.

Housing 328 may also contain a guide 326. Guide 326 may provide a surface to help position band 240. For example, guide 326 may help maintain band 240 in a taut position, and keep band 240 from wrinkling, creasing, tearing, or getting caught in any of the actuating mechanisms, including the actuating mechanism for indicator 250.

Controller 360 may also be in communication with a positioning system for band 240. It may be beneficial to be able to track the position of band 240. For example, when a game outcome is determined, it is important to make sure that indicator 250 points to the appropriate indicia on band 240.

Many suitable positioning systems can be used, including those used for indicator 250. For example, an infrared signal source 362 can be included on one side of band 240. An infrared detector 364 may be located on the opposing side of band 240. Infrared blocking materials may be placed at one or more locations on band 240. By tracking when the infrared signal is blocked, controller 360 may be able to calibrate and/or constantly track the position of band 240 and any indicia appearing thereon.

In an alternative embodiment, a side of band 240 contains a series of holes (not shown), cut-out portions, or similar optical interrupts. The optical interrupts may be read by an optical reader (not shown). The optical interrupts may convey the position of band 240 to controller 360.

Of course, gaming display 204 may be calibrated by the gaming operator from time to time, and position data from actuator 310, such as an indexing stepper motor, may also be used to track the position of band 240.

Figure 9:
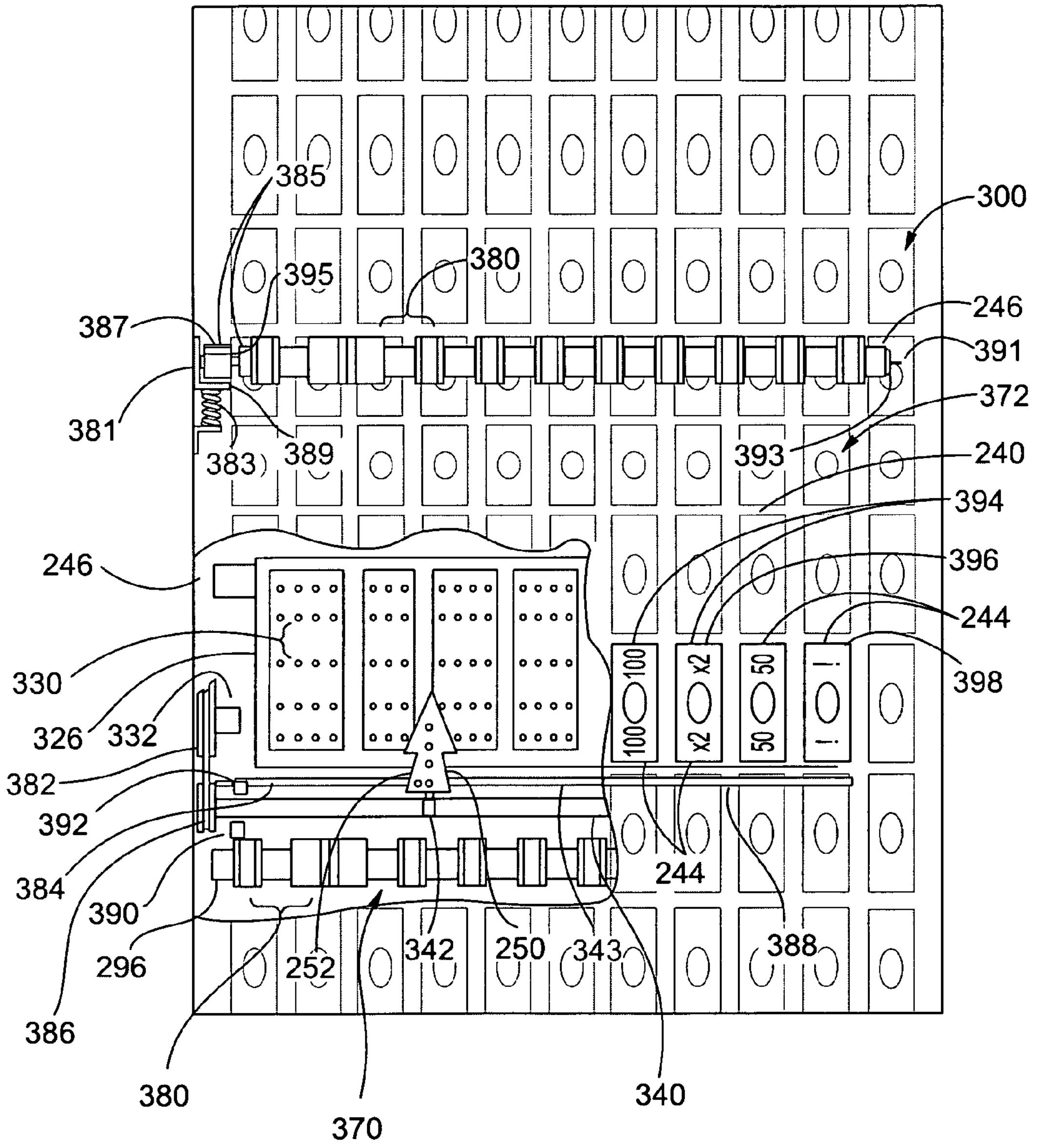
FIG. 9 is substantially a front view of a gaming apparatus according to the present invention, including a cut away view showing the interior of the gaming apparatus.

In at least one embodiment, the components of band display 300 shown in FIGS. 8 and 9 are modular in nature. That is, band 240, indicator, 250, and their actuating mechanisms may be added and removed from a gaming device as a unit. For example, as shown in FIG. 8, a hook 304 having a slot 306 may be attached to the frame of band display 300, such as by fasteners 308, such as bolts or rivets. A receiver (not shown), such as a bar, may be provided within the gaming device for attachment to hook 304.

FIG. 9 presents an alternate view of a gaming device according to the present invention. Portion 370 is a cut away view of the inner portion of an embodiment of gaming display 204. Portion 372 is an outer view of the embodiment.

In FIG. 9, it can be seen that in at least one embodiment, rollers 246 are fitted with a plurality of wheels 380. Wheels 380 may be made of a material that maintains strong frictional contact with band 240. Wheels 380 are preferably constructed of, or coated with, a relatively non-abrasive material so as not to damage band 240. For example, wheels 380 may be made of various types of rubber, plastic, and similar materials.

Rollers 246 may be provided with a tensioning system that may both help maintain the position of rollers 246, and maintain pressure on rollers 246 in order to ensure that band 240 is taut. The tensioning system may include a base 381, which may be mounted to the frame of gaming display 204 (FIG. 7). Base 381 may be coupled to a biasing device 383, such as a spring. Biasing device 383 may be coupled to a moveable mounting area 385. Moveable mounting area 385 may be moved along a track 387. Moveable mounting area 385 may include a plate 389 that is mounted to biasing device 383.

Roller 246 may include a pin 391 and a shaft end 393. Pin 391 may be held within roller mounting area 395. Roller mounting area 395 may include a raised area defining a hole (not shown). When roller 246 is inserted, biasing device 389 will push roller 246 against band 240. Roller 246 may then rotate about pin 391 while keeping band 240 taut.

FIG. 9 also provides additional detail for a suitable actuator and positioning system for indicator 250. As was previously described, indicator 250 may be attached to worm gear 340 by bracket 342. Worm gear 340 may be actuated by motor 332. Motor 332 maybe attached to pulley 382 (which may be a timing pulley). Belt 384 (which may be a timing belt) may be attached to pulley 382 (which may be a timing pulley) and in contact with shaft end 386 of worm gear 340. A positioning system, such as infrared signal generator 390 and infrared detector 392, may be included in order to assist in tracking the position of indicator 250. In at least one embodiment, motor 332 is stepper motor model HT23-396, available from Applied Motion Products of Watsonville, Calif.

In at least one embodiment, bracket 342 is configured to resist rotating as it travels along worm gear 340. One way this may be achieved is to include a rail 343 that runs parallel to worm gear 340. Bracket 342 may be coupled to rail 343. Rail 343 will prevent bracket 342 from rotating, while allowing linear movement along worm gear 340.

Turning now to portion 372 of FIG. 9, there is illustrated a number of indicia 244 appearing on band 240. As shown in FIG. 9, indicia 244 are representations of faux paper currency having various representations. Of course, any suitable indicia 244 may be placed on band 240. Indicia 244 may be chosen to be relevant to a theme of gaming device 200, or gaming display 204, such as the "Bank Roll" theme shown in FIGS. 7 and 9.

Indicia 244 may represent prizes that a player may be awarded. For example, indicia 394 may represent an amount of money or gaming credits. Indicia 396 may represent a multiplier by which the player's winnings from one or more gaming rounds may be multiplied. Indicia 398 may represent special awards, such as a good, a service, a jackpot, or a progressive amount. Of course, indicia 244 may represent many other prizes without departing from the scope of the present invention.

In certain embodiments, portion 372 may include a slot 388 (not shown). A portion of indicator 250 or bracket 342 may extend through slot 388. Slot 388 may allow indicator 250 to be displayed to the player, and actuated, but hides the inner workings of gaming display 204 (FIG. 7) from the player. Of course, other means of hiding the inner workings of gaming display 204, including the actuation system for indicator 250, from the player could be used. For example, rather than a slot, the actuation mechanism could be located below the area of gaming display 204 viewable by the player, as shown in FIG. 9. Indicator 250 could be attached to the actuation mechanism in this area, and then extend upward into the area viewable by the player.

As illustrated in FIGS. 7 and 9, in certain embodiments pointer 250 moves along a first axis. Band 240 (which may function as a display surface) moves along a second axis. Indicia 244 appearing on band 240 move along the second axis as band 240 moves. In certain embodiments, the first axis is orthogonal to the second axis. The first and second axis may be used to define a coordinate system, with each indicia 244 appearing on band 240 corresponding to a specific coordinate in the system. Controller 360 may be programmed with the coordinates of each indicia 244, allowing controller 360 to ensure that the proper indicium or indicia 244 corresponding to a game outcome is displayed once band 240 and indicator 250 are stopped.

Figure 10:
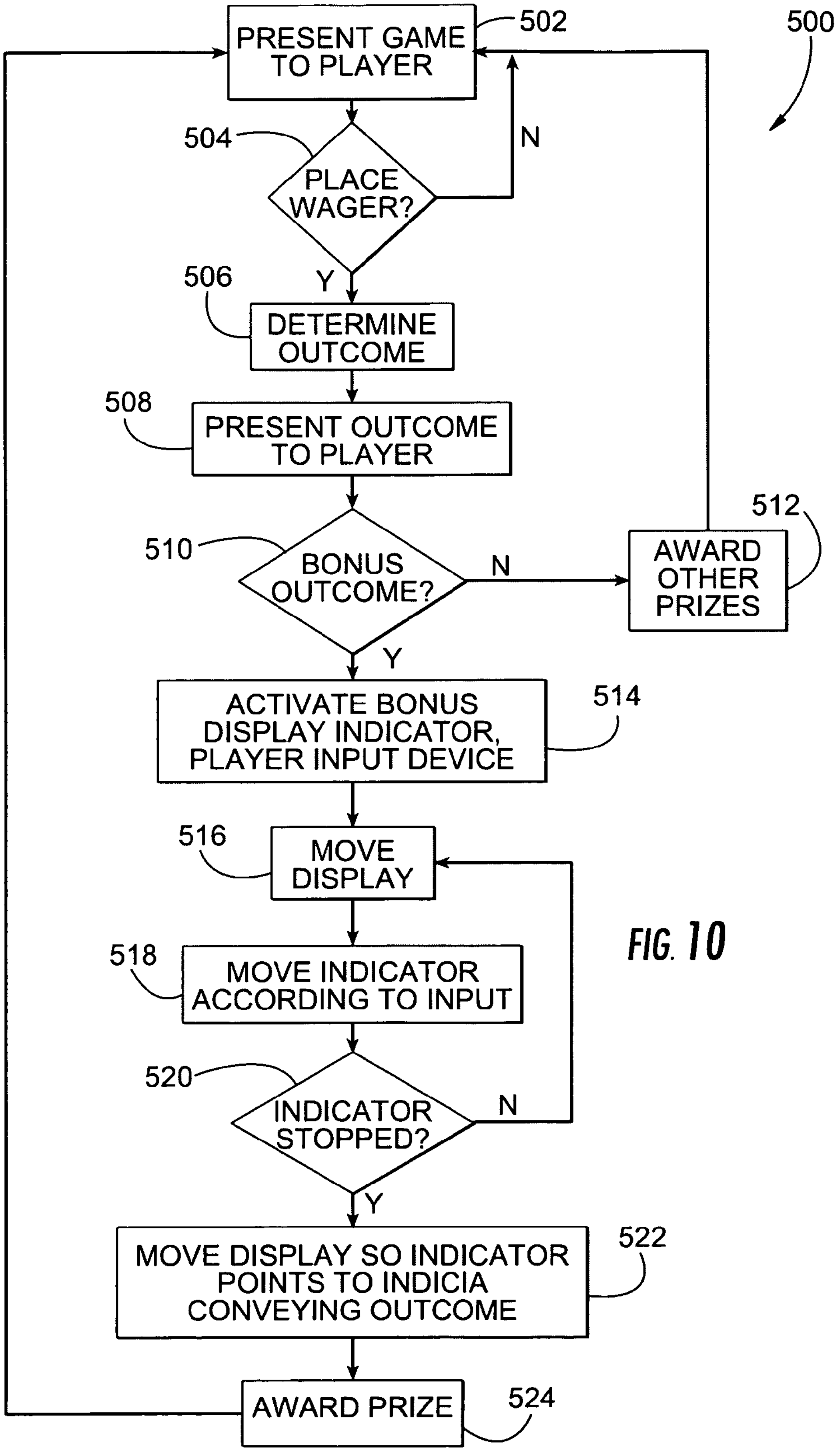
FIG. 10 is substantially a flowchart of a method according to the present invention.

One method of operation 500 of an embodiment of the present invention, such as the device depicted in FIG. 7, is illustrated in FIG. 10. A game is presented to a player in step 502. At decision 504, method 500 checks to see if the player has placed a wager. If not, method 500 returns to step 502.

If the player places a wager at decision 504, method 500 proceeds to determine a game outcome in step 506. The outcome is presented to the player at step 508. At decision 510, method 500 checks to see if the game outcome determined in step 506 is an outcome qualifying the player to play a bonus game. If not, method 500 proceeds to step 512 and awards the player any prizes awarded according the game outcome determined in step 506, and returns to step 502.

If it is determined in step 510 that the game outcome of step 506 qualifies the player for a bonus game, method 500 proceeds to step 514. At step 514, gaming display 204 is activated. This may include activation of band 240, indicator 250, and player input device 222. Lights and sounds may also be activated to make the event more exciting to the player and those around the player, as well as to call attention to the device.

Method 500 then proceeds to step 516 where band 240 is actuated. The player may be allowed to control the movement of indicator 250 using input device 222. For example, in the device depicted in FIG. 7, the player may be allowed to move the indicator left and right, and to stop the indicator at a desired location.

Method 500 proceeds to decision 520, which checks to see whether indicator 250 has been stopped. If indicator 250 has not been stopped, method 500 returns to step 518 and continues to move band 240 and allow the player to move indicator 250.

If decision 520 determines that the player has stopped indicator 250, method 500 proceeds to step 522. At step 522, a controller (which may be controller 51, 81, 140, 141, or 360) continues to move band 240 until the indicia corresponding to the game outcome is indicated by indicator 250. Method 500 then awards any prizes to the player in step 524 and returns to step 502.

Of course many variations of this method can be made without departing from the scope of the present invention. For example, the game outcome determined in step 506 can include both the outcome of the primary game and the bonus game. Alternatively, the bonus game outcome can be determined in a separate step once the bonus game begins.

FIG. 10 illustrates a method where band 240 moves at the same time a player is positioning indicator 250. In another embodiment, band 240 may be stationary while the player positions indicator 250. Once the player has chosen a position for indicator 250, band 240 can be moved until the appropriate indicia is indicated by indicator 250.

The player could be allowed to select the position of indicator 250 in a variety of ways. For example, the player could be provided with directional buttons and a stop button. Alternatively, indicator 250 could be moved in an automated fashion by controller 360. The player could activate a stop button when indicator 250 is at the position the player desires.

As may be apparent from the above description, it may be desirable to arrange indicia 244 on band 240 such that enough of each type of indicia 244 are included in order that any indicia can be indicated by indicator 250 at any position to which indicator 250 is moved. For example, in the embodiment illustrated in FIG. 7, indicia 244 are illustrated as appearing in a matrix of rows and columns, with indicator 250 being positionable at a particular column. Accordingly, it may be beneficial to have each at least one indicia 244 representing each prize that may be awarded appear on at least one row of each column of band 240.

Figure 11:
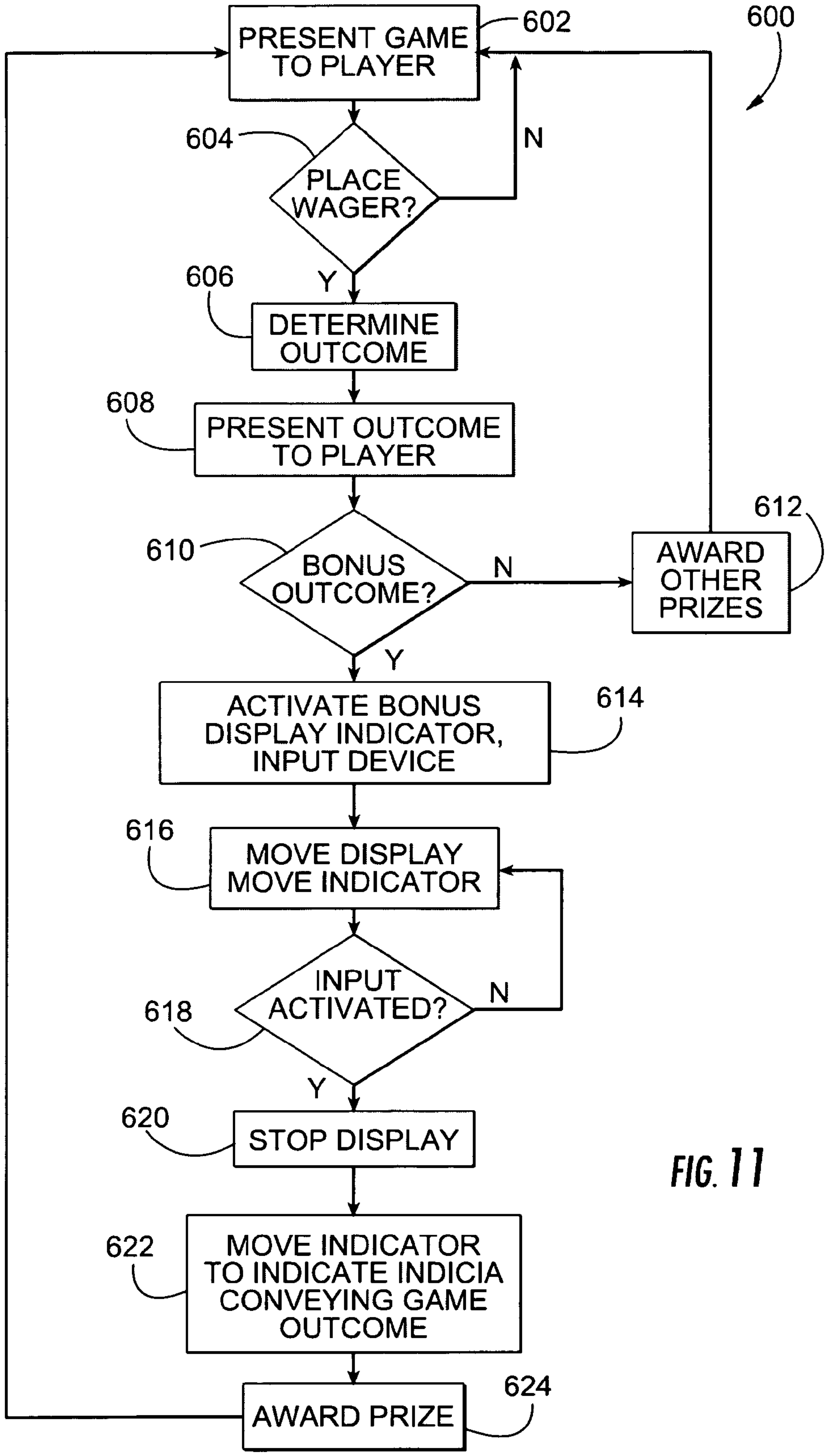
FIG. 11 is substantially a flowchart of a method according to the present invention.

An alternative method of operation is illustrated in FIG. 11. Steps 602-612 may correspond to steps 502-512 described above. At step 614, gaming display 204 may be activated, including band 240, indicator 250, and player input device 222. Lights and sounds may be activated, as previously described. Band 240 and indicator 250 are moved at step 616.

Decision 618 checks to see whether input device 222 has been activated. If input device 222 has not been activated, method 600 returns to step 616. If input device 222 has been activated, band 240 is stopped at step 620. Band 240 may be stopped quickly or may gradually come to a stop.

Method 600 then proceeds to step 622. At step 622, indicator 250 is moved to indicate the indicia conveying the outcome of the bonus game. Any prizes are awarded in step 624, and then method 600 returns to step 602.

Method 600 may be configured to allow a player to stop band 240 in a specific position, or simply to choose when band 240 will begin to stop. If the player is allowed to choose a specific position for band 240, it may be desirable to have at least one of each prize represented by indicia 244 that may be awarded appear on each row of band 240. Of course, if the player may not choose the exact position of band 240, it may be less desirable to include every indicia 244 on each row. Indeed, not allowing the player to choose an exact position for band 240 may allow a greater variety of indicia 244 to be presented on band 240.

Figure 12:
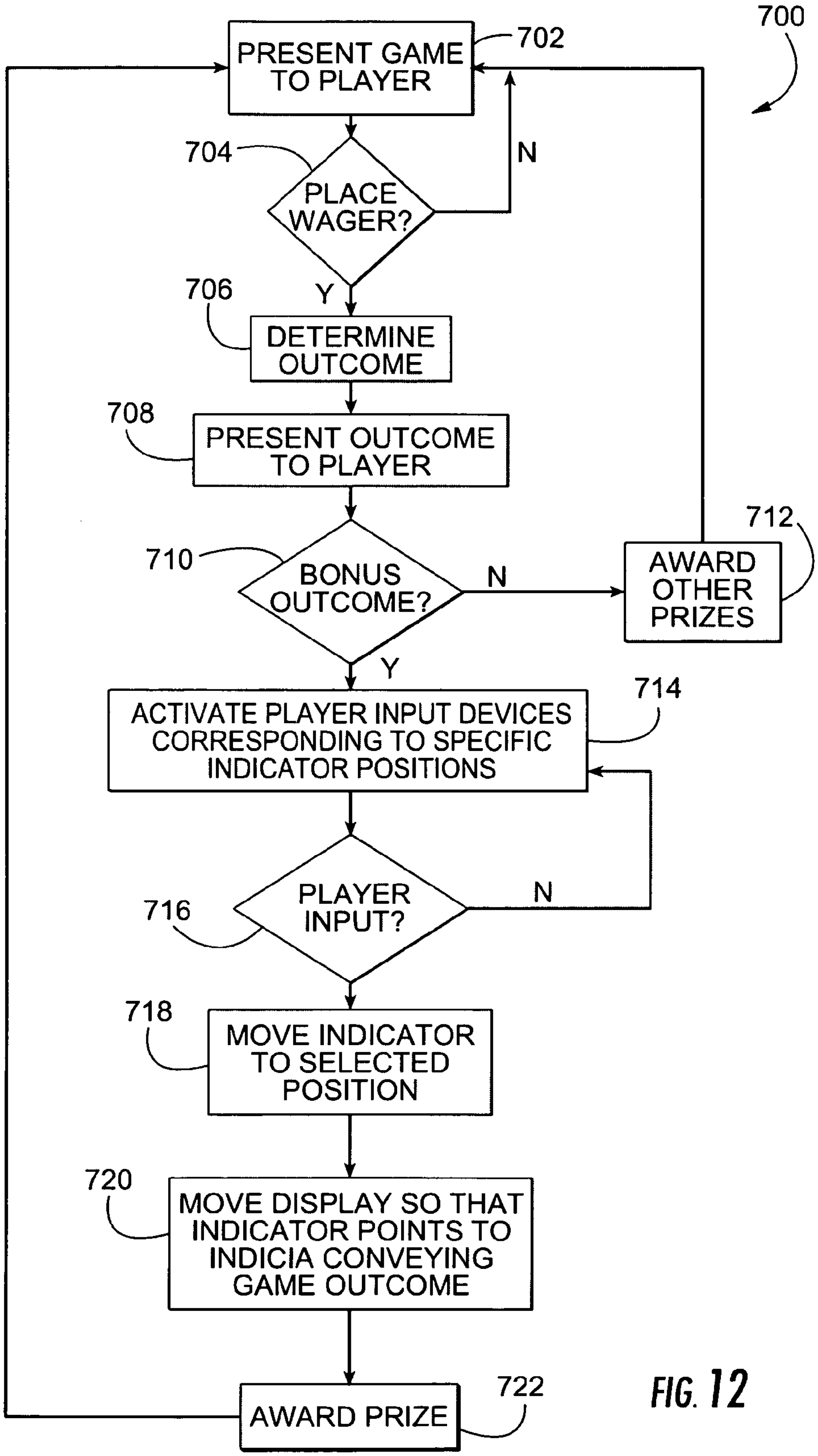
FIG. 12 is substantially a flowchart of a method according to the present invention.

Another gaming method 700 is illustrated in FIG. 12. Steps 702-712 may correspond to steps 502-512 and 602-612 described above. At step 714, one or more player input devices are activated that allow a player to select one or more specific indicator positions. For example, indicia 244 on band 240 could be formed in a plurality of columns. The player input device(s) may allow a player to position indicator 250 by a specific column.

At step 716, method 700 checks to see if the player has provided input. If not, method 700 cycles back to step 714 until input is provided. Once the player has provided input, method 700 proceeds to step 718 and moves indicator 250 to the position selected by the player. At step 720, the display is moved so that indicator 250 points to the indicium conveying the game outcome. Any prize or prizes are awarded in step 722 and then method 700 may return to step 702.

In an alternative embodiment, the player may be allowed to choose a position after the game is begun. In any embodiment, the player's choke of position for indicator 250 might be reflected on band 240, such as illuminating a column of band 240 corresponding to the pre-set position of indicator 250 chosen by the player.

Various additions, subtractions, and permutations of the steps in the above described methods can be made without departing from the scope of the present invention. For example, the player may be allowed to select both the position of indicator 250 and to indicate when band 240 should begin to stop (although not the final position of band 240). The more the player is allowed to interact with gaming device 202, the more control over the outcome of the game the player may feel, which may make the game more enjoyable to the player. Of course, regulatory concerns may dictate that the player's perceived control be largely or completely illusionary.

Methods of operating gaming display 204, including methods 500, 600, and 700, may be set to automatically stop band 240 and/or indicator 250 after a certain time. For example, controller 360 could be programmed to automatically stop indicator 250 and/or band 240 after the passage of a certain amount of time, such as thirty seconds. While it may be beneficial to give the player some interaction with gaming display 204, it may also be desirable to ensure that each game round completes in a timely fashion.

Figure 13:
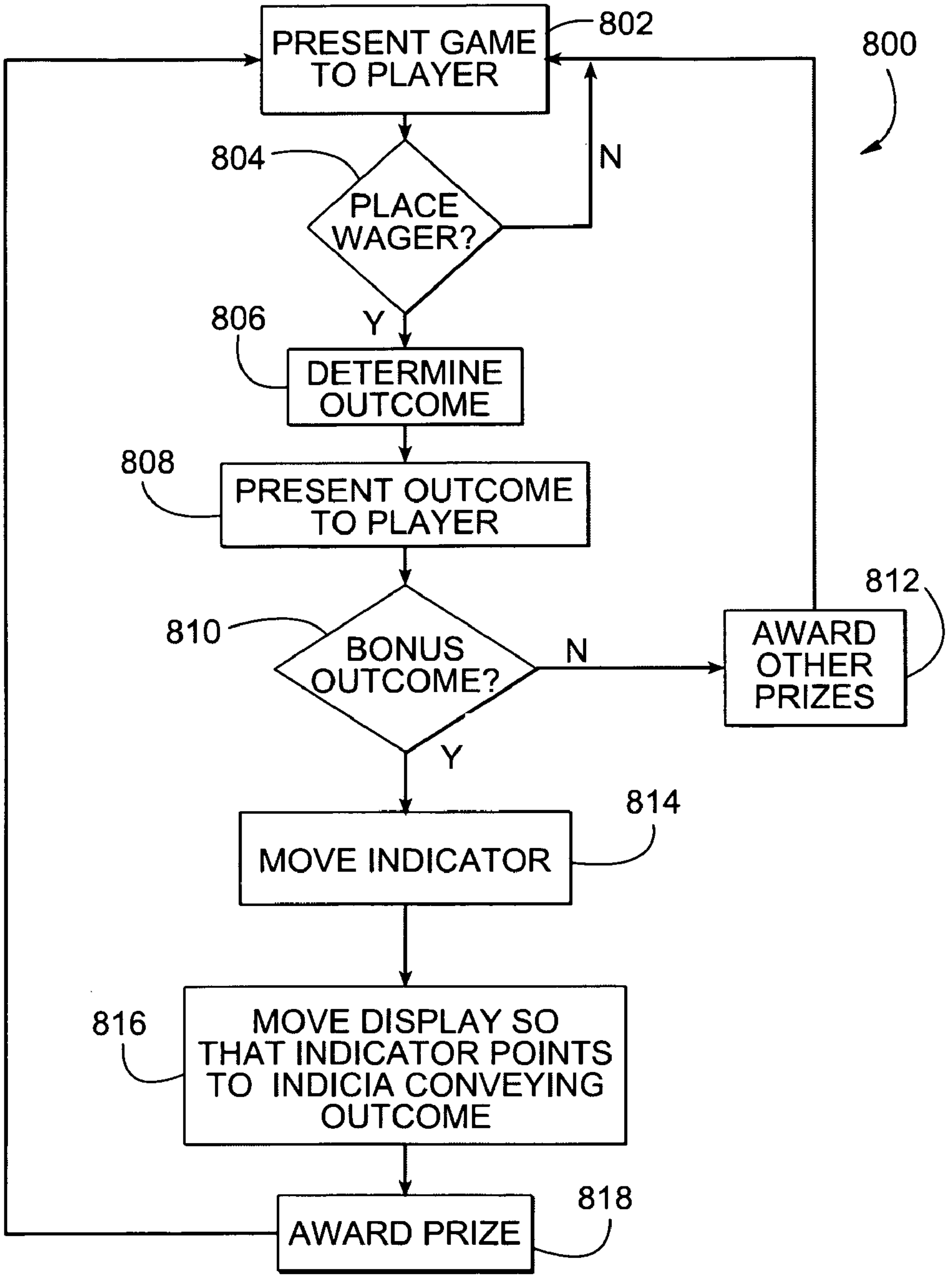
FIG. 13 is substantially a flowchart of a method according to the present invention.

Of course, certain embodiments of the present invention, such as method 800 of FIG. 13, may employ no player input. Steps 802-812 may correspond to steps 502-512 of FIG. 10. At step 814 indicator 250 is moved to a position, which may be randomly selected by controller 360. At step 816 band 240 may be moved so that indicator 250 points to an indicium conveying the game outcome. Any prizes may be awarded at step 818 before method 800 returns to step 802. Of course, steps 814 and 816 may be reversed or presented simultaneously. Also, band 240 could be randomly moved, with indicator 250 being moved to indicate the game outcome.

Figure 14:
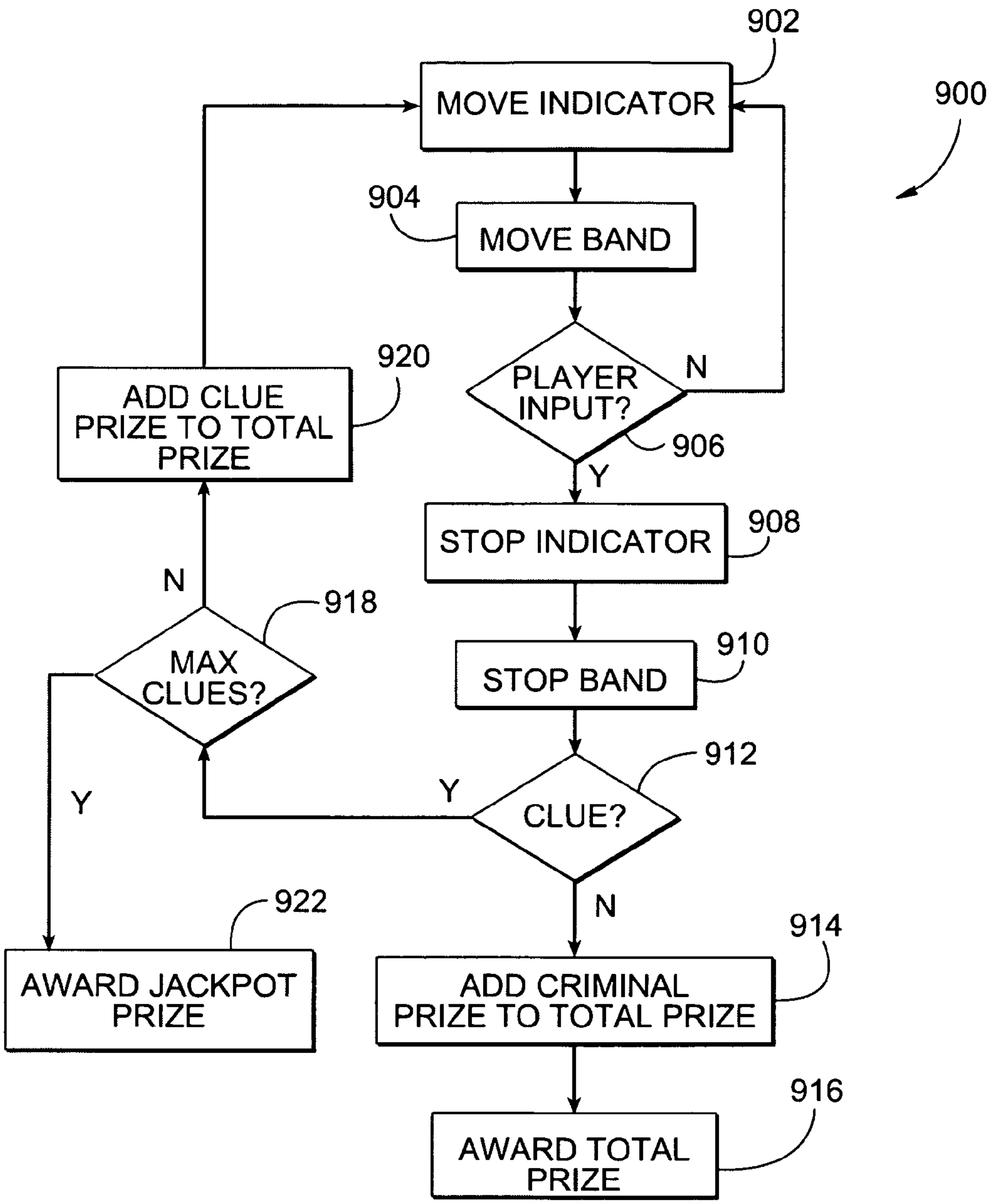
FIG. 14 is substantially a flowchart of a method according to the present invention.
Figure 15:
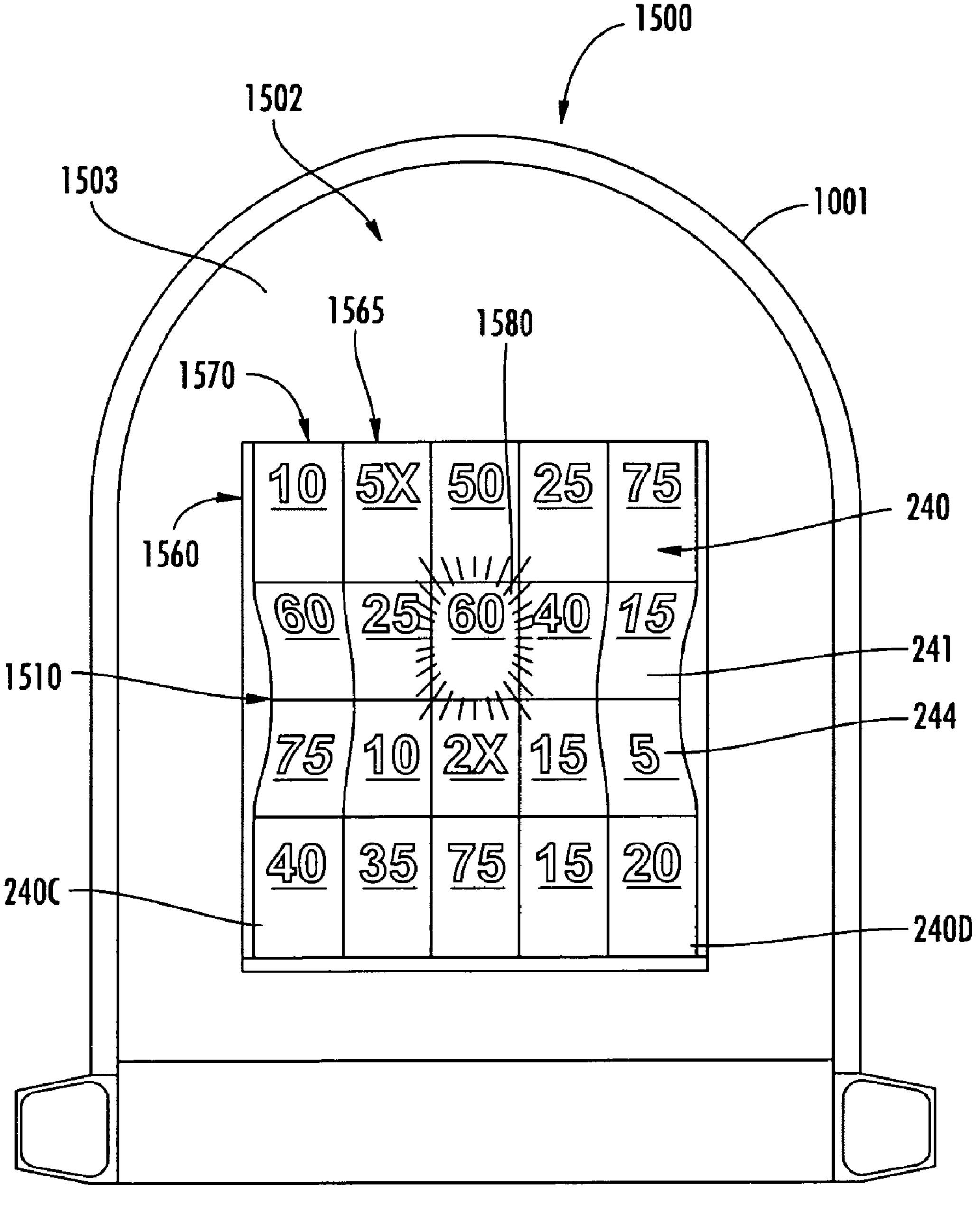
FIG. 15 is substantially a front view of another embodiment of a gaming apparatus according to the present invention.
Figure 16:
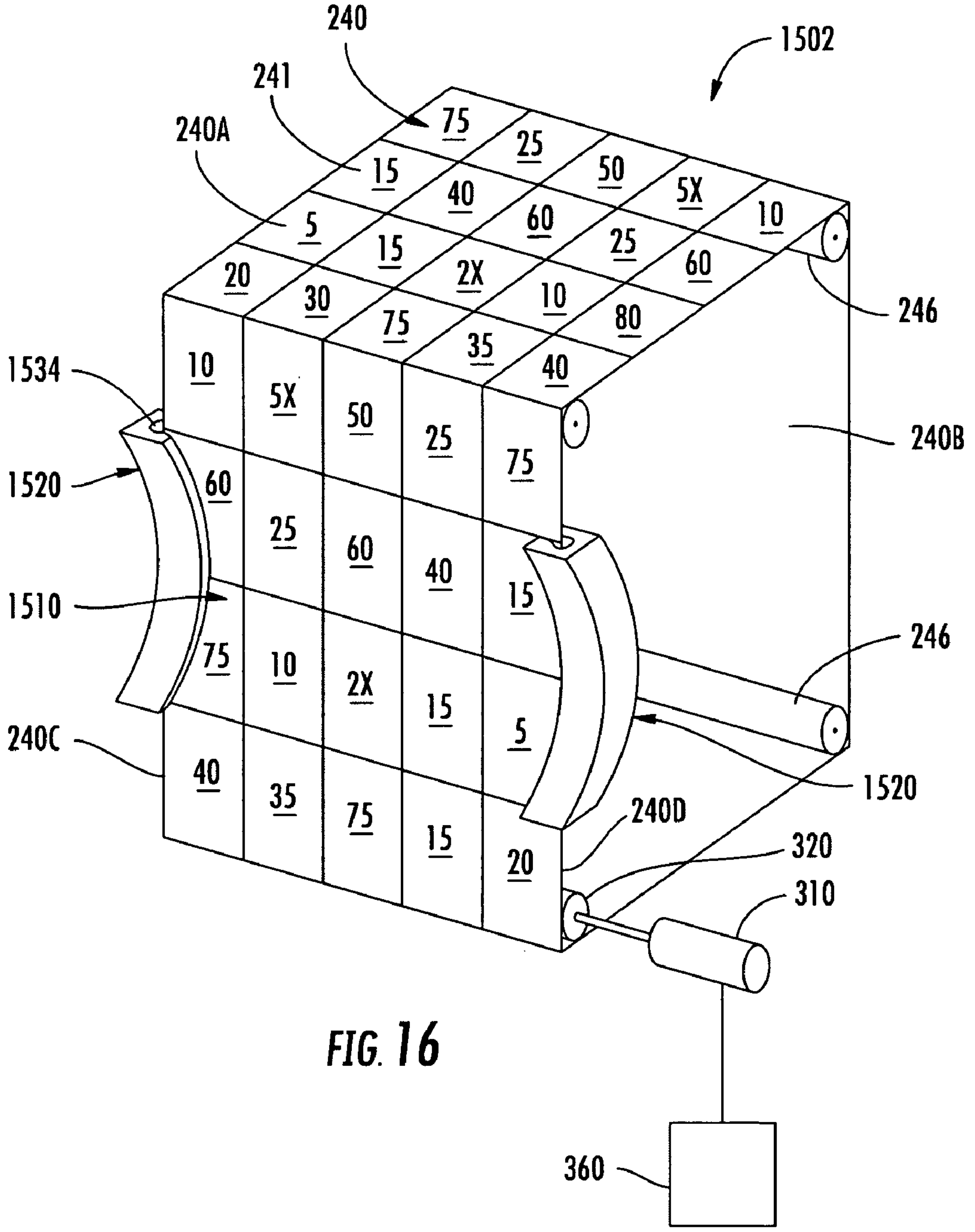
FIG. 16 is substantially a perspective view of the gaming apparatus of FIG. 15 with the housing removed.
Figure 17:
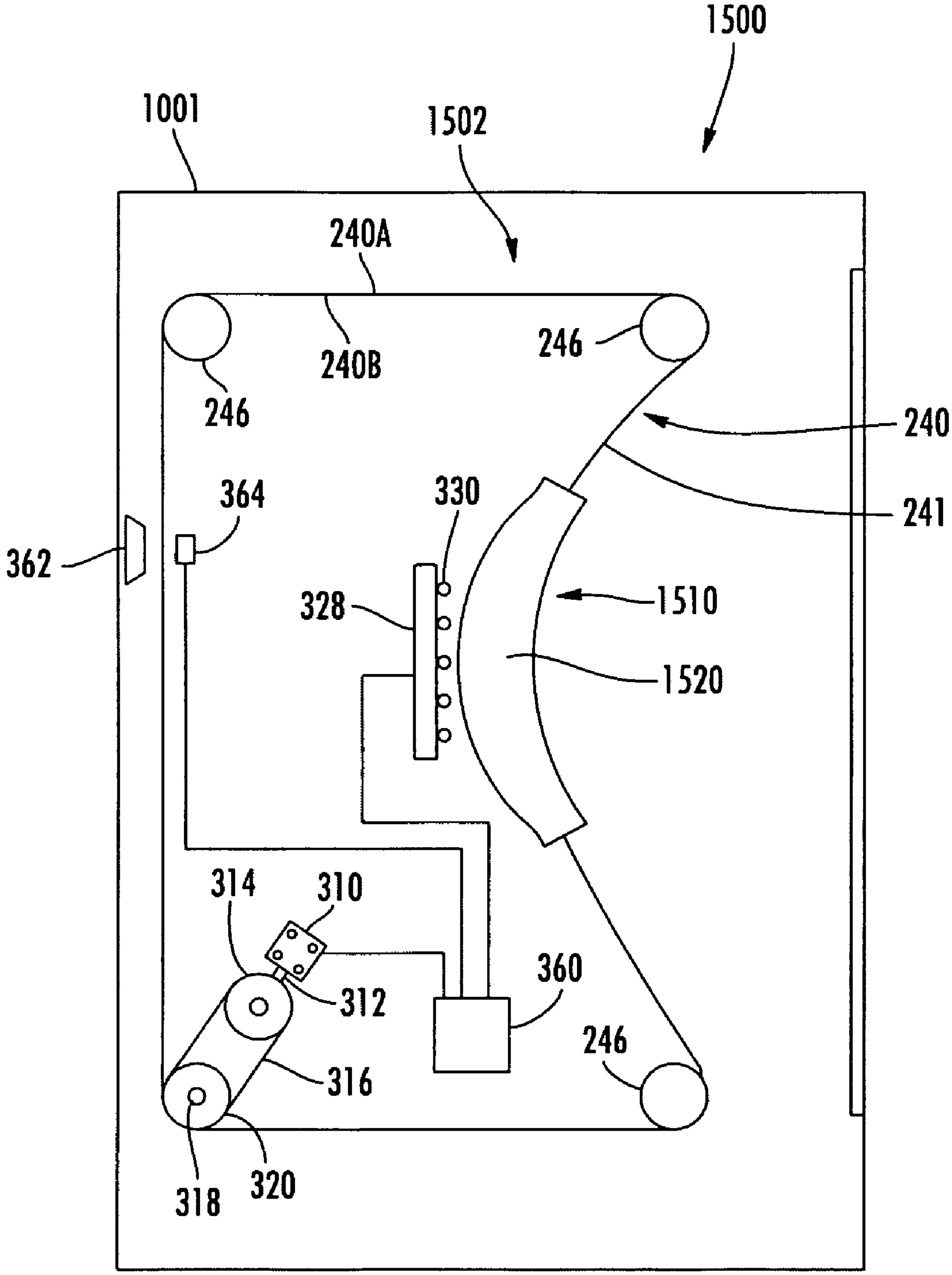
FIG. 17 is substantially a partial cross-sectional view of the gaming apparatus of FIG. 15.

Another method 900 of game play that may be used with embodiments of the present invention, including that of FIG. 5, is shown in FIG. 14. Method 900 may award two types of prizes, illustrated in FIG. 5 as criminal prizes 108 or clue prizes 109. Of course, the prizes could be called or represent various things, have different values than those that will be described, and could be represented by images other than those specifically illustrated. After a game has begun, indicator 250 is moved at step 902. Band 42 is moved at step 904. A player input device is activated and the gaming device waits for player input at decision 906. If no player input is provided, method 900 cycles back to step 902. If input is provided, method 900 proceeds to step 908.

At step 908, indicator 250 is stopped. At step 910, band 42 is stopped so that indicator 250 indicates the indicium conveying the game outcome. Decision 912 checks to see if the indicia is a clue award or a criminal award. If the indicium is a criminal award, method 900 adds a criminal prize to a total prize at step 914. The total prize is awarded to the player at step 916.

If decision 912 determines that the indicium is a clue prize, method 900 proceeds to decision 918. Decision 918 checks to see whether the player has obtained a maximum number of clues, for example, 4. If not, method 900 proceeds to step 920 and adds a clue prize to the total prize and game play continues at step 902.

If decision 918 determines that the player has obtained, the maximum number of clues, method 900 awards a jackpot prize at step 922 and game play ends.

Although embodiments of the invention described and depicted in FIGS. 7-14 have been described as a bonus game in conjunction with a primary game, the present invention is not so limited. For example, gaming display 204 (FIG. 7) could be configured as a primary game. A player could make a wager and gaming display 204 could indicate winning and losing outcomes and dispense prizes accordingly. Also, rather than being attached to a primary game, gaming display 204 could be located apart from game 202 (FIG. 7). Gaming display 204 could also be connected to multiple games 202. The present invention is not limited to a particular configuration or configurations.

Movable Belt With Guide Tracks Embodiment

With reference now to FIGS. 15-19, an additional embodiment of a gaming device according to the present invention is shown. Gaming device 1500 has a gaming display device 1502. Gaming device 1500 can be a bonus game that can be mounted in a housing 1001 in conjunction with a gaming apparatus 202 as shown in FIG. 7. A front panel 1503 is mounted to housing 1001.

Gaming display device 1502 can have a belt or band 240 that is supported for rotational movement by rollers 246. Band 240 can have and outside surface 240A, an inner surface 240B, a pair of outer peripheral edges or sides 240C and 240D and a display surface 241. Band 240 can be a flexible belt that is formed in a continuous loop. Band 240 can be formed from any suitable material such as rubber or plastic. Band 240 can be partially transparent such that band 240 can be backlit by lights 330 that are mounted in a housing 328 as was previously described. Controller 360 is in communication with lights 330 and can control the operation of lights 330. Band 240 can have a display surface 241. Various indicia 244 are arranged in rows 1560 and columns 1570 on display surface 241 to form a matrix 1565. Indicia 244 can be printed on band 240.

Controller 360 can rotatably control the position of band 240 using an actuator 310 driving driven roller 320 in the same manner as previously described for FIG. 7. Controller 360 is in communication with actuator 310. The position of band 240 can be monitored by controller 360 using a sensor formed by source 362 and detector 364.

Gaming display device 1502 can include several band guide portions, guide channels or guide tracks 1520. Guide tracks 1520 can be mounted to housing 1001 and extend along all or a portion of each edge 240C and 240D of band 240. Guide tracks 1520 are used to guide and form band 240 into a variety of shapes as band 240 is moved or rotated by actuator 310. For example, guide tracks 1520 can guide band 240 inwardly such that a concave area 1510 is formed by band 240. Guide tracks 1520 can have a curved, arched, straight or rounded shape. Guide tracks 1520 can guide portions of band 240 into other shapes such as convex areas or areas with various degrees of sloping, flat or curved surfaces. Guide tracks 1520 can be made from various materials such as metal or plastic. The use of guide tracks 1520 can eliminate the use of the central roller 246 (FIG. 7). Guide tracks 1520 can shape band 240 into complex shapes that cannot be formed by the use of rollers alone. The use of guide tracks 1520 can also reduce wear on band 240.

Figure 18:
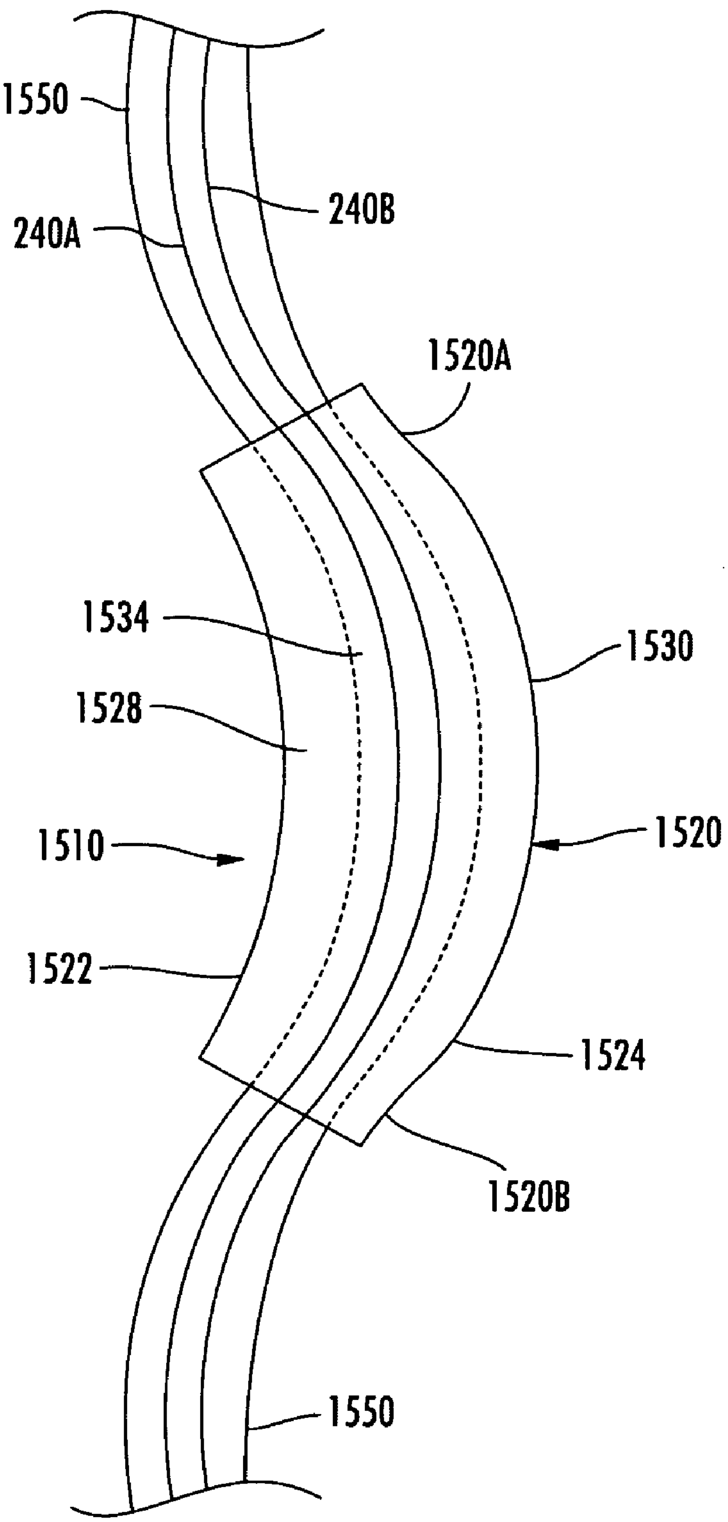
FIG. 18 is substantially a side view of a guide track and band.
Figure 19:
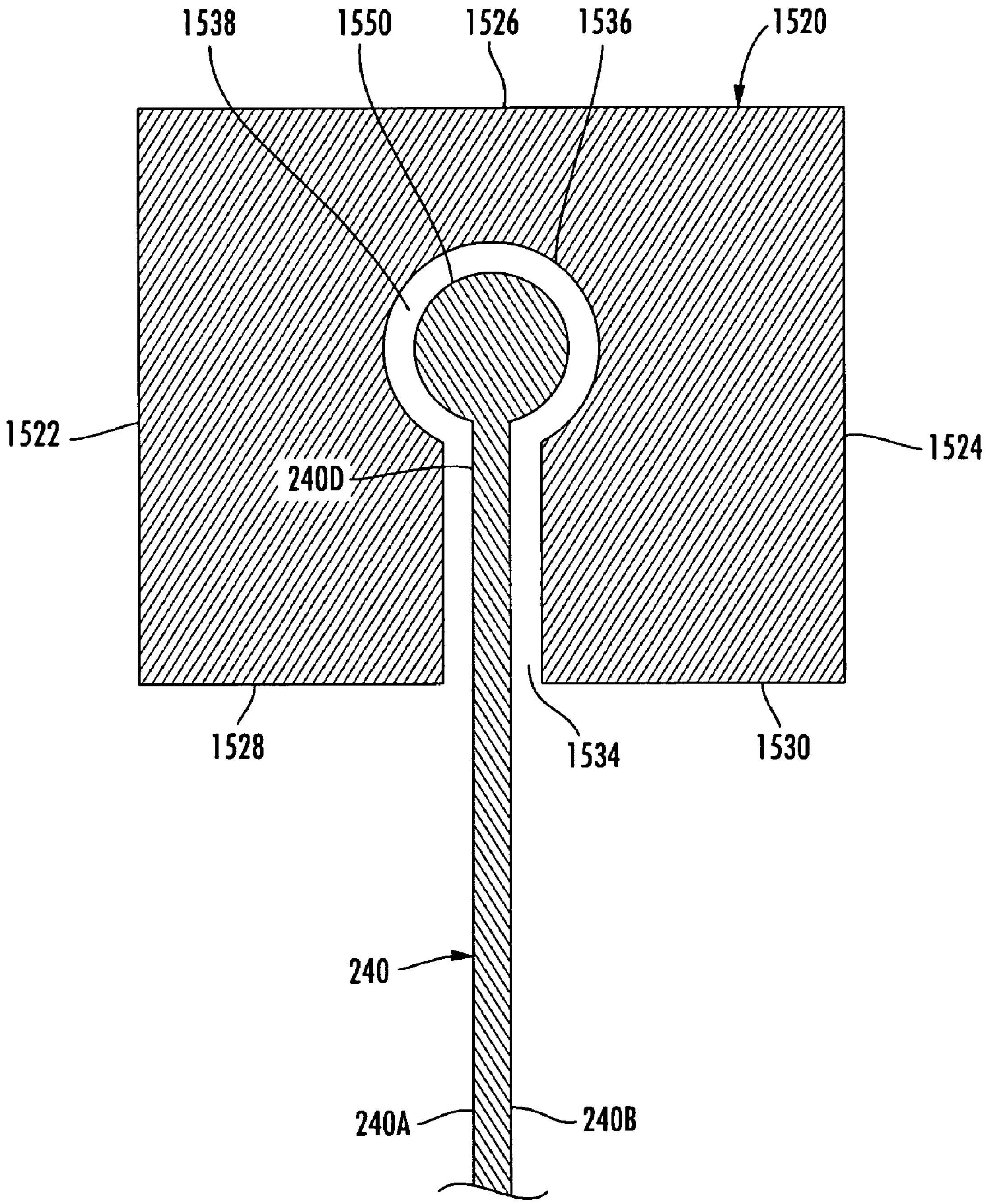
FIG. 19 is substantially a cross-sectional view of a guide track and band.

FIGS. 18 and 19 show two different cross-sectional views of guide track 1520 and band 240. Guide track 1520 can include ends 1520A and 1520B and side sections 1522 and 1524 that extend from an outer end section 1526. Inner ends 1528 and 1530 face toward band 240. A channel or slot 1534 is located between side sections 1522 and 1524. A spherical, circular or rounded portion 1536 may be formed in guide track 1520 and may be connected with slot 1534.

A ball or bead 1550 is formed on sides or edges 240C and 240D of band 240. Bead 1550 has a larger dimension than the width of slot 1534. Therefore, bead 1550 fits into and is retained in circular portion 1536. A gap 1538 is formed between bead 1550 and circular portion 1536. As band 240 is moved by controller 360 and actuator 310, bead 1550 slides through circular portion 1536 along the length of guide track 1520 and is moved inwardly or positioned to form a concave area or cavity 1510. Guide tracks 1520 can be used to form or position band 240 into other shapes such as convex, sloped or flat.

While guide tracks 1520 were shown to form the shape of band 240, a series of rollers (not shown) positioned on each side of the belt could also be used to form the shape of band 240.

After band 240 is stopped, a game outcome 1580 (FIG. 15) can be conveyed or indicated by illuminating a portion or set of lights 330 behind band 240. In the example shown in FIG. 15, the indicium 244 having a value of 60 credits is shown illuminated as the game outcome. Controller 360 can control and select the movement and stop position of band 240 and further can control the illumination of lights 330.

Figure 20:
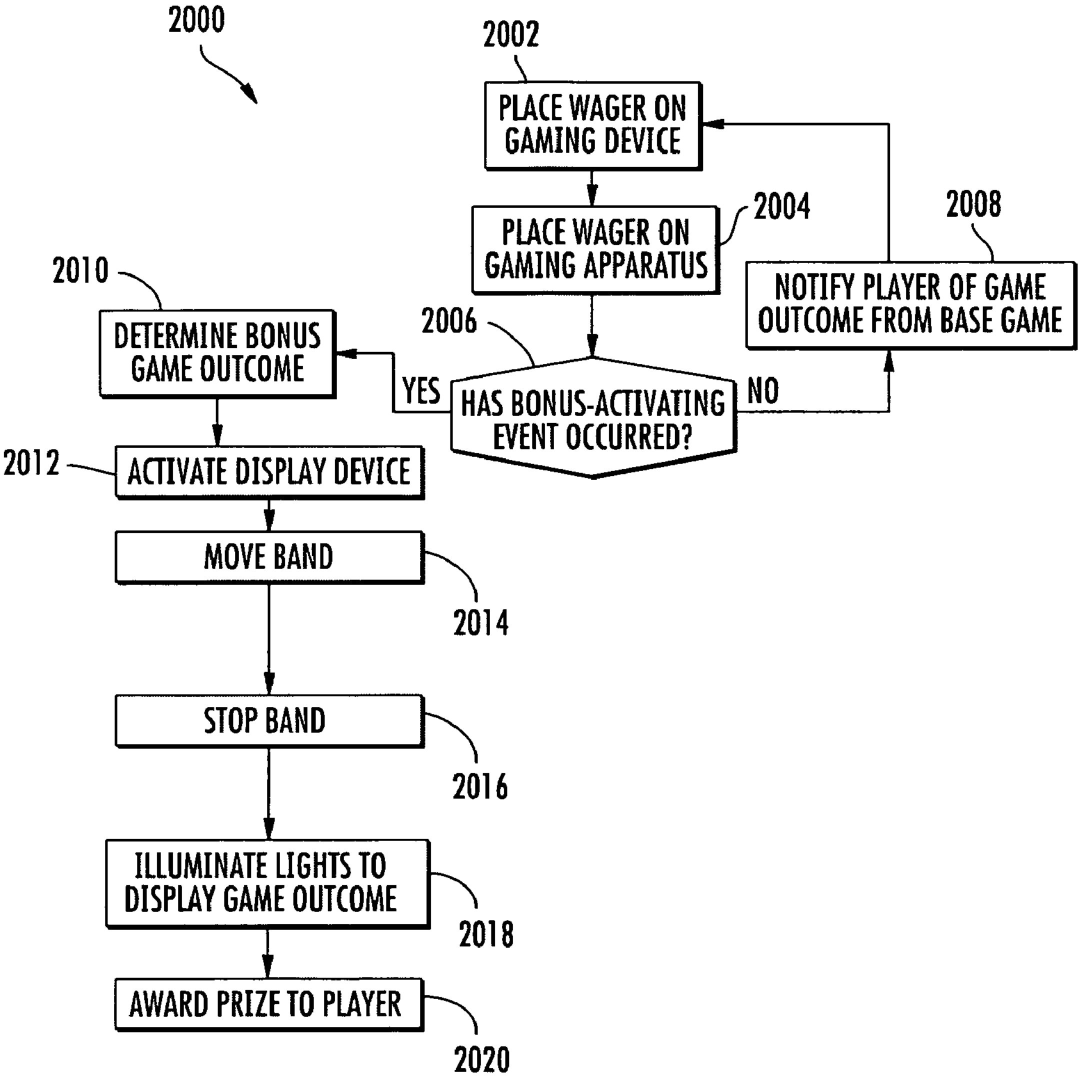
FIG. 20 is substantially a flowchart of a gaming method according to the present invention using the apparatus of FIGS. 15-19.

A method of operating gaming device 1500 of FIGS. 15-19 is shown in FIG. 20. In method 2000, a player places a wager on a primary gaming device at step 2002. At step 2004, the player plays a base game on the base gaming apparatus 202 (FIG. 7). At decision 2006, method 2000 checks to see if the game outcome determined in step 2004 is an outcome qualifying the player to play a bonus game. If not, method 2000 proceeds to step 2008 and notifies the player of the game outcome determined in step 2004, and returns to step 2002.

If it is determined in step 2006 that the game outcome of step 2004 qualifies the player for a bonus game, method 2000 proceeds to step 2010. At step 2010, the bonus game outcome is determined. At step 2012, gaming display device 1502 is activated. This may include activation of band 240 and lights 330. Other lights and sounds may also be activated to make the event more exciting to the player and those around the player, as well as to call attention to the device.

Method 2000 then proceeds to step 2014 where band 240 is moved or rotated. This may include using guide tracks 1520 to form band 240 into various shapes. At step 2016, band 240 is stopped. A portion of lights 330 are illuminated behind one of the indicia 244 on band 240 at step 2018. Method 2000 then awards any prizes to the player in step 2020.

Waterfall Game Embodiment

With reference now to FIGS. 18-19 and 21-23, an additional embodiment of a gaming device 2100 according to the present invention is shown. Gaming device 2100 has a gaming display device 2102. Gaming device 2100 can be a bonus game that can be mounted in a housing 1001 in conjunction with a gaming apparatus 202 as shown in FIG. 7. A front panel 1503 is mounted to housing 1001.

Game display device 2102 can have a prize band 240 that is supported for rotational movement by rollers 246 and guide tracks 1520. Band 240 can have a display surface 241. Band 240 can have and outside surface 240A, an inner surface 240B and a pair of outer peripheral edges or sides 240C and 240D. Band 240 can have a bead 1550 that is retained by guide track 1520 as was previously described in FIGS. 18 and 19. Bead 1550 can cause band 240 to slide through guide track 1520.

Band 240 can be a flexible belt. Band 240 can be driven by controller 360 and actuator 310. Band 240 can be backlit by lights 330 that are mounted in a housing 328 as was previously described. Various indicia 2130 can be displayed at prize positions 2125 on display surface 241. Prize positions 2125 can simulate or appear to be rocks printed on display surface 241.

Gaming device 2100 can have a game theme of a waterfall such as Niagara Falls. Gaming device 2100 can include various waterfall features such as a falling river or rapids 2110, waterfall 2115 and a pool 2120. Display surface 241 can be printed to resemble water. When band 240 is moved, the water can appear to move to an observer. A pool of water 2120 can be formed by a flat panel mounted in front of band 240.

A falling river or rapids 2110 can be formed by the combination of several rollers 246 and several guide tracks 1520 at the top of gaming display device 2102. Rollers 246 and guide tracks 1520 cause band 240 to move or undulate up and down as band 240 is rotated or moved. Rollers 246 guide band 240 upwardly forming a convex portion 1509 and guide tracks 1520 guide band 240 downwardly forming concave portions 1510. Display surface 241 undulates between rollers 246 and guide tracks 1520. The movement of band 240 over rollers 246 and through guide tracks 1520 appears to simulate the motion of a river with rapids.

Figure 23:
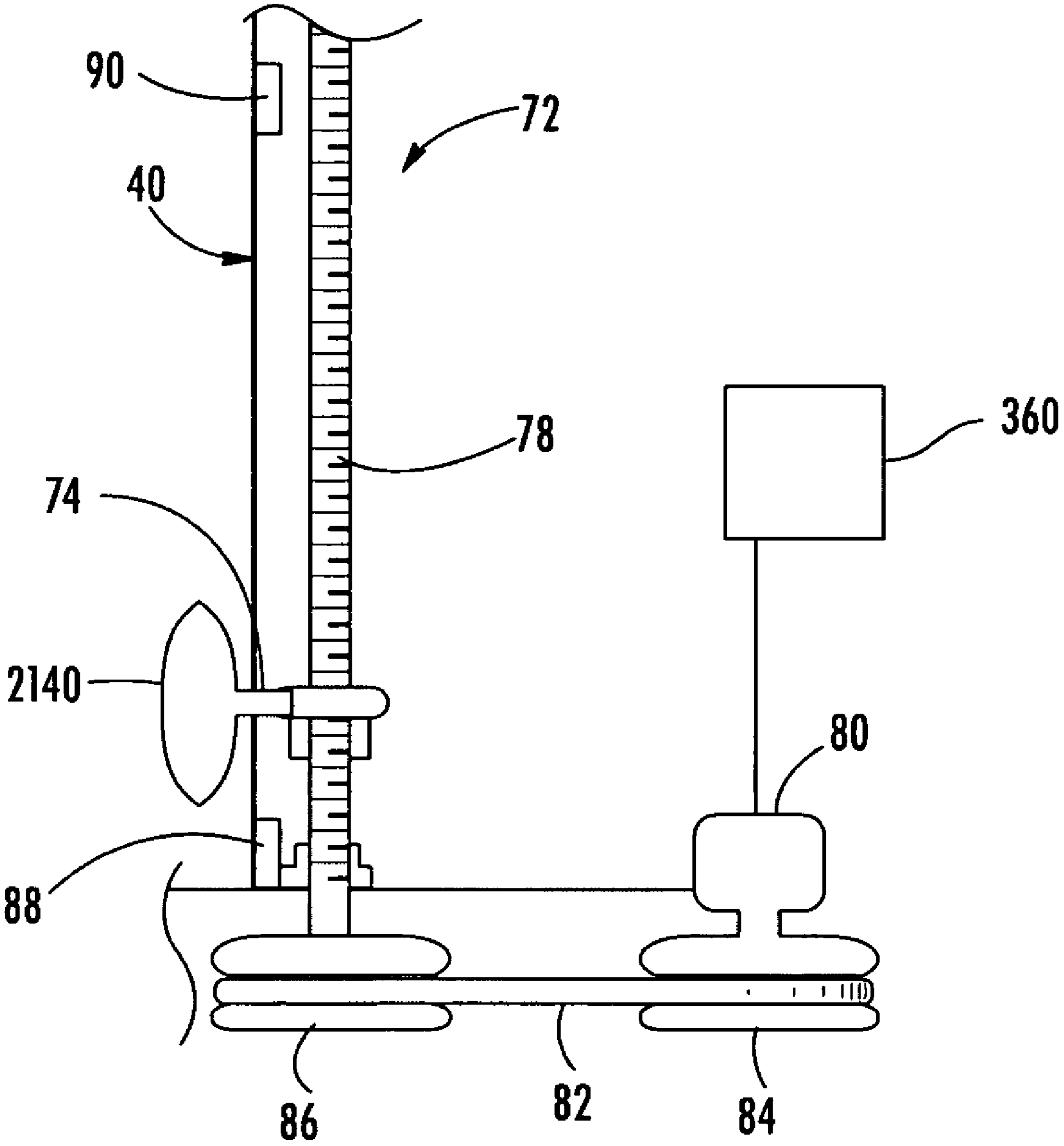
FIG. 23 is substantially a side elevation view of one embodiment of a positioning mechanism of the present invention.

A moveable mechanical indicator 2140 can be mounted to housing 1001 between pool panel 2120 and band 240. Indicator 2140 can appear to be a boat such as a rescue boat or a fishing boat. As shown in FIG. 23, indicator 2140 may be coupled to a positioning mechanism 72 by a bracket 74. Positioning mechanism 72 may be located within the confines of housing 1001. Positioning mechanism 72 may comprise a worm gear 78 that is rotatable by an actuator 80.

In at least one embodiment, actuator 80 is attached to a first wheel 84. Worm gear 78 may be attached to a second wheel 86. A drive belt 82 may rotate around the first wheel 84 and second wheel 86, thereby connecting actuator 80 and worm gear 78. Positioning mechanism 72 may communicate with a controller 360, which may store information regarding predetermined positions of band 240. Sensors 88 and 90 can be in communication with controller 360 and may be provided to allow controller 360 to detect the position of indicator 2140. Other devices may be used to detect the position of the indicator, such as optical readers.

Lights 2145 can be mounted on indicator 2140. Lights 2145 can be light emitting diodes and can be connected with and controlled by controller 360.

Figure 21:
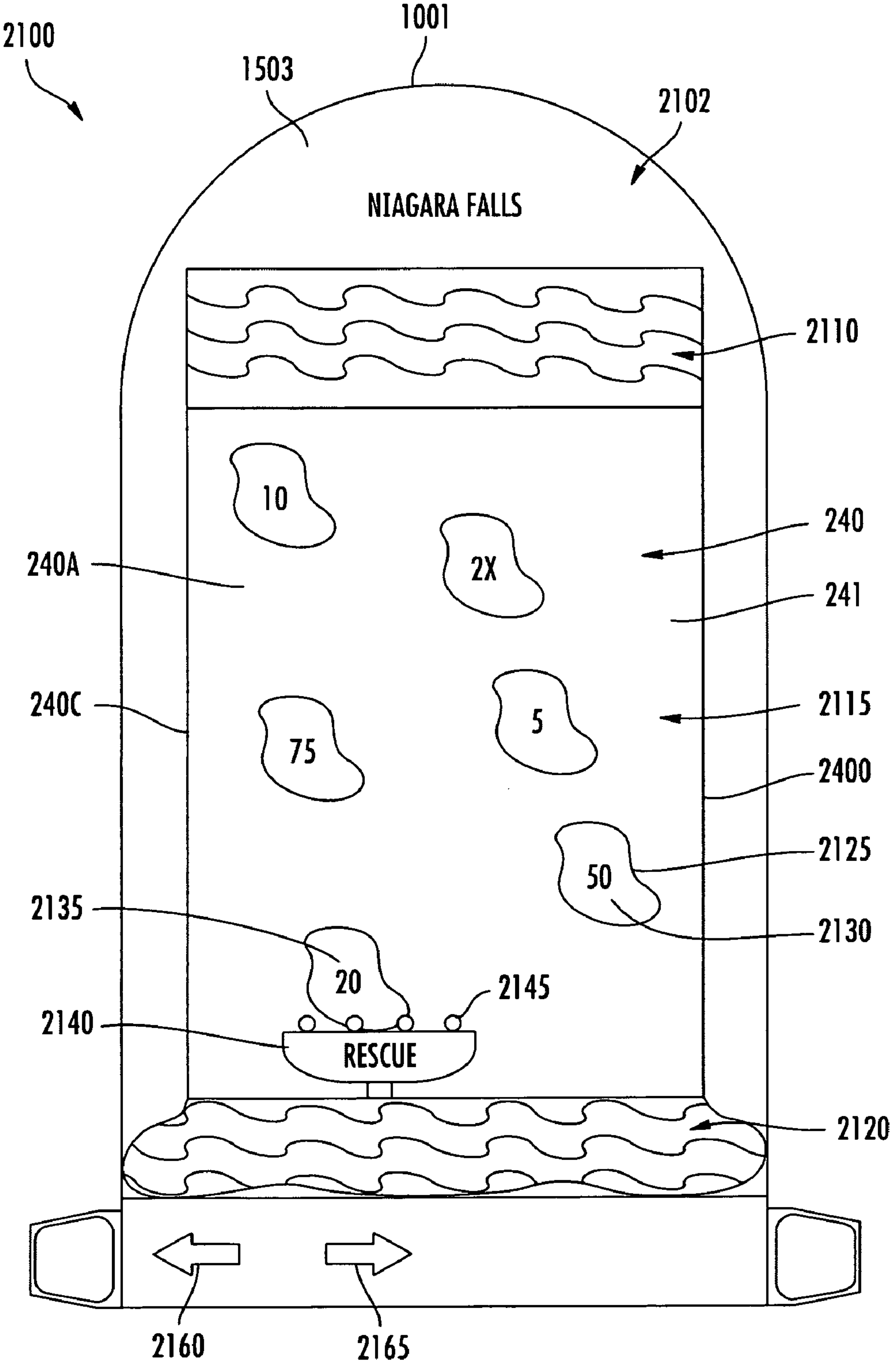
FIG. 21 is substantially a front view of another embodiment of a gaming apparatus according to the present invention.
Figure 22:
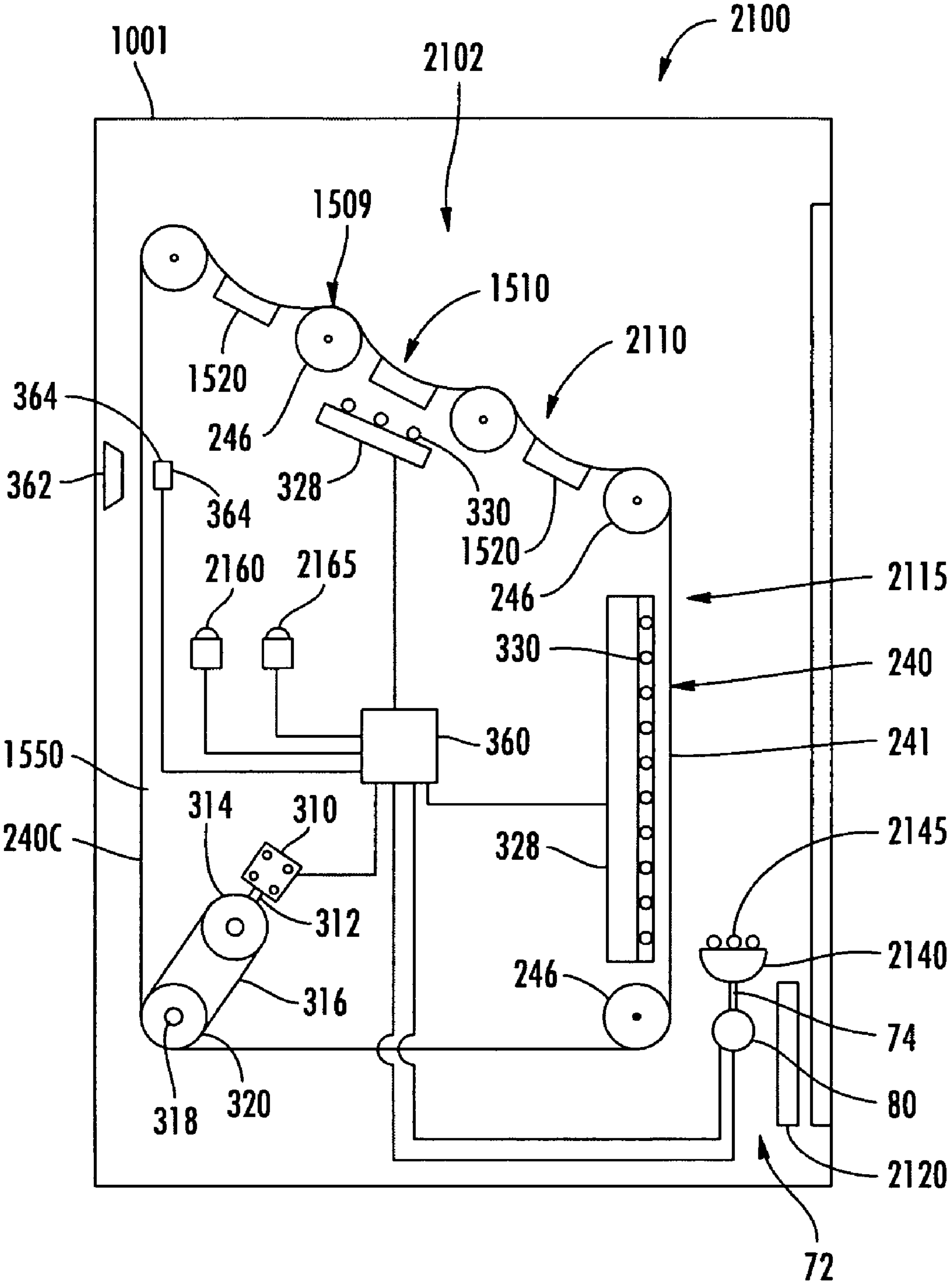
FIG. 22 is substantially a partial cross-sectional view of the gaming apparatus of FIG. 21.

With reference now to FIGS. 21 and 22, a game outcome 2135 can be conveyed or indicated by moving band 240 and indicator 2140, such that one of the prize positions 2125 are aligned above indicator 2140. Lights 2145 can further be illuminated to draw attention to the game outcome. In the example shown in FIG. 21, indicator 2140 indicates the indicium 2135 having a value of 20 credits as the game outcome.

Player input devices 2160 and 2165 can be mounted to housing 1001. Player input devices 2160 and 2165 cart be buttons. Player input devices 2160 and 2165 can be used by a game player to control the position of indicator 2140. Player input device 2160 moves indicator 2140 to the left and player input device 2165 moves indicator 2140 to the right. After a player moves indicator 2140 using player input devices 2160 and 2165, controller 360 then moves and stops band 240 to select an indicium 2130 to be awarded.

Gaming device 2100 can be operated such that a player playing gaming device 2100 appears to view water falling over waterfall 2115 and a game outcome indicated by a boat 2140.

Figure 24:
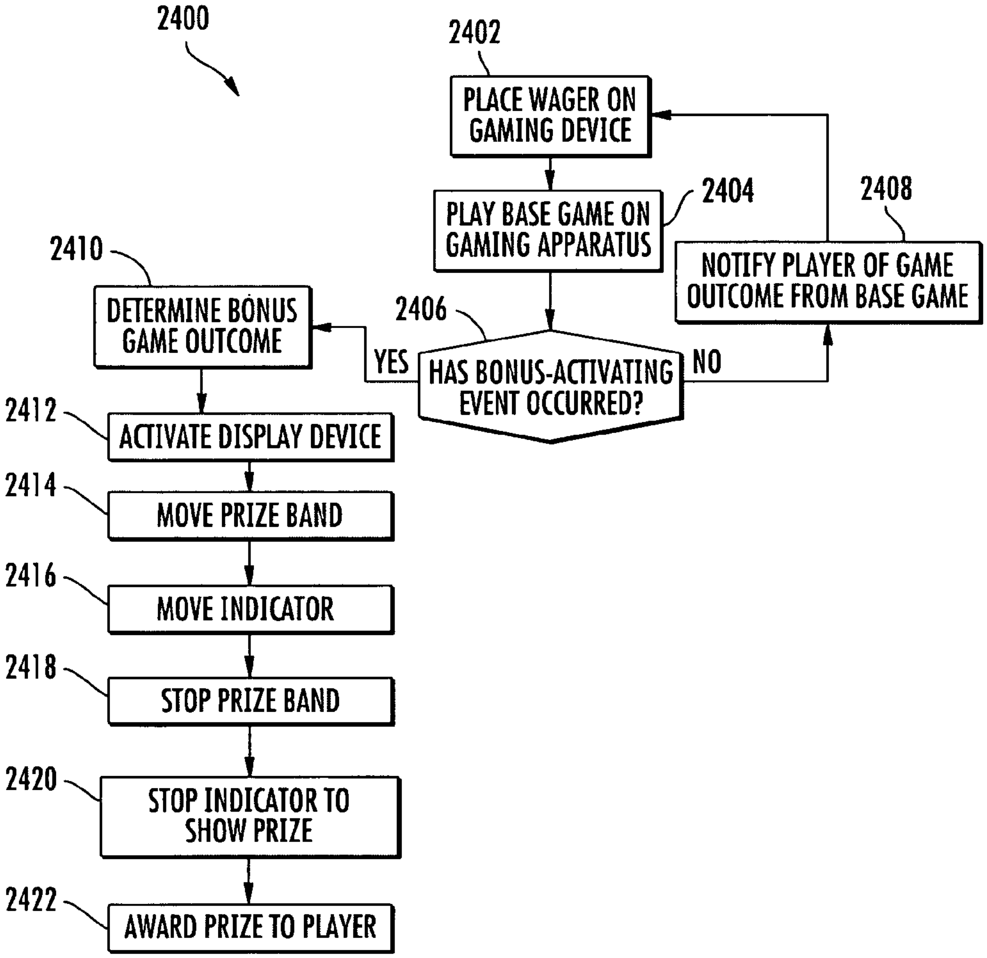
FIG. 24 is substantially a flowchart of a gaming method according to the present invention using the apparatus of FIGS. 21-23.

A method of operating gaming device 2100 of FIG. 21 is shown in FIG. 24. In method 2400, a player places a wager on a primary gaming device at step 2402. At step 2404, the player plays a base game on the base gaming apparatus 202 (FIG. 7). At decision 2406, method 2400 checks to see if the game outcome determined in step 2404 is an outcome qualifying the player to play a bonus game. If not, method 2400 proceeds to step 2408 and notifies the player of the game outcome determined in step 2404, and returns to step 2402.

If it is determined in step 2406 that the game outcome of step 2404 qualifies the player for a bonus game, method 2400 proceeds to step 2410. At step 2410, the bonus game outcome is determined. At step 2412, gaming display device 2102 is activated. This may include activation of band 240 and indicator 2140. Other lights and sounds may also be activated to make the event more exciting to the player and those around the player, as well as to call attention to the device.

Method 2400 then proceeds to step 2414, where band 240 is moved or rotated. At step 2416, indicator 2140 is moved. Band 240 is stopped at step 2418. Indicator 2140 can by stopped by controller 360 at step 2420. Method 2400 then awards any prizes indicated by the combination of the indicator 2140 and band 240 to the player in step 2422.

Figure 25:
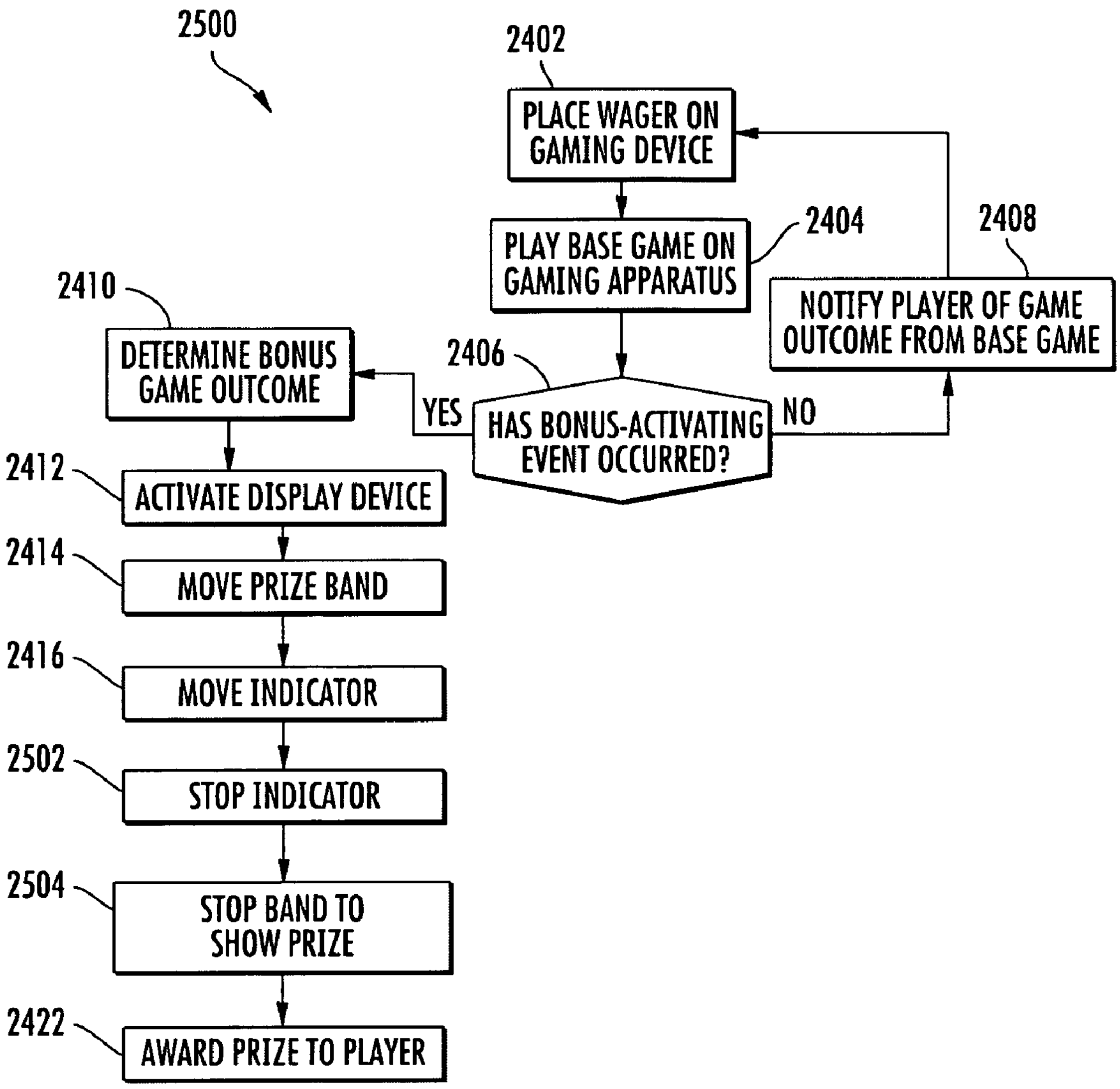
FIG. 25 is substantially a flowchart of another gaming method according to the present invention using the apparatus of FIGS. 21-23.

Another method of operating gaming device 2100 of FIG. 21 is shown in FIG. 25. In method 2500, a player places a wager on a primary gaming device at step 2402. At step 2404, the player plays a base game on the base gaming apparatus 202 (FIG. 7). At decision 2406, method 2500 checks to see if the game outcome determined in step 2404 is an outcome qualifying the player to play a bonus game. If not, method 2500 proceeds to step 2408 and notifies the player of the game outcome determined in step 2404, and then returns to step 2402.

If it is determined in step 2406 that the game outcome of step 2404 qualifies the player for a bonus game, method 2500 proceeds to step 2410. At step 2410, the bonus game outcome is determined. At step 2412, gaming display device 2102 is activated. This may include activation of band 240 and indicator 2140. Other lights and sounds may also be activated to make the event more exciting to the player and those around the player, as well as to call attention to the device.

Method 2500 then proceeds to step 2414, where band 240 is moved or rotated. At step 2416, indicator 2140 is moved. Indicator 2140 can by stopped by controller 360 at step 2502. Band 240 is stopped at step 2504. Method 2500 then awards any prizes indicated by the combination of the indicator 2140 and band 240 to the player in step 2422.

Vehicle Game Embodiment

Figure 26:
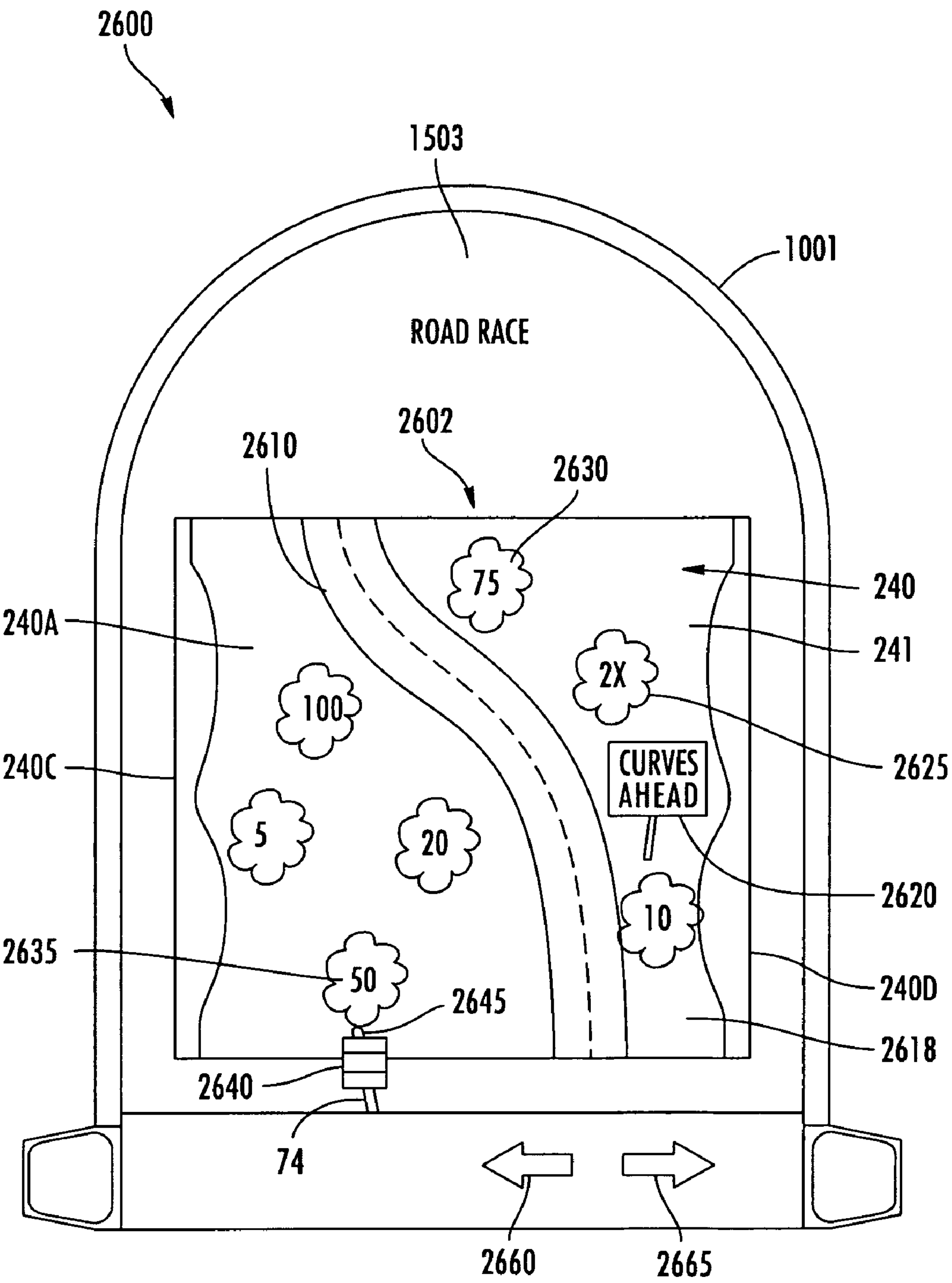
FIG. 26 is substantially a front view of another embodiment of a gaming apparatus according to the present invention.
Figure 27:
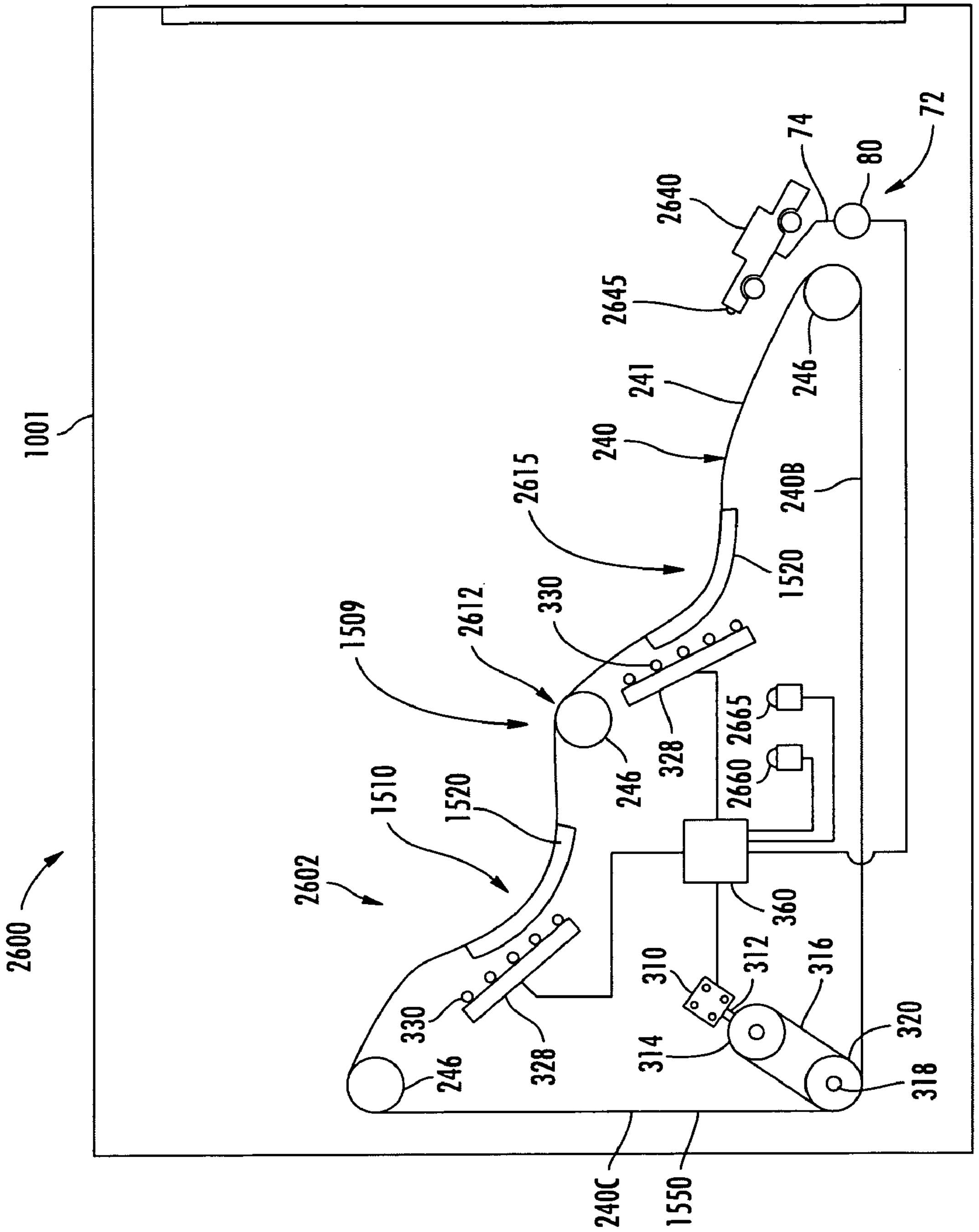
FIG. 27 is substantially a partial cross-sectional view of the gaming apparatus of FIG. 26.

Turning to FIGS. 26 and 27, an additional embodiment of a gaming device 2600 according to the present invention is shown. Gaming device 2600 has a gaming display device 2602. Gaming device 2600 can be a bonus game that can be mounted in a housing 1001 in conjunction with a gaming apparatus 202 as shown in FIG. 7. A front panel 1503 is mounted to housing 1001.

Gaming display device 2602 can have a prize band 240 that is supported for rotational movement by rollers 246 and guide tracks 1520. Band 240 can have a display surface 241. Band 240 can be a flexible belt. Band 240 can have and outside surface 240A, an inner surface 240B and a pair of outer peripheral edges or sides 240C and 240D. Band 240 can have a bead 1550 that is retained by guide track 1520 as was previously described in FIGS. 18 and 19. Bead 1550 can cause band 240 to slide through guide track 1520.

Band 240 can be backlit by lights 330 that are mounted in a housing 328 as was previously described. Various prize indicia 2630 can be displayed at prize positions 2625 on display surface 241. Prize positions 2625 can simulate or appear to be trees printed on display surface 241.

Gaming device 2600 can have a game theme of a car driving on a road or a race track. Gaming device 2600 can include various road features such as a road 2610, hills 2612, dips in the road 2615, grass or field areas 2618 and road signs 2620. Display surface 241 can be printed with the various road features.

Convex hills 2612 can be formed in road 2610 by band 240 passing over rollers 246. Concave dips 2615 can be formed by band 240 moving through guide tracks 1520 causing band 240 to be guided downwardly. Rollers 246 and guide tracks 1520 cause band 240 to move or undulate up and down as band 240 is rotated or moved. Rollers 246 guide band 240 upwardly forming a convex portion 1509 and guide tracks 1520 guide band 240 downwardly forming concave portions 1510. The movement of band 240 through rollers 246 and guide tracks 1520 appears to simulate the motion of a winding road with dips and hills.

A vehicle or mechanical indicator 2640 can be mounted to housing 1001 in front of display 240. Indicator 2640 can appear to be a vehicle such as a car or truck. Indicator 2640 can also be formed to simulate other vehicles such as a boat, plane, train or motorcycle. Indicator 2640 can be coupled to and moved by a positioning mechanism 72 through a bracket 74. Indicator 2640 and positioning mechanism 72 can operate the same as previously described for indicator 2140 of FIG. 23. The position of indicator 2640 can be controlled by controller 360 and actuator 80. Lights 2645 can be mounted on indicator 2640. Lights 2645 can be light emitting diodes and can be connected with and controlled by controller 360.

With continued reference to FIGS. 26 and 27, a game outcome 2635 can be indicated by moving band 240 and indicator 2640, such that one of the prize positions 2625 are aligned above indicator 2640. Lights 2645 can further be illuminated to draw attention to the game outcome. In the example shown in FIG. 26, indicator 2640 indicates the indicium 2635 having a value of 50 credits as the game outcome. The game outcome is indicated by the combination of the indicia on the display surface and the indicator. The movement of band 240 behind car 2640 can simulate the motion of a car traveling down a road.

Player input devices 2660 and 2665 can be mounted to housing 1001. Player input devices 2660 and 2665 can be buttons. Player input devices 2660 and 2665 can be used by a game player to control the position of indicator 2640. Player input device 2660 moves indicator 2640 to the left and player input device 2665 moves indicator 2640 to the right. After a player moves and stops indicator 2640 using player input devices 2660 and 2665, controller 360 then moves and stops band 240 to select an indicia 2630 to be awarded. Gaming device 2600 can be operated using the same methods that were shown in FIGS. 24 and 25 for gaming device 2100.

Snaking Band Embodiment

Figure 28:
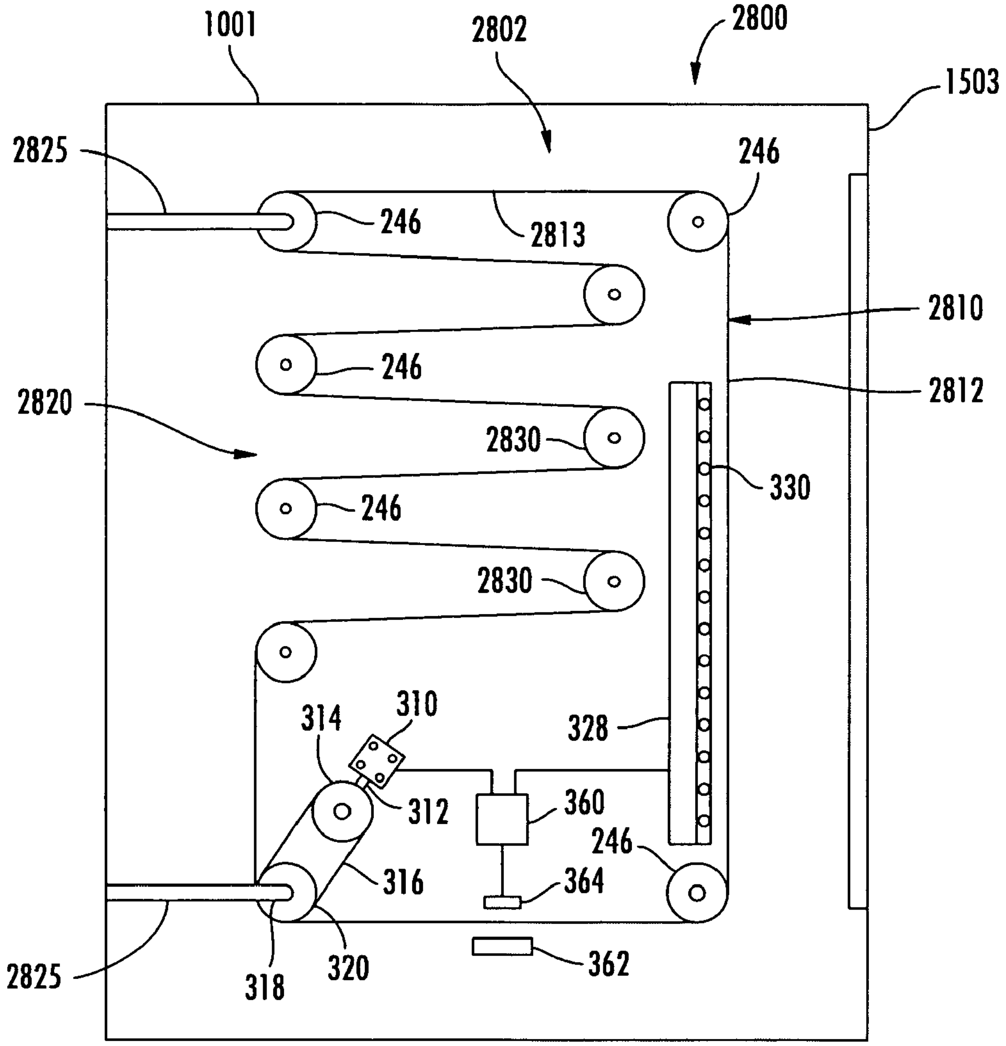
FIG. 28 is substantially a partial cross-sectional view of another embodiment of a gaming apparatus according to the present invention.

FIG. 28 shows another embodiment of a gaming device in accordance with the present invention. Gaming device 2800 has a gaming display device 2802. Gaming device 2800 can be a bonus game that can be mounted in a housing 1001 in conjunction with a gaming apparatus 202 as shown in FIG. 7. A front panel 1503 is mounted to housing 1001.

Game display device 2802 can have a flexible belt or prize band 2810 that is significantly longer than the prize band 240 of FIGS. 7 and 8. Band 2810 is supported for rotational movement by sets of rollers 246 and 2830. Rollers 246 are in contact with inner surface 2813 and rollers 2830 are in contact with outer display surface 2812. Band 2810 can have an outer display surface 2812 and an inner surface 2813. Band 2810 can be a continuous flexible belt. Band 2810 may have portions that are at least partially transparent.

Gaming display device 2802 may be mounted in housing 1001 using brackets 2825. Brackets 2825 may be connected between idle rollers 246 and driven roller 320 and housing 1001. Several brackets may be used to attach gaming display device 2802 within housing 1001.

Band 2810 can be backlit by lights 330 that are mounted in a housing 328 as was previously described. Band 2810 can be moved or rotated by controller 360 causing actuator 310 to rotate driven roller 320. Source 362 and detector 364 can provide controller 360 with a position signal about the position of band 2810.

Gaming display device 2802 can have a band guide section 2820 that causes the band to move back and forth or to move in a snake-like manner. Band section 2820 may have dozens or hundreds of rollers. The band is woven around rollers 2830. Band guide section 2820 comprises rollers 246 and 2830 that band 2810 rolls over. The use of band guide band guide section 2820 within housing 1001 allows for a longer length of band 2810. Because band 2810 is longer, a larger number of indicia can be displayed on band 2810. One of the indicia on band 2810 can be indicated as a prize or game outcome. Band 2810 can be used in place of band 240 in the gaming device embodiments that were previously described. Guide tracks (not shown) could also be used with band 2810.

Rollers 246 and 2830 could also be arranged in band guide section 2820 such that the band, moves vertically between rollers instead of horizontally as shown in FIG. 28.

Reel to Reel Embodiment

Figure 29:
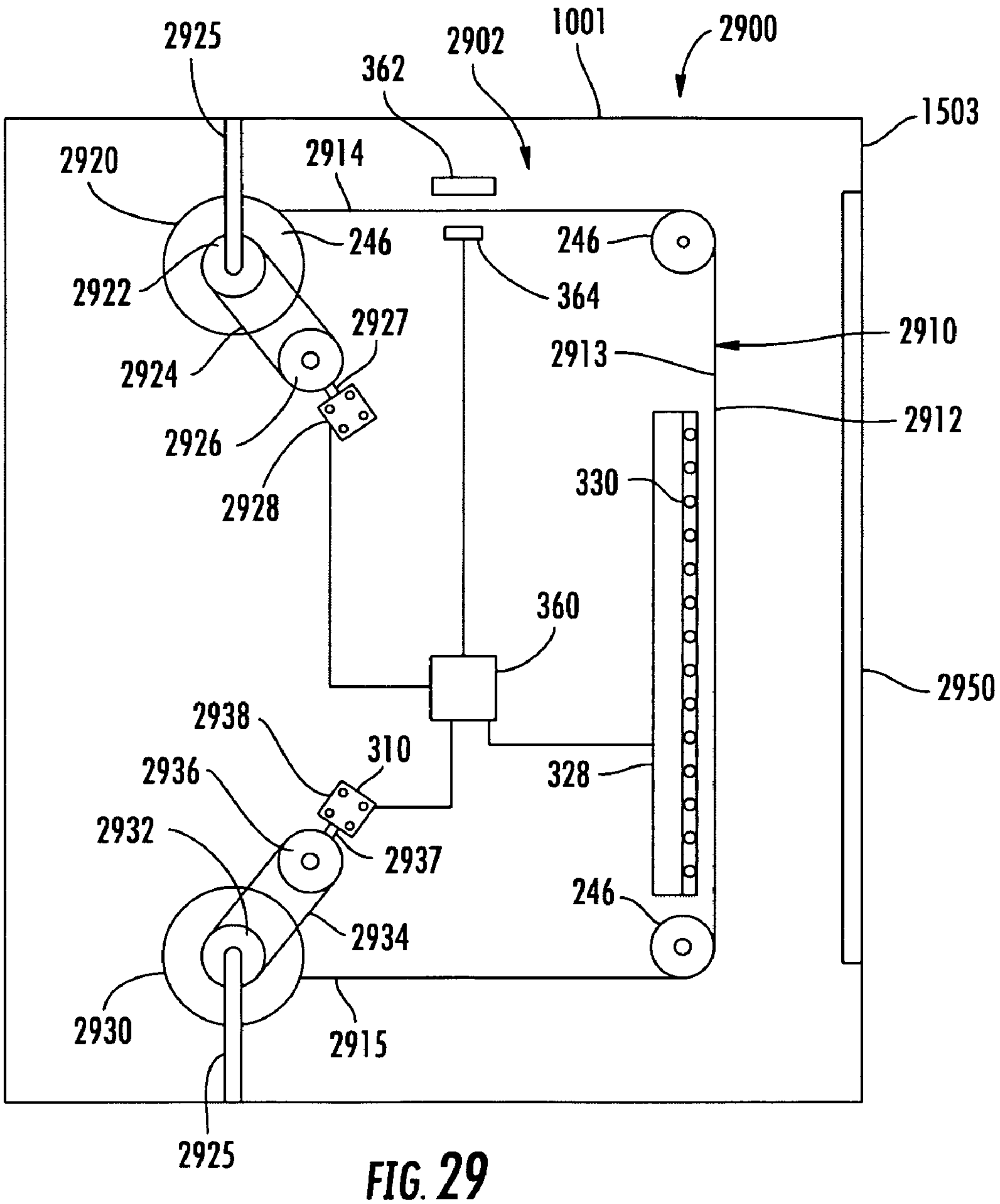
FIG. 29 is substantially a partial cross-sectional, view of another embodiment of a gaming apparatus according to the present invention.

FIG. 29 shows another embodiment of a gaming device 2900 in accordance with the present invention. Gaming device 2900 has a gaming display device 2902. Gaming device 2900 can be a bonus game that can be mounted in a housing 1001 in conjunction with a primary gaming apparatus 202 as shown in FIG. 7. A front panel 1503 is mounted to housing 1001.

Gaming display device 2902 can have rolls or reels of a wide band or belt of flexible material 2910 that is significantly longer than prize band 240 of FIGS. 7 and 8. Wide band or flexible belt 2910 is supported for movement between reels 2920 and 2930. Wide belt 2910 is wound on reels 2920 and 2930. Wide belt 2910 can have an end 2914 and an end 2915. End 2914 can be wound onto reel 2920 and end 2915 can be wound onto reel 2930. Wide belt 2910 can have an outer display surface 2912 and an inner surface 2913. Wide belt 2910 can have portions that are at least partially transparent. Wide belt 2910 can be backlit by lights 330 that are mounted in a housing 328 as was previously described. Wide belt 2910 can also contain a wide variety of indicia (not shown) as was previously described in conjunction with band 240.

Gaming display device 2902 may be mounted in housing 1001 using brackets 2925. Brackets 2925 may be connected between reels 2920, 2930 and housing 1001. Several brackets may be used to attach gaming display device 2902 within housing 1001.

Reel 2920 is driven by an actuator 2928. Actuator 2928 may be any number of suitable actuators, such as motors, including stepper motors, gear motors, and servo motors. Actuator 2928 may rotate a shaft 2927 in connection with a wheel 2926. A belt 2924 may link wheel 2926 to another wheel 2922. Wheel 2922 is connected to reel 2920. Rotation of shaft 2927 drives wheel 2926, which in turn drives wheel 2922 and reel 2920. Therefore, actuator 2928 can rotate reel 2920. The rotation of actuator 2928 can be reversed such that reel 2920 can be rotated in both directions. Optionally, an idler wheel or pulley (not shown) can be included on the opposing side of a portion of wide belt 2910 in order to take up any slack and maintain proper tension on wide belt 2910.

Another reel 2930 is driven by an actuator 2938. Actuator 2938 may be any number of suitable actuators, such as motors, including stepper motors, gear motors, and servo motors. Actuator 2938 may rotate a shaft 2937 in connection with a wheel 2936. A belt 2934 may link wheel 2936 to another wheel 2932. Wheel 2932 is connected to reel 2930. Rotation of shaft 2937 drives wheel 2936 which in turn drives wheel 2932 and reel 2930. Therefore, actuator 2938 can rotate reel 2930. The rotation of actuator 2938 can be reversed such that reel 2930 can be rotated in both directions.

Actuators 2928 and 2938 are in communication with and can be controlled by controller 360. Source 362 and detector 364 can provide controller 360 with a position signal about the position of wide belt 2910.

Controller 360 can cause actuators 2928 and 2938 to rotate in a coordinated manner such that wide belt 2910 passes over rollers 246 and can be viewed through a transparent window 2950 by a game player. Wide belt 2910 would be unwound from reel 2920 and wound on reel 2930. When the wide belt 2910 approaches the end of its length, source 362 and detector 364 provide controller 360 with a signal that the end of the wide belt 2910 is approaching. Controller 360 then reverses the rotational direction of reels 2920 and 2930 such that wide belt 2910 is unwound from reel 2930 and wound onto reel 2920. The direction of rotation of the reels would be reversed each time that the end of the length of wide belt 2910 is approaching.

The use of reels 2920 and 2930 allows for a longer length of flexible belt or band material 2910 to be stored on gaming device 2900. Because wide belt 2910 is longer, a larger number of indicia can be displayed on wide belt 2910. One of the indicia on wide belt 2910 can be indicated as a prize or game outcome. Wide belt 2910 can be used in place of band 240 in the gaming device embodiments that were previously described.

Figure 30:
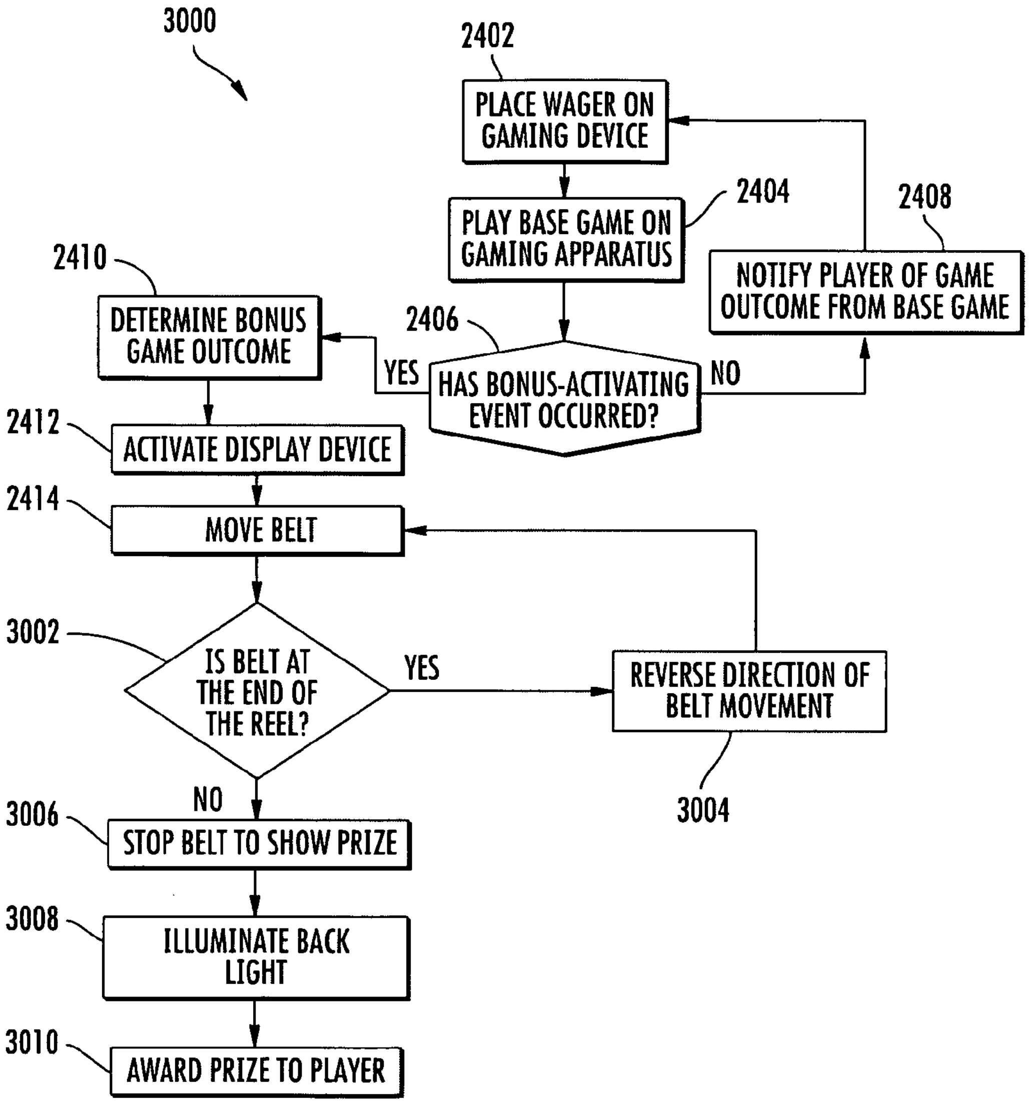
FIG. 30 is substantially a flowchart of a gaming method according to the present invention using the apparatus of FIG. 29.

A method of operating gaming device 2900 of FIG. 29 is shown in FIG. 30. In method 3000, a player places a wager on a primary gaming apparatus at step 2402. At step 2404, the player plays a base game on the base gaming apparatus 202 (FIG. 7). At decision 2406, method 3000 checks to see if the game outcome determined in step 2404 is an outcome qualifying the player to play a bonus game. If not, method 3000 proceeds to step 2408 and notifies the player of the game outcome determined in step 2404, and returns to step 2402.

If it is determined in step 2406 that the game outcome of step 2404 qualifies the player for a bonus game, method 3000 proceeds to step 2410. At step 2410, the bonus game outcome is determined. At step 2412, gaming display device 2902 is activated. This may include rotation of reels 2920 and 2930, movement of belt 2910, and activation of lights 330. Other lights and sounds may also be activated to make the event more exciting to the player and those around the player, as well as to call attention to the device.

Method 3000 then proceeds to step 2414, where wide belt 2910 is moved. At decision step 3002, controller 360 checks to see if wide belt 2910 is approaching one end or the end of its length. If controller 360 detects the end of wide belt 2910 is approaching, method 3000 proceeds to step 3004, where the rotational direction of reels 2920 and 2930 is reversed. If controller 360 does not detect the end of wide belt 2910 approaching, method 3000 proceeds to step 3006 where wide belt 2910 is stopped. At step 3008, a portion of back lights 330 are illuminated behind wide belt 2910 such that a game outcome is indicated. Method 3000 in step 3010 then awards any prizes that were indicated to the player in step 3008.

In another method of playing gaming device 2900, belt 2910 may be advanced in one direction during a game sequence and then rewound when gaming device 2900 is not being played.

Various Band Shapes Embodiment

Figure 31:
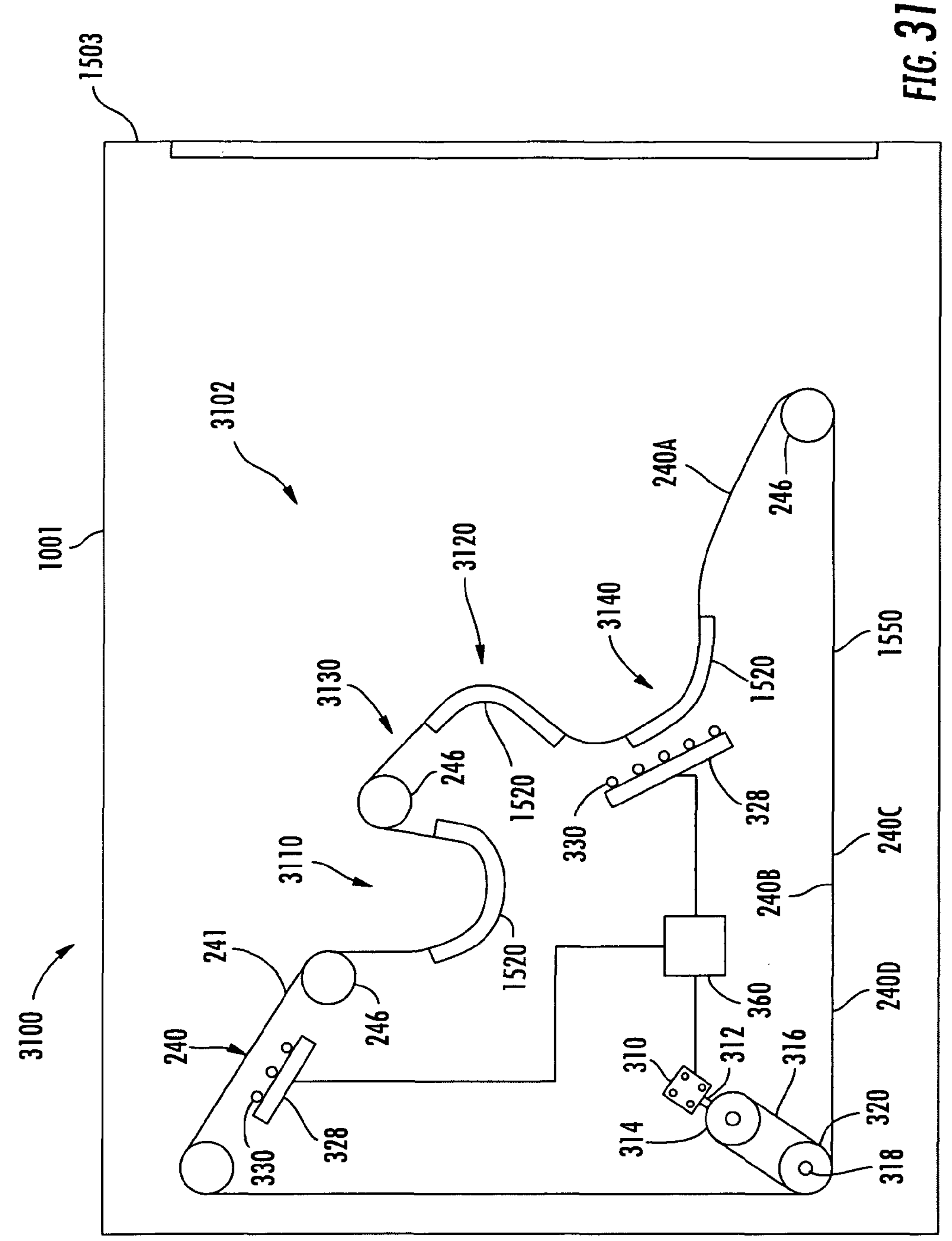
FIG. 31 is substantially a partial cross-sectional view of another embodiment of a gaming apparatus according to the present invention.

FIG. 31 shows another embodiment of a gaming device 3100 in accordance with the present invention. Gaming device 3100 has a gaming display device 3102. Gaming device 3100 can be a bonus game that can be mounted in a housing 1001 in conjunction with a primary gaming apparatus 202 as shown in FIG. 7. A front panel 1503 is mounted to housing 1001.

Gaming display device 3102 is similar to gaming display device 2602 of FIG. 27. Gaming display device 3102 has a rotatable band 240 that can be fashioned into a wide variety of shapes and sizes. Band 240 can have an outer surface 240A, inner surface 240B, a pair of side edges 240C and 240D. A Bead 1550 can be mounted to each of edges 240C and 240D.

Band 240 may be formed into sloped, concave, convex, arched and flat band shape. The various band shapes are produced using guide tracks 1520 and rollers 246. The use of guide tracks 1520 was previously described in conjunction with FIGS. 18 and 19. Indicia 244 can be disposed on band 240 as was shown in FIGS. 15 and 16.

For example in FIG. 31, a hidden U-shaped section 3110 is formed by rollers 246 and guide tracks 1520. Bidden section 3110 could be used to hide various indicia 244 (FIGS. 15 and 16) from a game player. Controller 360 may control actuator 310 such that band 240 is moved forward allowing a game player to view an indicia or may be moved backward where the indicia becomes hidden in U-shaped section 3110.

A convex section 3120 can be formed by guide tracks 1520. A concave section 3140 may be formed by guide tracks 1520. A flat section 3130 can be formed between guide tracks 1520 and roller 246. Therefore, band 240 may further be formed into a wide variety of shapes and sizes using guide tracks 1520 and rollers 246.

Community Game Embodiment

Figure 32:
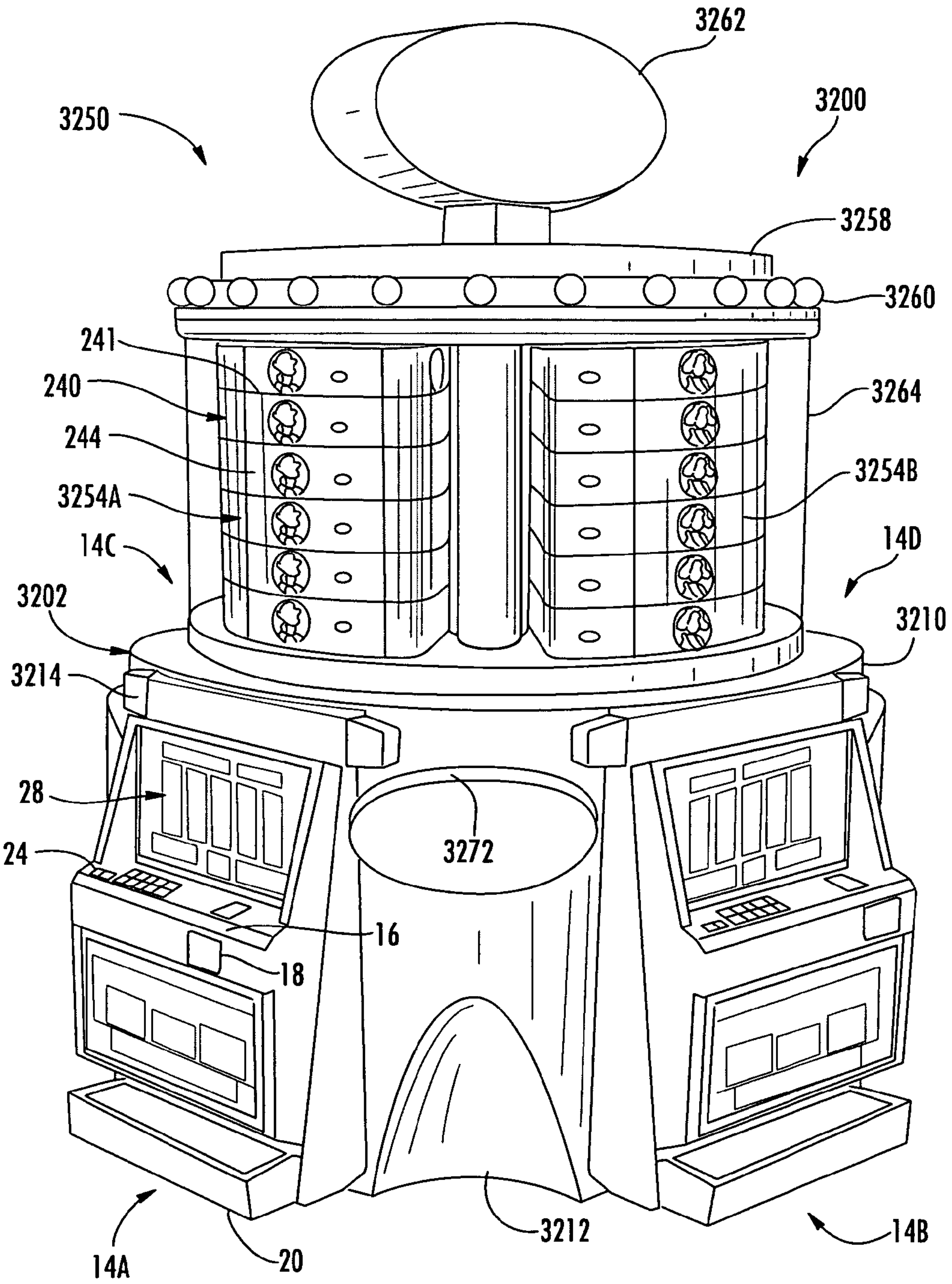
FIG. 32 is substantially a perspective view of an embodiment of a community gaming apparatus that can be played by several game players according to the present invention that uses several gaming devices.

FIG. 32 shows an alternative embodiment of a gaming apparatus 3200 in accordance with the present invention. Gaming apparatus 3200 has a base game or primary game device 3202 and a bonus game display device or community game device 3250. Gaming apparatus 3200 can connect several primary and bonus gaming devices forming a network of gaming devices.

Gaming apparatus 3200 can include a primary game device 3202 that can have four primary games or gaming devices 14A, B, C and D mounted in a housing 3210. Gaming apparatus 3200 is designed to be played by one or more game players. For example, four game players in total may play gaming apparatus 3200. Primary game 14 was previously described in conjunction with FIG. 1. Primary gaming devices 14A-D may be mounted in housing 3210 such that four primary games 14 face outwardly, only two of which are shown in FIG. 32. More or less than four primary games may be mounted in housing 3210. A decorative panel 3212 may be mounted to housing 3210 between adjacent primary games 3210. Speakers 3214 can be mounted to housing 3210 above each primary game.

Bonus game display device 3250 can be mounted to housing 3210 above primary games 14. Bonus game display device 3250 is circular in shape and can be viewed from any of primary gaming devices 14A-D. Bonus game display device 3250 may be encircled by a clear protective cover 3264 such that a game player may view bonus game display device 3250 through cover 3264. Cover 3264 can be formed from suitable materials such as plastic, acrylic or glass. A top cover 3258 may be mounted over bonus game display devices 3250. Several lights 3260 are mounted to top cover 3268. A sign 3262 can be mounted to top cover 3258. Lights 3260 and sign 3262 are used to draw the attention of game players to gaming device 3200.

Figure 33A:
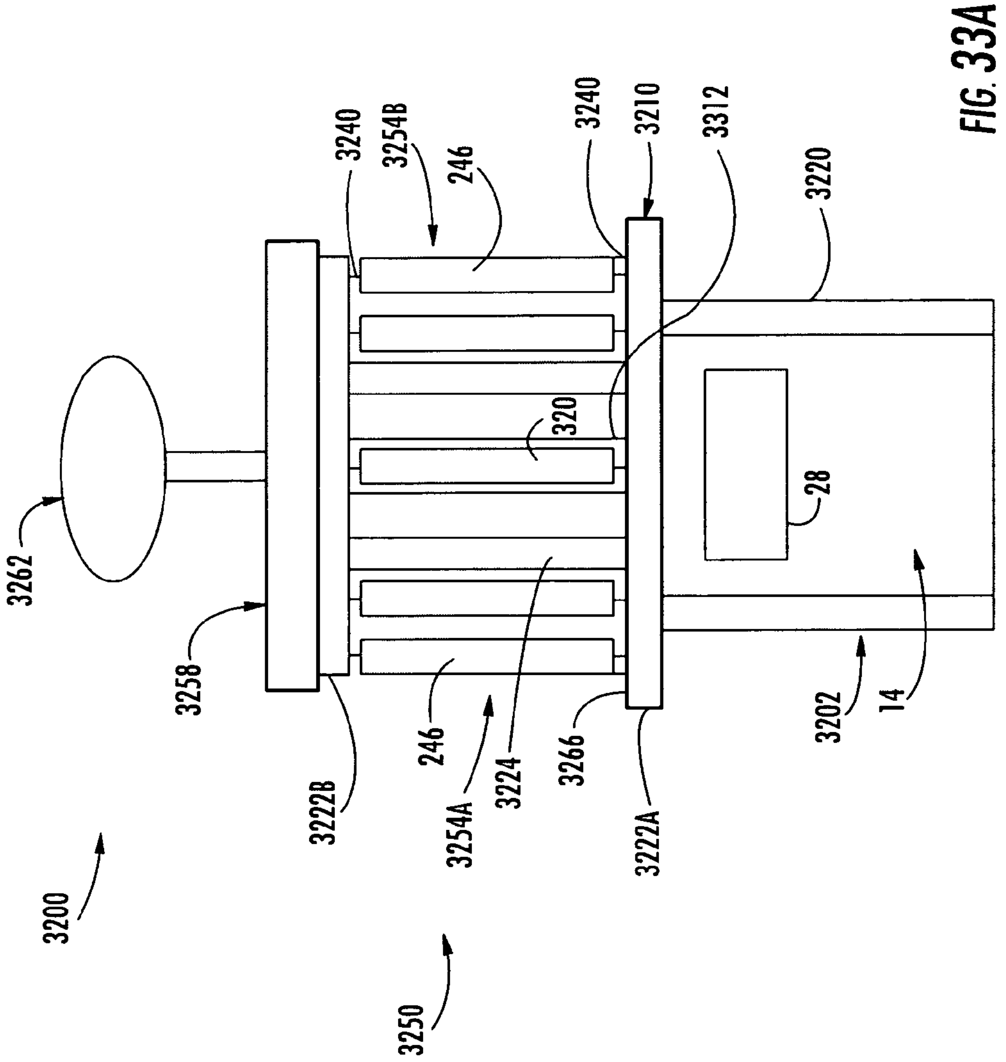
FIG. 33A is substantially a side view of the gaming apparatus of FIG. 32 with the bands or belts removed.

With reference now to FIG. 33A, gaming device 3200 is shown with a portion of bonus game display device 3250 removed. Housing 3210 can be formed from a suitable material such as plastic or a metal such as steel. Housing 3210 may include vertical supports 3220 and 3224, center support 3312 and horizontal supports 3222A and 3222B. Bonus game display device 3250 is mounted between center support 3312 and horizontal supports 3222A and 3222B. Horizontal support 3222A is connected to vertical supports 3220. The primary gaming devices 14A-D may be mounted between vertical supports 3220. A center support 3312 can be mounted between horizontal supports 3222A and 3222B. A decorative top cover 3258 can be attached to vertical supports 3224. A sign 3262 can be mounted to top cover 3258. Top cover 3258 and sign 3262 can include lights and decorative graphics that serve to draw a game player's attention to gaming device 3200.

Figure 33B:
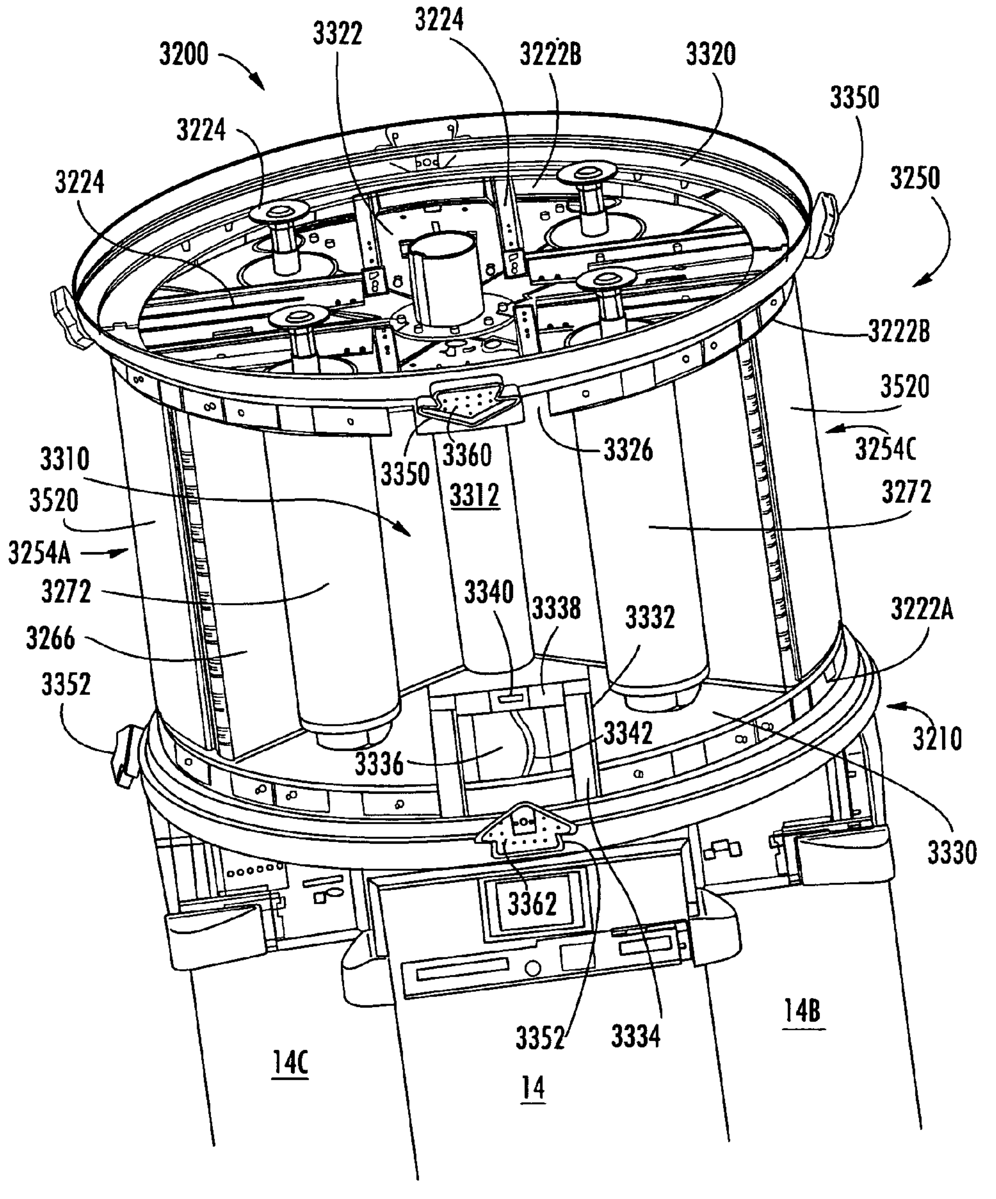
FIG. 33B is substantially a perspective view of the gaming apparatus of FIG. 32 with one of the bonus gaming devices removed.
Figure 33C:
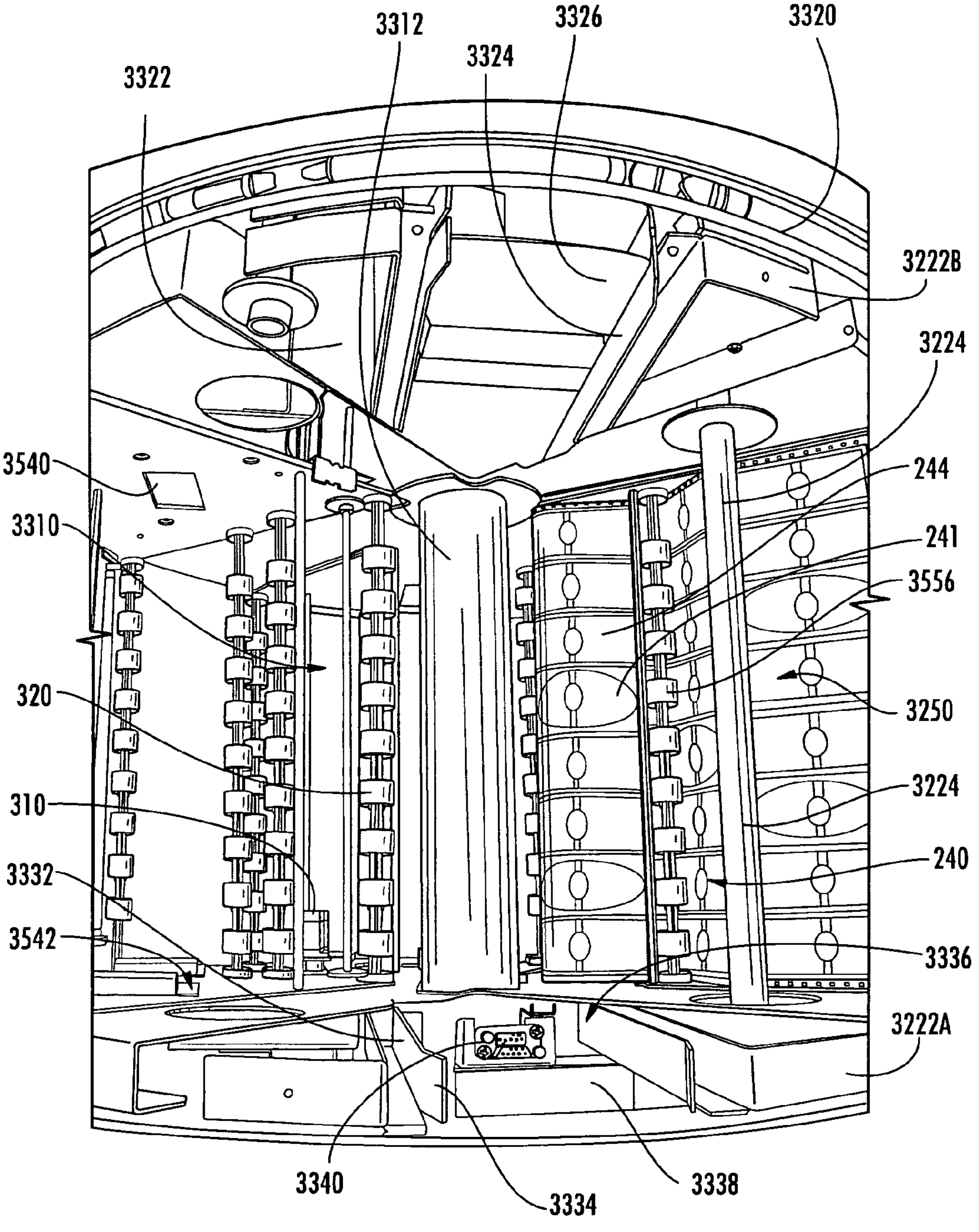
FIG. 33C is substantially a side view of the gaming apparatus of FIG. 32 with one of the bonus gaming devices removed.
Figure 34:
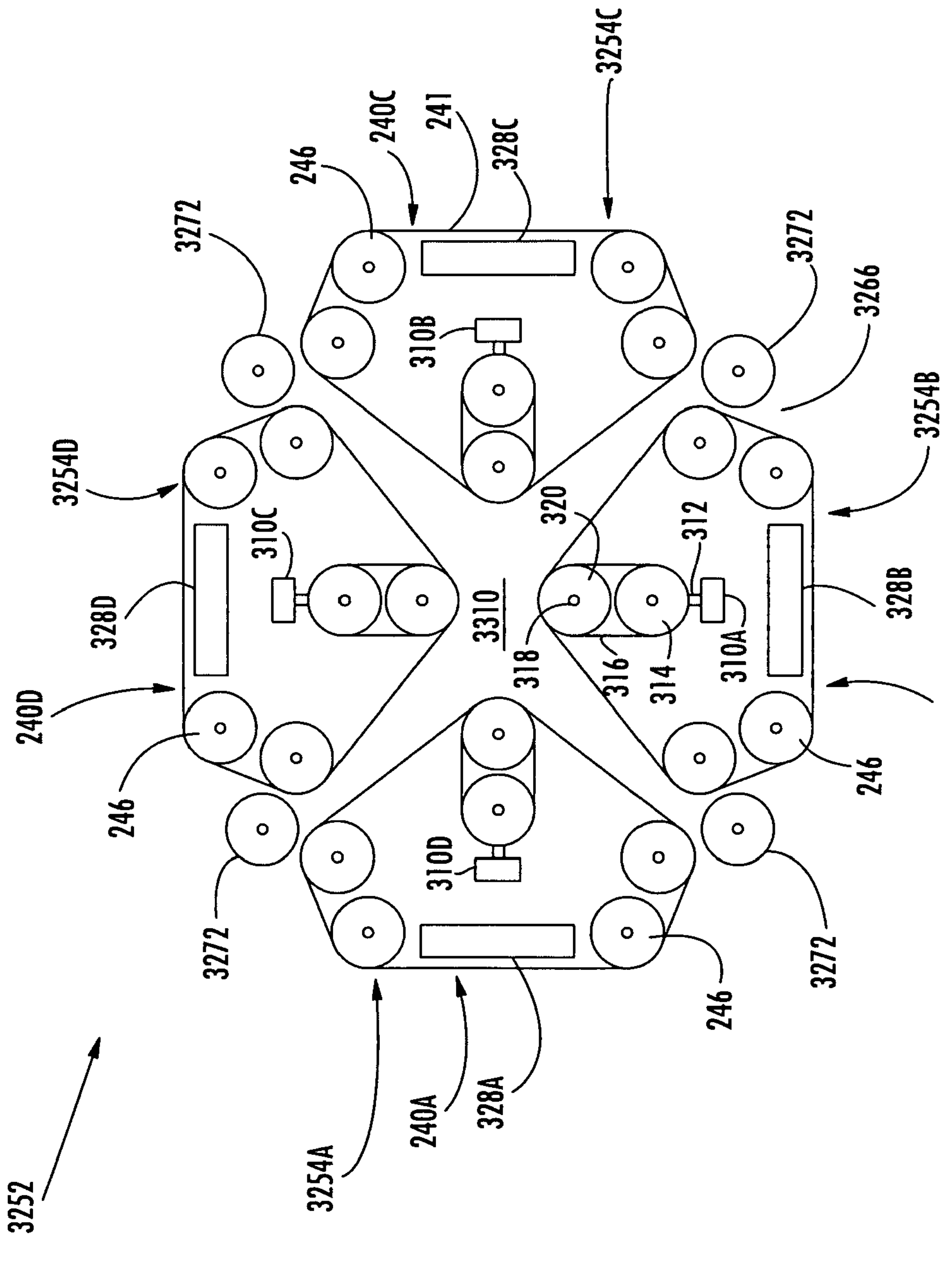
FIG. 34 is substantially a partial cross-sectional view of the gaming apparatus of FIG. 32.

Bonus game display device 3250 can include several bonus game displays, flexible belt displays or bonus game devices 3254 that are mounted to housing 3210. With reference to FIGS. 33B, 33C and 34, bonus game display device 3250 is shown with one of the bonus game displays 3254 and the top cover 3258 removed. Specifically, bonus game display device 3250 can include bonus game displays 3254A, 3254B, 3254C and 3254D that are mounted to housing 3210. In FIGS. 33B and 33C, bonus game display 3254B, located between bonus game displays 3254A and 3254C has been removed to visually see the interior components of bonus game display device 3250.

Housing 3210 can include a cavity 3310. Cavity 3310 is located around center support 3312. A round upper plate 3322 can be connected to horizontal support 3222B and extend to and connect with center support 3312. The supports 3222B and upper plate 3322 can be formed from steel and joined by welding or other suitable means. An upper ring 3320 may be mounted to horizontal support 3222B. An elongated three-sided tube 3324 can be mounted to upper plate 3322 by a suitable means such as welding. Three-sided tube 3324 defines a channel 3326 that adjoins cavity 3310.

A round lower plate 3330 can be connected to horizontal support 3222A and extend to and connect with center support 3312. The support 3222A and lower plate 3330 can be formed from steel and joined by welding or other suitable means. An elongated three sided tube 3332 can be mounted to lower plate 3330 by a suitable means such as welding. Three-sided tube 3330 defines a channel 3334 that adjoins cavity 3310. Bonus gaming devices 3254 are mounted in cavity 3310 using channels 3326 and 3334 as will be described later.

Lower plate 3330 may further have an opening 3336 defined therein. A support 3338 can be connected across opening 3336 in order to mount and hold an electrical connector 3340. Connector 3340 can be connected with a wiring harness 3342 in order to transmit power, ground, control and data signals to bonus gaming device 3254B.

Several indicators can be mounted to bonus gaming device 3250 to further indicate a game outcome to a player. In FIG. 33B, indicators 3350 are shown mounted to upper ring 3320 above bonus gaming devices 3254A-B. Indicators 3352 are shown mounted to horizontal support 3222A below bonus gaming devices 3254A-B.

Upper indicators 3350 can further include light emitting diodes (LED) 3360. Lower indicators 3352 can further include light emitting diodes (LED) 3360. The light emitting diodes can be selectively illuminated in order to illuminate one or all of indicators 3350 and 3352. The light emitting diodes can be of any color and can be arranged in any suitable pattern to indicate a game outcome the game player. Light emitting diodes 3360 would be controlled by and in communication with a controller, the operation of which will be described later.

Referring now to FIGS. 32-34, bonus game display device 3250 can include several bonus game displays 3254. Bonus game displays 3254 can include bonus game displays 3254A, 3254B, 3254C and 3254D. Bonus games displays 3254 are similar to display device 302 previously described in conjunction with FIGS. 8 and 9 except that the display device is now mounted in a vertical fashion and rotates about a vertical axis. The four bonus game displays 3254 are arranged in cavity 3310 such that a portion of the bonus game display faces outwardly where the bonus game display may be viewed by a game player.

Each bonus game display 3254 has a rotatable band or flexible belt 240 of material that can be fashioned into a wide variety of shapes and sizes. Bonus game display 3254A has a band 240A. Bonus game display 3254B has a band 240B. Bonus game display 3254C has a band 240C and bonus game display 3254D has a band 240D.

In an alternative embodiment, bands 240A-D could be replaced with one very large continuous band that is threaded around the rollers of bonus game displays 3254A, 3254B, 3254C and 3254D.

Band 240 may be formed into sloped, concave, convex, arched and flat band shapes. Band 240 can rotate about a plurality of idle or support rollers 246. Support rollers 246 can rotate on bearings 3240 (FIG. 33A). Band 240 can have an outer display surface 241 and an inner surface 242. Band 240 may have a plurality of indicia 244 (FIG. 32) appearing on display surface 241. Indicia 244 may indicate various prizes that can be awarded.

Band 240 may resemble a printing press, including a magazine printing press, a newspaper printing press, and a money printing press. As illustrated in FIG. 32, band 240 appears to be a single sheet of uncut paper currency that appears to extend around all of bonus game displays or devices 3254A-D. Indicia 244 may appear to be currency bills having various values. Indicia 244 may indicate prizes such as an award of currency or credits, merchandise, services, game play, jackpots, and progressive prizes. Band 240 may have a variety of different indicia 244 imprinted, or otherwise appearing thereon. False rollers 3272 can be positioned in the gap or space 3266 between bonus game displays 3254A, B, C and D. False rollers 3272 hide the transition between each of the bonus game displays 3254A, B, C and D.

Each band 240 on bonus game displays 3254A, B, C and D and false rollers 3272 can be rotated at the same rotation rate such that it appears to a viewer that one single very large sheet of money is moving around bonus game display device 3250.

By rotating flexible belt displays 3254A, B, C and D and false rollers 3272 at the same rate, the illusion of a single continuous flexible belt or display surface is provided to a game player. Because the sheet of money is large and appears to move entirely around bonus game display device 3250, it can attract the attention of game players and casino patrons.

Each flexible belt 240 rotates about a vertical axis that is parallel to rollers 246 and is perpendicular to horizontal supports 3222A and 3222B. When flexible belt 240 is rotated about a vertical axis it appears to move sideways from either left to right or right to left when viewed by a game player.

One advantage of the use of bonus game display device 3250 is that when a bonus event occurs at one of primary games 14, all of the bonus games displays 3254A-D can be moved such that all game players playing at primary games 14 see the moving sheet of money and are aware of the occurrence of a bonus event on at least one of the primary games 14. This creates excitement among the game players because of the sense that bonus payouts are occurring frequently which can lead to longer play times by game players.

Bonus game display device 3250 can be used to play a community game by several game players of game apparatus 3200.

Each of bands 240 may be constructed from any suitable material. Band 240 may be constructed from a flexible material, such as various types of vinyl, plastic, rubber materials, and the like. The use of a flexible material may prevent band 240 from tearing or creasing when it is moved. The material used to construct band 240 may be transparent or translucent, allowing band 240 to be backlit.

Figure 35A:
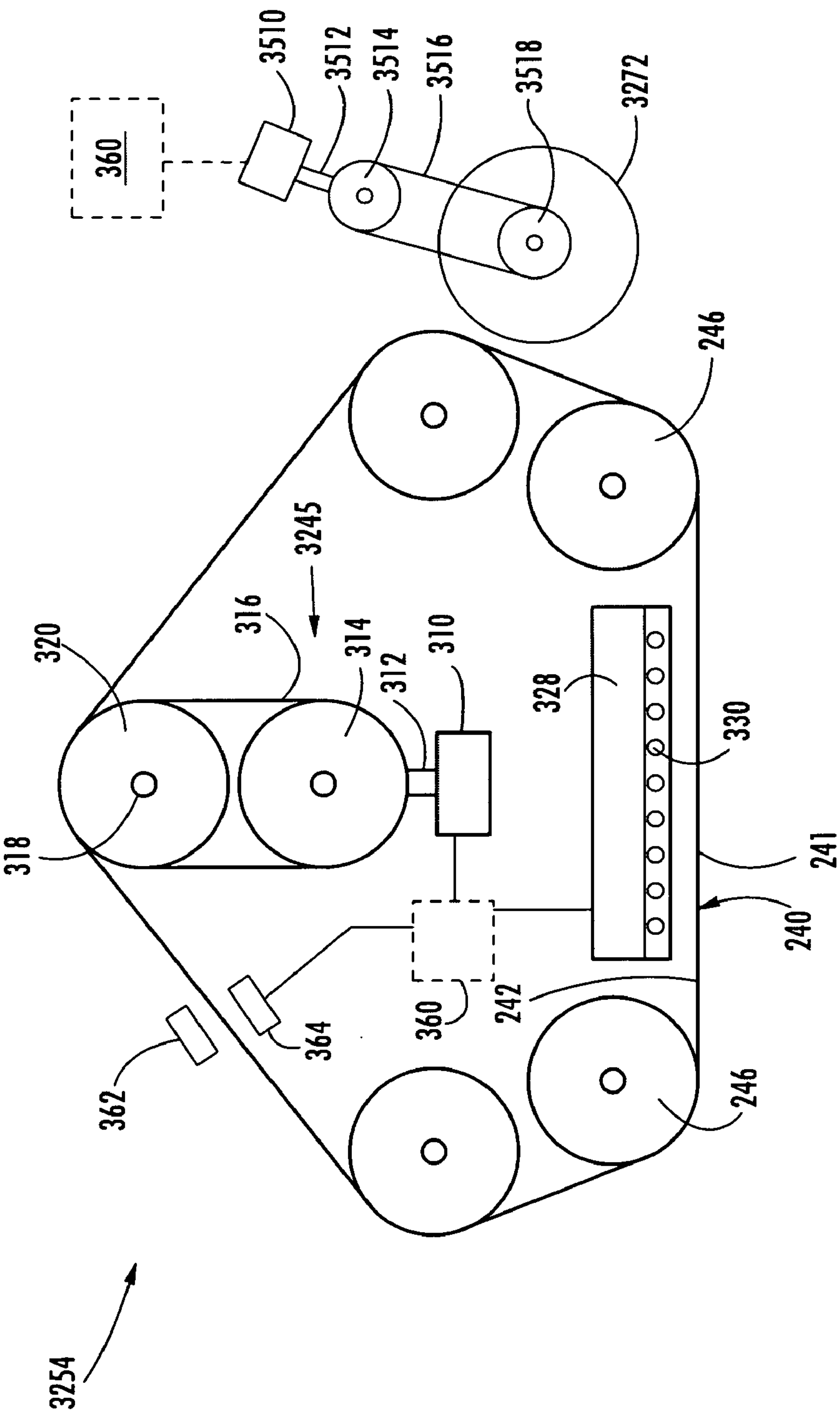
FIG. 35A is substantially an enlarged cross-sectional view of an embodiment of one of the bonus gaming devices of FIG. 32.

Band 240 may be coupled to a drive or positioning mechanism 3245 (FIG. 35A) so that band 240 may be rotated about rollers 246. Turning now to FIG. 35A, positioning mechanism 3245 can include a driven roller 320 that is driven by an actuator 310. In at least one embodiment, band 240 is driven simply by frictional contact with roller 320. Roller 320 abuts and applies pressure to inner surface 242. However, other arrangements may be substituted without departing from the scope of the present invention. For example, roller 320 may have a portion with teeth (not shown) that could engage slots or holes (not shown) in band 240.

Actuator 310 may be any number of suitable actuators, such as motors, including stepper motors, gear motors, and servo motors. Actuator 310 may rotate a shaft 312 in connection with a wheel 314. A belt 316 may link wheel 314 to shaft 318 of driven roller 320. Rotation of shaft 312 drives wheel 314 which in turn drives belt 316. The rotational force is passed from belt 316 to shaft 318. Rotation of shaft 318 may drive rotation of roller 320. Frictional contact with rotating driven roller 320 against inner surface 242 moves band 240. Optionally, an idler wheel or pulley (not shown) can be included on the opposing side of band 240 in order to increase the frictional contact of band 240 with driven roller 320.

Another actuator 3510 may be used to drive false roller 3272. Each false roller 3272 would have an actuator 3510 to cause rotation of false roller 3272. Actuator 3510 can rotate a shaft 3512 in connection with a wheel 3514. A belt 3516 may link wheel 3514 to shaft 3518 of false roller 3722. Rotation of shaft 3512 drives wheel 3154 which in turn drives belt 3516. The rotational force is passed from belt 3516 to shaft 3518. Rotation, of shaft 3518 may drive rotation of false roller 3722.

Controller 360 can be in communication with actuators 310 and 3510. Controller 360 can control the operation of actuators 310 and 3510 thereby controlling the position and rotation rate of band 240 and false roller 3722.

With continued reference to FIG. 35A, a controller 360 may be in communication with a housing or printed circuit board 328 that may have a plurality of lights 330 that are positioned behind band 240. Lights 330 may be any suitable illumination device, including LEDs, fluorescent lamps, and incandescent lamps. Lights 330 may be activated by signals sent from controller 360 in response to game events. Lights 330 may be used to backlight band 240. Illumination of band 240 may indicate one or more of indicia 244 as a game outcome.

Controller 360 may also be in communication with a positioning system for band 240. It may be beneficial to be able to track the position of band 240. Many suitable positioning systems can be used. For example, an infrared signal source 362 can be included on one side of band 240. An infrared detector 364 may be located on the opposing side of band 240. Infrared blocking materials may be placed at one or more locations on band 240. By tracking when the infrared signal is blocked, controller 360 may be able to calibrate and/or constantly track the position of band 240 and any indicia appearing thereon.

In an alternative embodiment, a side of band 240 contains a series of holes (not shown), cut-out portions, or similar optical interrupts. The optical interrupts may be read by an optical reader (not shown). The optical interrupts may convey the position of band 240 to controller 360.

Figure 35B:
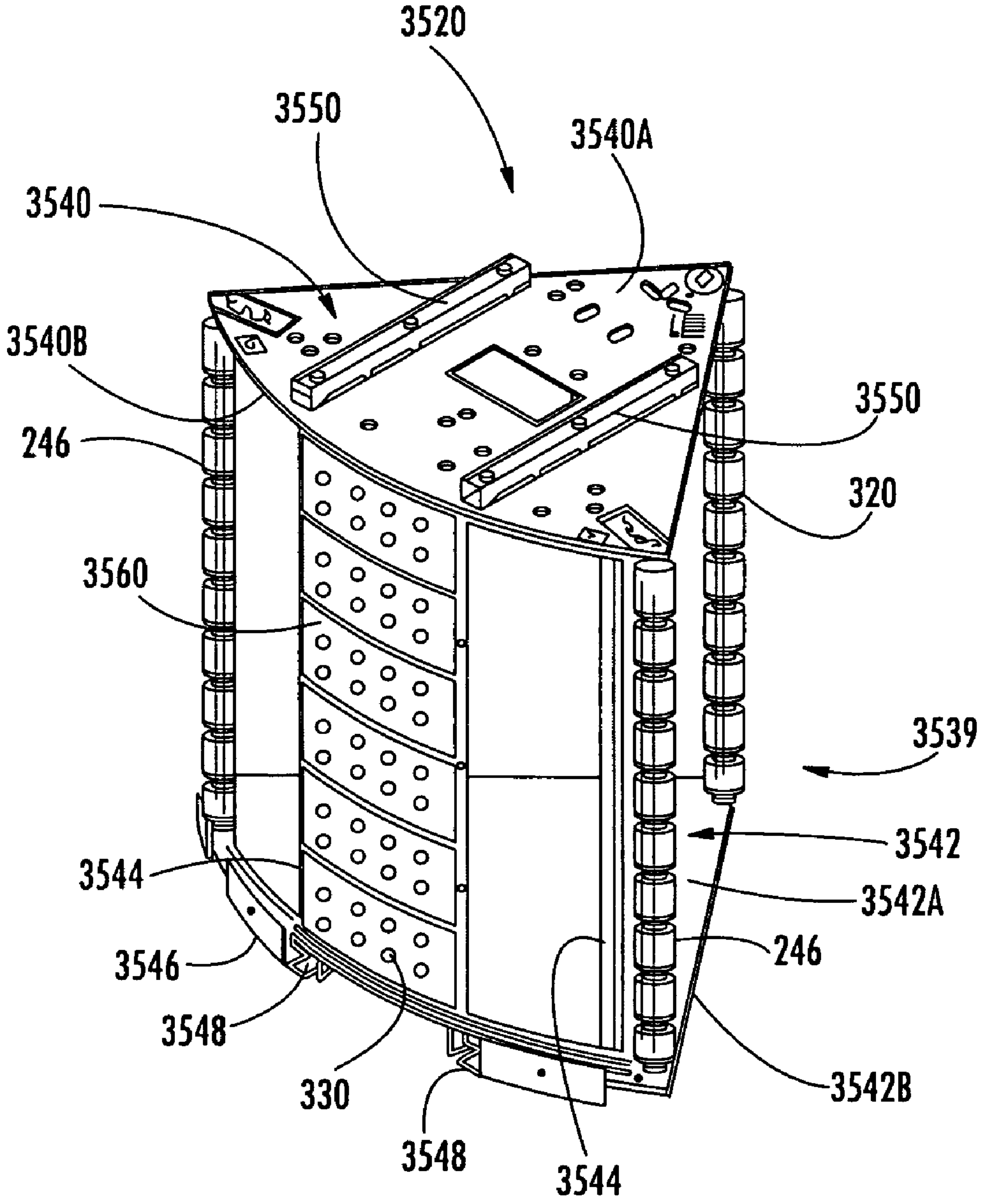
FIG. 35B is substantially a perspective view of one of the bonus gaming devices removed from FIG. 33C.

Turning now to FIGS. 35B, 35C, 35D, 35E and 35F, further details of the construction of bonus gaming device 3254 is shown. In FIG. 35B, bonus gaming device 3254 is shown removed from bonus gaming apparatus 3250 of FIG. 33B. Bonus gaming device 3254 of FIG. 35B would slide into cavity 3310 of FIG. 33B. Bonus gaming device 3254 can be formed as a modular assembly or unit in order to facilitate ease of maintenance and repair.

Bonus gaming device 3254 can include a support frame 3539. The components of bonus gaming device 3254 can be mounted to support frame 3539. Support frame 3539 can be formed from any suitable material such as steel or plastic. Support frame 3539 can include an upper plate 3540 and a lower plate 3542 that are connected by connecting rods 3552 and front frame 3544.

Upper plate 3540 may have a top surface 3540A and a bottom surface 3540B. A pair of elongated square upper rails 3550 are attached to the top surface 3540A by a suitable fastener such as bolts or rivets. Rails 3550 are adapted to slide into channels 3326 (FIG. 33B) and mate with tubes 3324 (FIG. 33B).

Lower plate 3542 may have a top surface 3542A and a bottom surface 3542B. A pair of elongated square lower rails 3548 are attached to the bottom surface 3542B by a suitable fastener such as bolts or rivets. Rails 3548 are adapted to slide into channels 3334 (FIG. 33B) and mate with tubes 3332 (FIG. 33B). Rails 3548 and 3550 allow bonus gaming devices 3254 to be slid in and out of housing 3210. Rails 3548 and 3550 further allow bonus gaming devices 3254 to be assembled and disassembled in a modular manner in that the entire bonus gaming device 3254 can be removed from housing 3210 as a single unit by sliding rails 3548 and 3350 out of channels 3326 and 3334. A locking device (not shown) may lock or retain support frame 3539 in housing 3210.

The bottom surface 3542B of lower plate 3542 may have an electrical connector 3566 (FIG. 35E) attached thereon toward the back of lower plate 3542. Connector 3566 would slide into and mate with connector 3340 (FIG. 33B) when support frame 3539 is slid into channels 3326 and 3334. Connectors 3340 and 3566 together provide power, ground, control and data signals to bonus gaming devices 3254.

Connecting rods 3552 and front frame 3544 may be attached between upper plate 3540 and lower plate 3542 to further support and stiffen frame 3539. Lower frame 3546 (FIG. 35B) can be mounted to and below lower plate 3542.

A printed circuit board 3560 may be mounted to and supported by front frame 3544. Printed circuit board 3560 can be one large printed circuit board or may be several smaller printed circuit boards. Printed circuit board 3560 would be electrically connected with connector 3566 through cable 3561 thereby providing power and signals to printed circuit board 3560. Printed circuit board 3560 may have a plurality of lights 330 mounted thereon. Lights 330 may be any suitable illumination device, including LEDs, fluorescent lamps, and incandescent lamps.

Positioning mechanism 3245 can include a driven roller 320 that is driven by an actuator 310. In at least one embodiment, positioning mechanism 3245 can have a pulley and drive roller 320. However, in the embodiment shown in FIGS. 35B-35F, gears may drive roller 320. In FIGS. 35D and 35E, it can be seen that in at least one embodiment, rollers 320 and 246 are fitted with a plurality of wheels 380. Wheels 380 may be made of a material that maintains strong fractional contact with band 240. Wheels 380 are preferably constructed of, or coated with, a relatively non-abrasive material so as not to damage band 240. For example, wheels 380 may be made of various types of rubber, plastic, and similar materials.

Actuator 310 may be any number of suitable actuators, such as motors, including stepper motors, gear motors, and servo motors. Actuator 310 can be mounted to lower plate 3542. Actuator 310 may rotate a shaft in connection with a gear 3572. Gear 3572 may rotatably be mounted to one end of shaft 3576. Shaft 3576 is supported for rotation between upper plate 3540 and lower plate 3542. Another gear 3573 is attached to shaft 3576 adjacent upper plate 3540. Driving roller 320 has gears 3574 and 3575 mounted at each end of driving roller 320. Gear 3574 is engaged with gear 3572 and gear 3575 is engaged with gear 3573. Therefore, the rotation of actuator 310 causes rotation of shaft 3576, gears 3572 and 3573, gears 3774, 3575 and driven roller 320, which drives band 240.

In an embodiment, a tensioning mechanism 3524 (FIG. 35C) can mounted to support frame 3539 (FIG. 35B) in order to increase the frictional contact of band 240 with driven roller 320 and ensure that band 240 is taut. With specific reference to FIG. 35C, tensioning mechanism 3524 may include a base 3526, which may be mounted to the support frame 3539. Base 3526 may be coupled to a biasing device 3530, such as a screw. Biasing device 3530 may be coupled to a moveable mounting area 3528. Moveable mounting area 3528 may be coupled to an arm 3532 that rotatably supports a tensioning roller 3556. Tensioning roller 3556 may be in contact with outer surface 241 of band 240 such that tensioning roller 3556 may rotate while keeping band 240 taut.

Figure 35C:
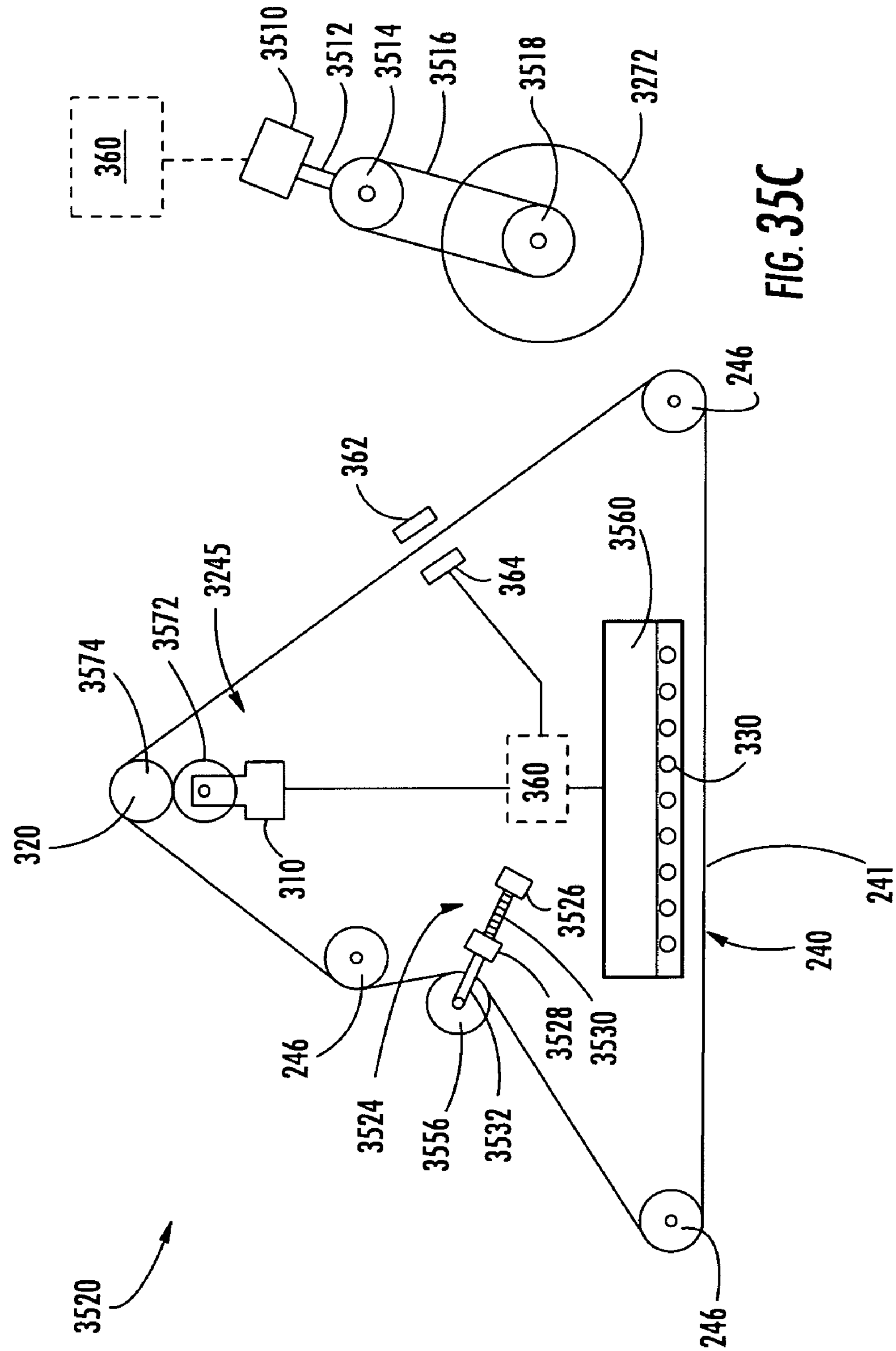
FIG. 35C is substantially an enlarged cross-sectional view of FIG. 35B.
Figure 35D:
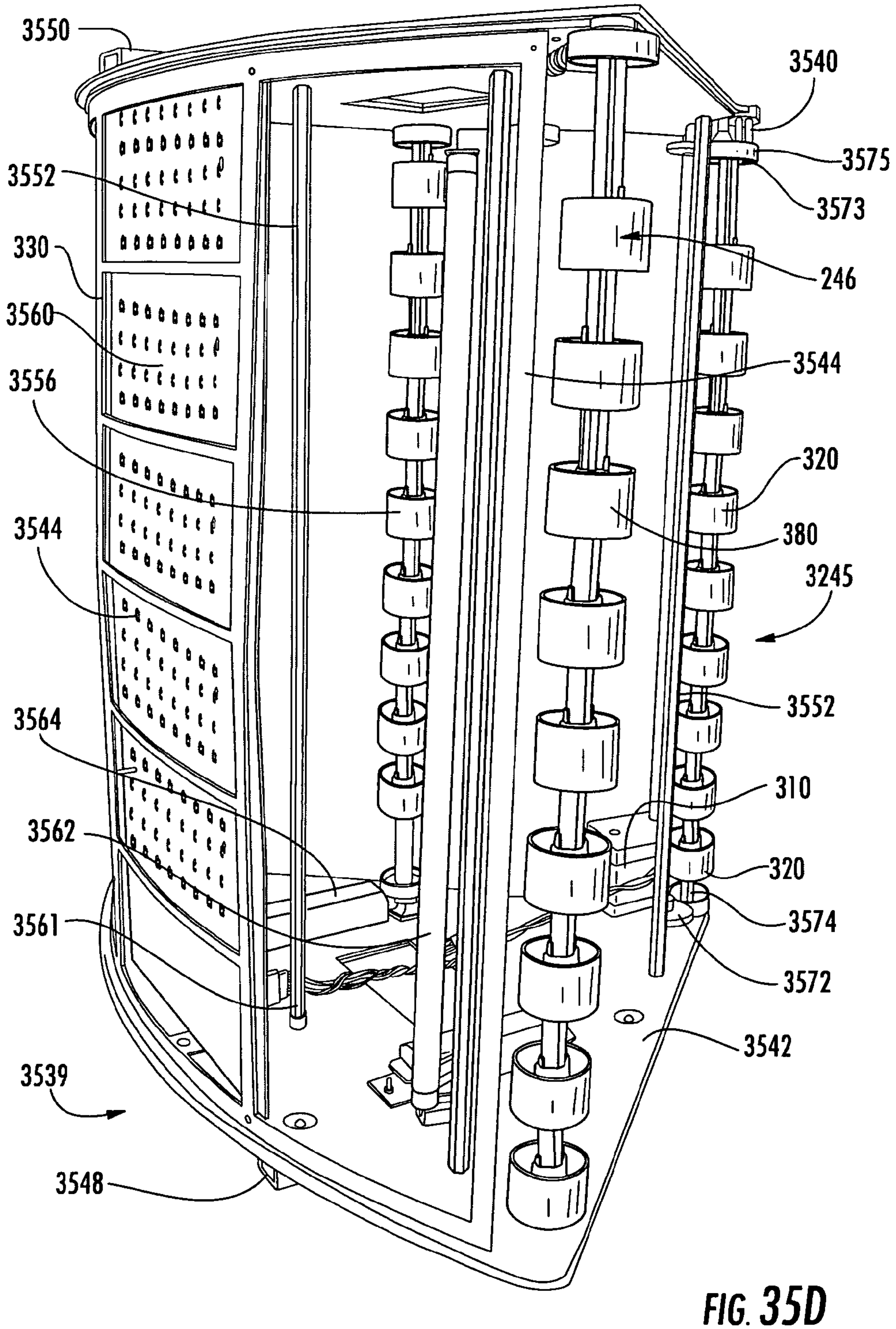
FIG. 35D is substantially a right side view of FIG. 35B.
Figure 35E:
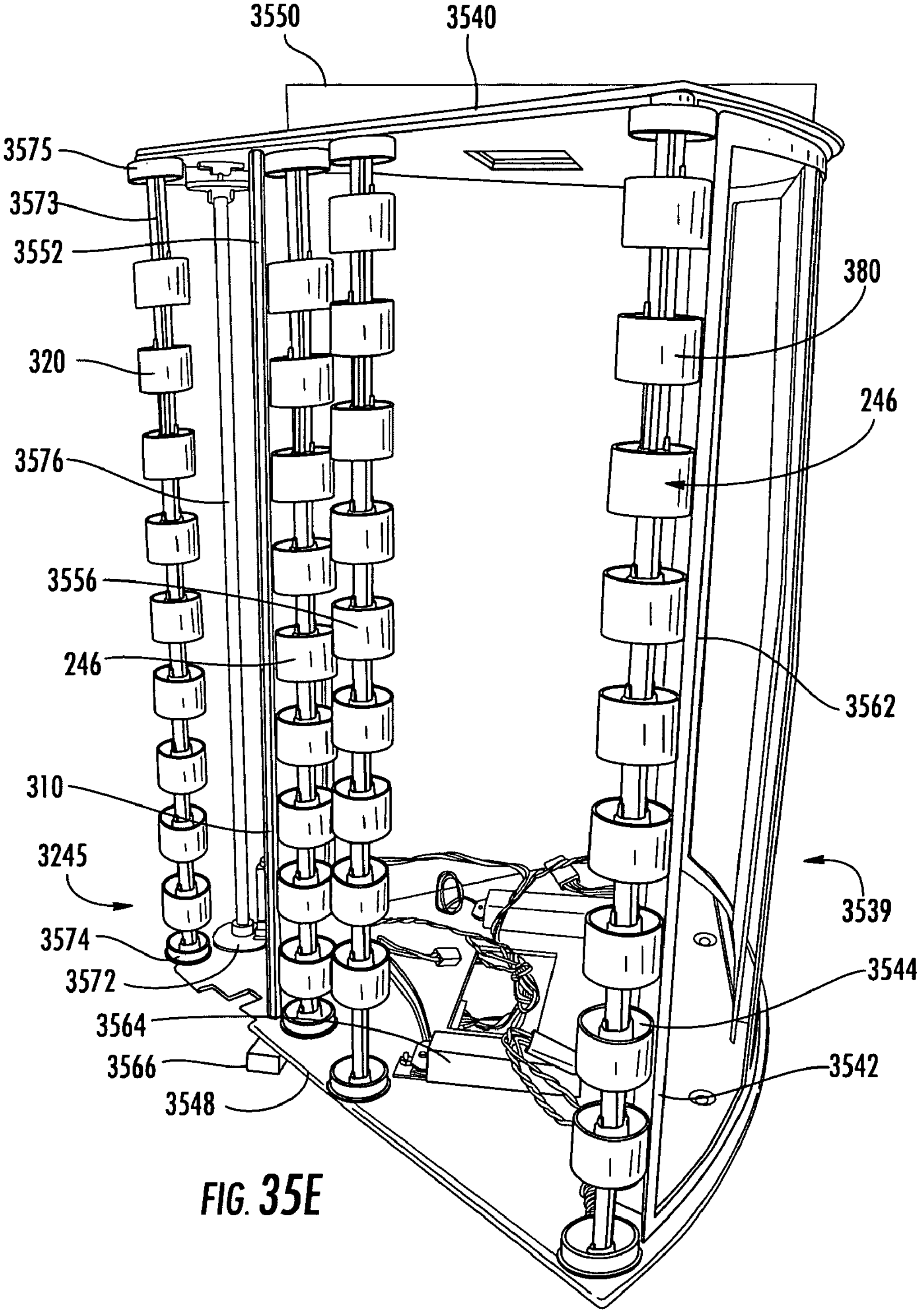
FIG. 35E is substantially a left side view of FIG. 35B.
Figure 35F:
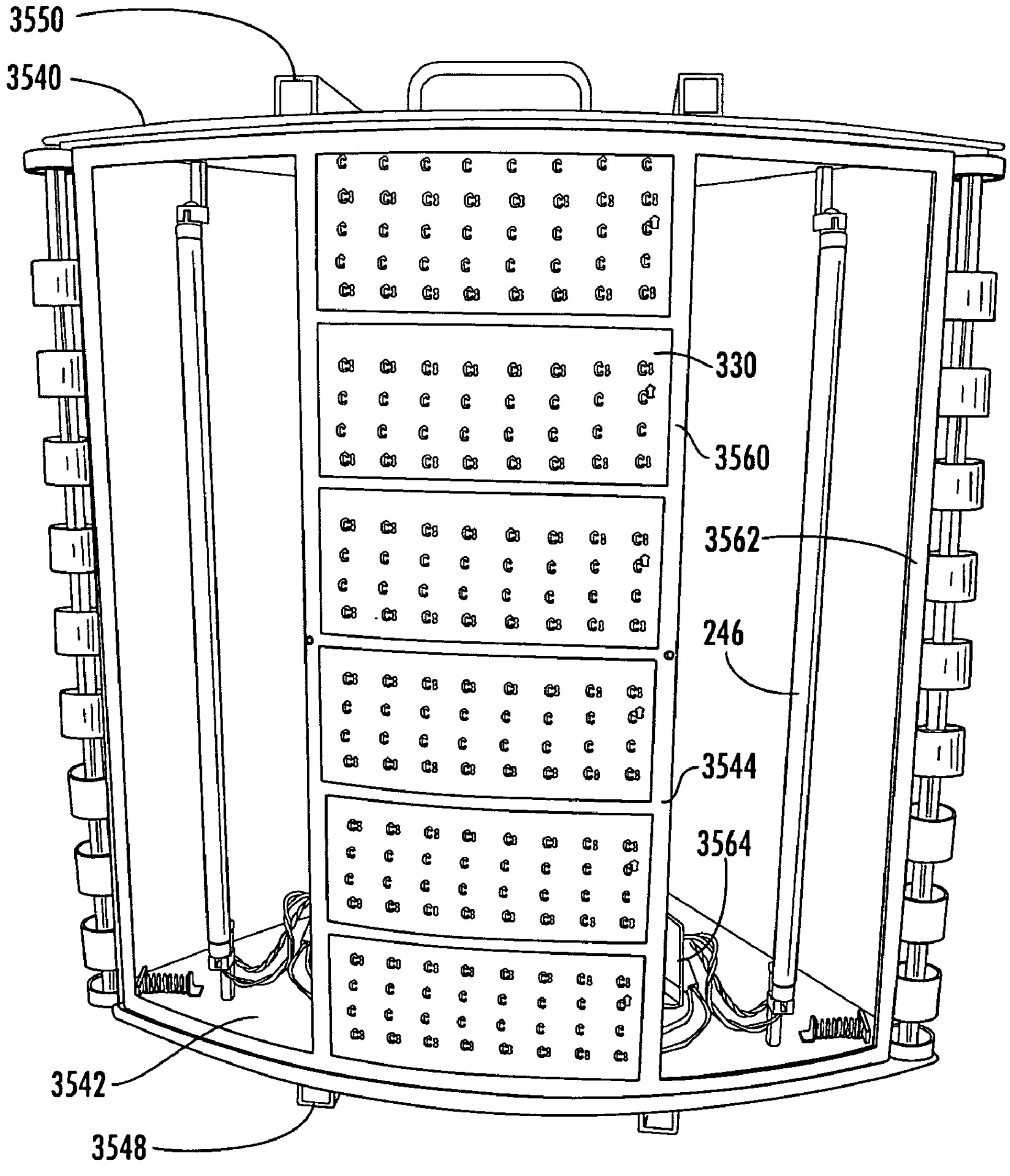
FIG. 35F is substantially a front view of FIG. 35B.

With continued reference to FIG. 35C, another actuator 3510 may be used to drive false roller 3272. Each false roller 3272 would have an actuator 3510 to cause rotation of false roller 3272. Actuator 3510 can rotate a shaft 3512 in connection with a wheel 3514. A belt 3516 may link wheel 3514 to shaft 3518 of false roller 3272. Rotation of shaft 3512 drives wheel 3154 which in turn drives belt 3516. The rotational force is passed from belt 3516 to shaft 3518. Rotation of shaft 3518 may drive rotation of false roller 3272.

Controller 360 can be in communication with actuators 310 and 3510. Controller 360 can control the operation of actuators 310 and 3510 thereby controlling the position and rotation rate of band 240 and false roller 3722.

A controller 360 may be in communication with a housing or printed circuit board 3560 that may have a plurality of lights 330. Lights 330 may be any suitable illumination device, including LEDs, fluorescent lamps, and incandescent lamps. Lights 330 may be activated by signals sent from controller 360 in response to game events. Lights 330 may be used to backlight band 240. Illumination of band 240 may indicate one or more of indicia 244 as a game outcome.

Controller 360 may also be in communication with a positioning system for band 240. It may be beneficial to be able to track, the position of band 240. Many suitable positioning systems can be used. For example, an infrared signal source 362 can be included on one side of band 240. An infrared detector 364 may be located on the opposing side of band 240. Infrared blocking materials may be placed at one or more locations on band 240. By tracking when the infrared signal is blocked, controller 360 may be able to calibrate and/or constantly track the position of band 240 and any indicia appearing thereon.

In an alternative embodiment, a side of band 240 contains a series of holes (not shown), cut-out portions, or similar optical interrupts. The optical interrupts may be read by an optical reader (not shown). The optical interrupts may convey the position of band 240 to controller 360.

Figure 36:
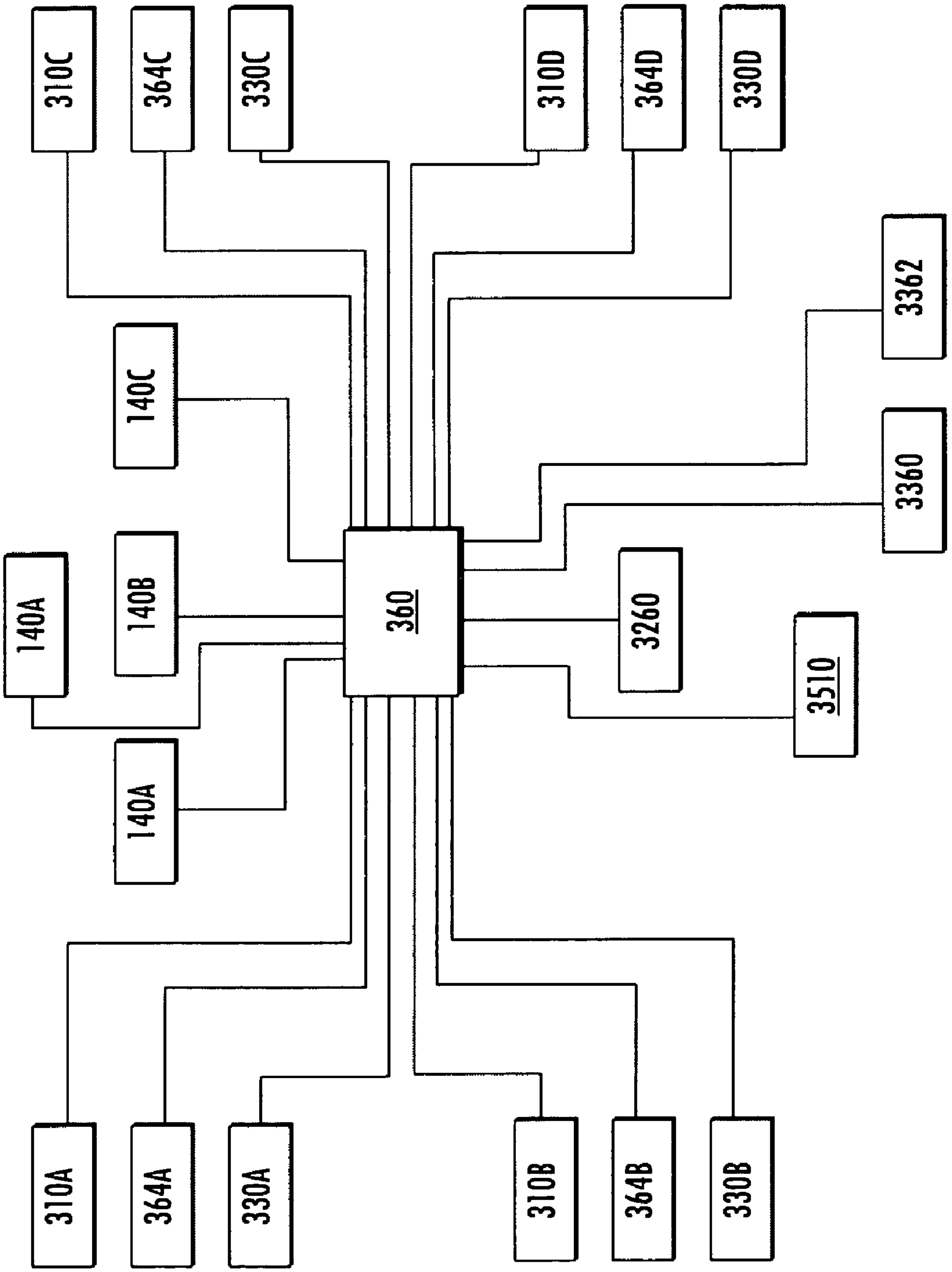
FIG. 36 is substantially a schematic diagram of the control circuit of the gaming device of FIG. 32.

Turning now to FIG. 36, a schematic diagram of the control circuit for gaming device 3200 is shown. A central controller 360 can be in communication with each primary game apparatus 14 and each bonus game display device 3254. Controller 360 can be in communication with actuators 310A, B, C, D, lights 330A, B, C, D and detectors 364A, B, C, D. Controller 360 can also be in communication with one or more of actuators 3510 to drive false rollers 3722 and lights 3260.

Controller 360 can further be in communication with primary game controllers 140A, B, C and D. One of primary game controllers 140A-D are located respectively in each of the four primary gaming devices 14A-D that are mounted in gaming device 3200. Primary game controllers 140A-D are adapted to detect when a bonus qualifying or activating event occurs in primary gaming devices 14A-D and to communicate that information to controller 360. Controller 360 can further be in communication with upper indicator light emitting diodes 3360 and lower indicator light emitting diodes 3362. Controller 360 can selectively illuminate any one or all of indicators 3350 using LED's 3360 or indicators 3352 using LED's 3362. Indicators 3350 and 3360 can be used to indicate one or more of the indicia 244 as a game outcome.

In one embodiment, controller 360 can be a server that is located remotely from gaming apparatus 3200. In another embodiment, controller 360 may control all the functions of gaming apparatus 3200 and primary game controllers 140A-D may be illuminated.

Game Method

Figure 37:
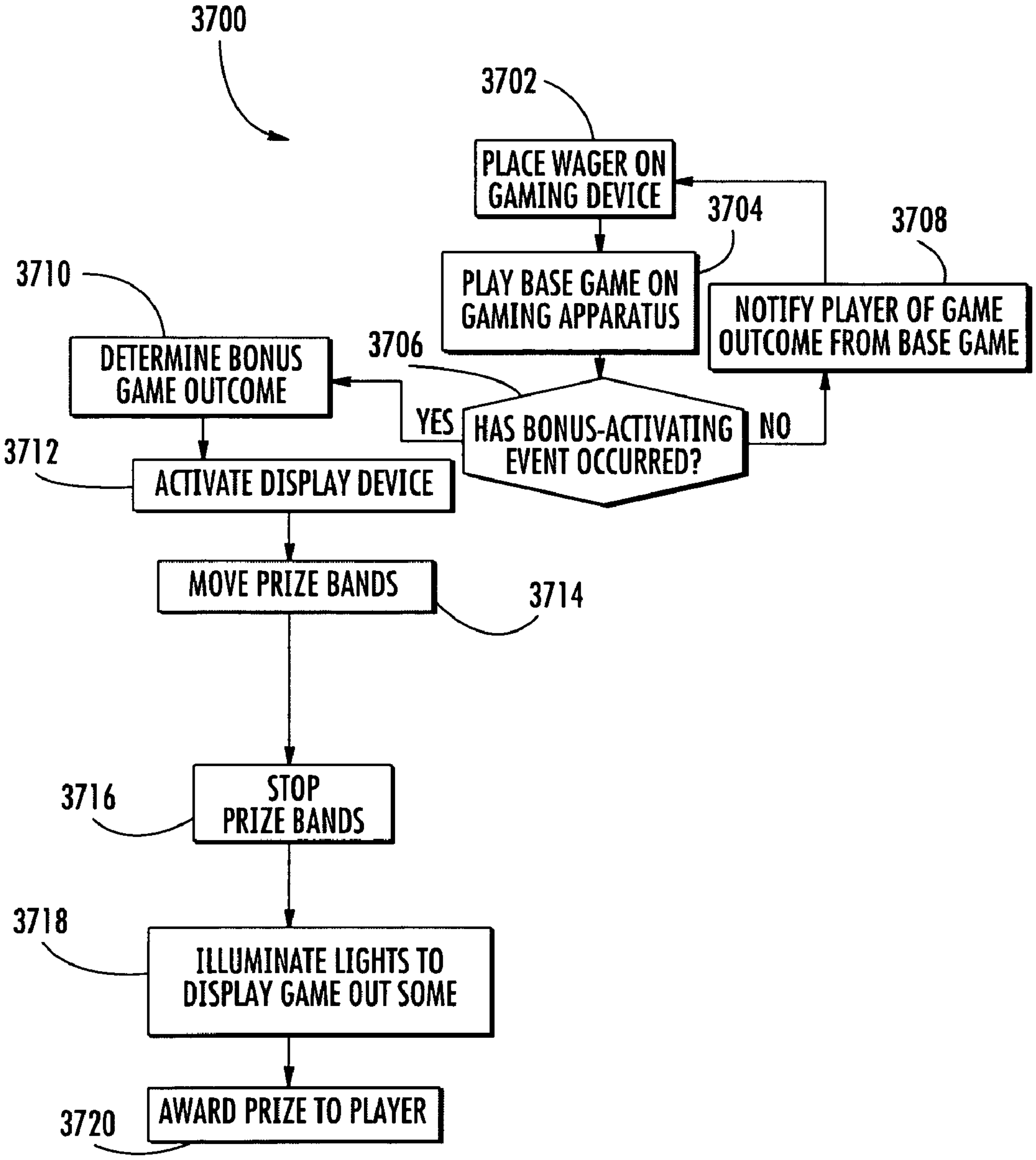
FIG. 37 is substantially a flowchart of a gaming method according to the present invention using the apparatus of FIG. 32.

A method of operating gaming device 3200 of FIG. 32 is shown in FIG. 37. In method 3700, a player places a wager on at least one of primary games 14 (FIG. 32) at step 3702. At step 3704, one or more players play a base game on one or more of the base gaming apparatuses 14. At decision 3706, method 3700 checks to see if the game outcome determined in step 3704 is an outcome qualifying the player to play a bonus game. If not, method 3700 proceeds to step 3708 and notifies the player of the game outcome determined in step 3704, and returns to step 3702.

If it is determined in step 3706 that the game outcome of step 3704 qualifies the player for a bonus game, method 3700 proceeds to step 3710. At step 3710, the bonus game outcome is determined. At step 3712, gaming bonus display device 3250 is activated. This may include activation of each of bonus displays 3254A-D including rotation of all four bands 240, false rollers 3272 and illumination of lights 330. Other lights and sounds may also be activated to make the event more exciting to the player and those around the player, as well as to call attention to the device.

Method 3700 then proceeds to step 3714 where bands 240 are moved or rotated. At step 3716, bands 240 are stopped. A portion of at least one of one of lights 330A, B, C or D are illuminated behind one of the indicia 244 on band 240 at step 3718 to indicate a game outcome. Method 3700 then awards any prizes indicated by the illuminated indicia 244 to the player in step 3720.

Many variations of gaming device 3200 can be contemplated. For example, the four bonus gaming displays 3254A-D could be replaced with only one large band 240 that simulates a currency printing press. While several false rollers 3272 were shown between bonus gaming displays 3254A-D, a flat panel could be used to hide the space between the bonus gaming displays. While gaming device 3200 was shown with four primary games and four bonus gaming displays, any number of primary games or bonus gaming displays may be utilized.

In another embodiment, during a bonus event, each game player playing at primary gaming devices 14A-D may be awarded a bonus prize. For example, a portion of each of lights 330A, B, C or D are illuminated behind selected indicia 244 such that four prizes are indicated on bands 240A, B, C and D and then awarded.

In one embodiment, gaming device 3200 may be operated as a community game. The community game may have a qualifying period, during which game players at primary gaming devices 14A-D may attempt to quality to play bonus gaming display device 3250 during a community game period. Only those primary gaming devices that have qualified are allowed to play the bonus game display device 3250 during the community game period.

Community Game with Reel to Reel Embodiment

Figure 38:
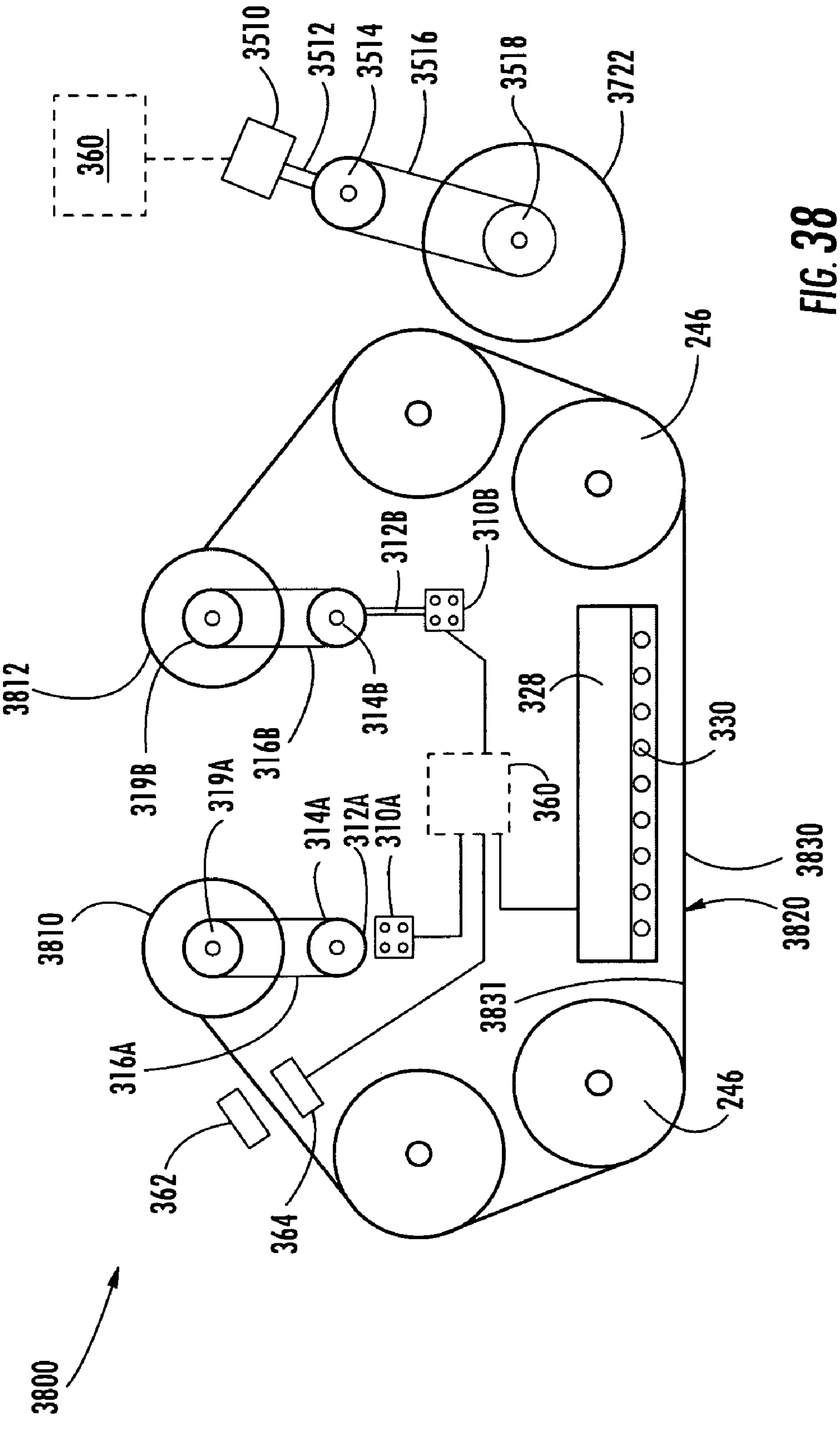
FIG. 38 is substantially an enlarged cross-sectional view of an alternative embodiment of one of the bonus gaming devices of FIG. 32.

FIG. 38 shows another embodiment of a bonus gaming device 3800 in accordance with the present invention. Bonus gaming device 3800 is similar to bonus gaming device 3254 except that band 240 has been replaced with a much longer or wider band 3820. Bonus gaming device 3800 can be a bonus game that replaces bonus game device 3254 of FIG. 32.

Bonus game device 3800 can have rolls or reels of a wide belt of flexible material 3820 that is significantly longer than prize band 240 of FIGS. 35A and 35C. Wide belt 3820 is supported for movement, between reels 3810 and 3812. Wide belt 3820 is wound on reels 3810 and 3820. Wide belt 3820 can have an outer display surface 3830 and an inner display surface 3831. Wide belt 3820 can be backlit by lights 330 that are mounted in a housing 328 as was previously described. Wide belt 3820 can contain a wide variety of indicia (not shown) as was previously described in conjunction with band 240.

Reel 3810 is driven by an actuator 310A. Actuator 310A may be any number of suitable actuators, such as motors, including stepper motors, gear motors, and servo motors. Actuator 310A may rotate a shaft 312A in connection with a wheel 314A. A belt 316A may link wheel 314A to another wheel 319A. Wheel 319A is connected to reel 3810. Rotation of shaft 312A drives wheel 314A which in turn drives wheel 319A and reel 3810. Therefore, actuator 310A can rotate reel 3810. The rotation of actuator 310A can be reversed such that reel 3810 can be rotated in both directions. Optionally, an idler wheel or pulley (not shown) can be included on the opposing side of a portion of wide belt 3820 in order to take up any stack and maintain proper tension.

Another reel 3812 is driven by an actuator 310B. Actuator 310B may be any number of suitable actuators, such as motors, including stepper motors, gear motors, and servo motors. Actuator 310B may rotate a shaft 312B in connection with a wheel 314B. A belt 316B may link wheel 314B to another wheel 319B. Wheel 319B is connected to reel 3812. Rotation of shaft 312B drives wheel 314B which in turn drives wheel 319B and reel 3812. Therefore, actuator 310B can rotate reel 3812. The rotation of actuator 310B can be reversed such that reel 3812 can be rotated in both directions.

Actuators 310A and 310B are in communication with and can be controlled by controller 360. Source 362 and detector 364 can provide controller 360 with a position signal about the position of wide belt 3820.

Controller 360 can cause actuators 310A and 310B to rotate in a coordinated manner such that wide belt 3820 passes over rollers 246 and can be viewed by a game player. Controller 360 can cause reel 3810 to rotate in a counter clockwise manner and reel 3812 to rotate in a counter clockwise manner such that wide belt 3820 is unwound from reel 3810 and wound on reel 3812. When the wide belt 3820 approaches the end of its length, source 362 and detector 364 provide controller 360 with a signal that the end of the wide belt 3820 is approaching. Controller 360 then reverses the rotational direction of reels 3810 and 3812 to clockwise such that wide belt 3820 is unwound from reel 3812 and wound onto reel 3810. The direction of rotation of the reels would be reversed each time that the end of the length of wide belt 3820 is approaching.

The use of reels 3810 and 3812 allows for a longer length of wide belt of flexible material 3820 to be stored on gaming device 3800. Because wide belt 3820 is longer, a larger number of indicia can be displayed. Wide belt 3820 can also be used in place of band 240 in other gaming device embodiments that were previously described.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A gaming apparatus comprising:

(A) a plurality of gaming devices, each of the gaming devices being configured to accept a wager and to generate a bonus qualifying event;

(B) at least one central display device mounted in association with the gaming devices, the central display device comprising a plurality of flexible belt displays having a plurality of indicia thereon, wherein each flexible belt display is aligned with a gaming device, wherein there is a gap between each flexible belt display, the central display device comprising a plurality of false rollers positioned in the gap between adjacent flexible displays, wherein the false rollers obscure the gaps; and (C) a controller in communication with gaming devices and the central display device, the controller being configured to detect the bonus qualifying event and to position the flexible belt displays such that at least one of the indicia appearing on the flexible belt displays convey a game outcome.

2. The gaming apparatus of claim 1, wherein the flexible belt displays are moved such that they appear to be continuous.

3. The gaming apparatus of claim 1, wherein the flexible belt displays provide the illusion of a single belt extending around the central display device.

4. The gaming apparatus of claim 1, wherein the indicia indicating the game outcome is indicated by illuminating at least a portion of the flexible belt display.

5. The gaming apparatus of claim 1, wherein the flexible belt displays rotate about a vertical axis.

6. A method of gaming, not necessarily in the order shown comprising:
- (A) allowing a plurality of players to play games on a plurality of gaming devices, each gaming device positioned around a central display device comprising a plurality of flexible belt displays, wherein each flexible belt display is aligned with a gaming device, wherein there is a gap between each flexible belt display, the central display device comprising a plurality of false rollers positioned adjacent to the gap between adjacent flexible displays, wherein the gap is at least partially obscured;
- (B) determining if a bonus qualifying event has occurred on at least one of the gaming devices;
- (C) if the bonus qualifying event has occurred, moving a plurality of flexible belt displays and rotating one or more of the false rollers;
- (D) stopping the flexible belt displays; and
- (E) indicating at least one indicia on at least one of the flexible belt displays as a game outcome.

7. The method of claim 6, further comprising causing the plurality of flexible belt displays appear to be comprise a continuous flexible belt.

8. The method of claim 6, further comprising causing the plurality of flexible belt displays to appear to comprise a single belt.

9. The method of claim 6, wherein the flexible belts are moved about a vertical axis.

10. A gaming apparatus comprising:
- (A) a plurality of gaming devices;
- (B) at least one central display device mounted in association with the gaming devices, the central display device comprising a plurality of flexible belt displays having a plurality of indicia thereon, wherein each flexible belt display is aligned with a gaming device, wherein there is a gap between each flexible belt display, the central display device comprising a plurality of false rollers positioned in the gap between adjacent flexible;
- (C) a controller in communication with gaming devices and the central display device, the controller being configured to:
  - (a) accept wagers from the gaming devices;
  - (b) play a primary game on the gaming devices;
  - (c) detect the occurrence of a bonus qualifying event;
  - (d) if the bonus qualifying event has occurred, move the flexible belt displays;
  - (e) stop the flexible belt displays; and
  - (f) indicate at least one of the indicia as a bonus game outcome.

11. The gaming apparatus of claim 10, wherein a positioning mechanism is coupled to the flexible belt displays and is in communication with the controller.

12. The gaming apparatus of claim 10, wherein the at least one of the flexible belt displays is modular such that the flexible belt display can be slid in and out of the central display device.

13. The gaming apparatus of claim 10, wherein the flexible belt displays appear to be continuous.

14. The gaming apparatus of claim 10, wherein the flexible belt display has a first end and a second end, the first end being wound on a first reel and the second end being wound on a second reel.

15. The gaming apparatus of claim 10, wherein a first actuator is coupled to the first reel and a second actuator is coupled to the second reel.

16. A gaming apparatus comprising:
- (A) primary gaming device means for allowing a plurality of players to play a plurality of primary games;
- (B) bonus gaming device means for allowing at least one of the players to play a bonus game, the bonus gaming device means including a plurality of flexible belt display means having a plurality of indicia displayed thereon and a plurality of false roller means configured to hide a transition between adjacent flexible belt display means; and
- (C) controller means for controlling the operation of the primary gaming device means and the bonus gaming device means, the controller means in communication with the primary gaming device means and the bonus gaming device means, the controller means being operable to determine a game outcome to indicate at least one of the indicia on at least one of the flexible belt displays as the game outcome.

17. The gaming apparatus of claim 16, wherein the plurality of flexible belt displays are moved such that they appear to be continuous.

18. The gaming apparatus of claim 16 wherein the flexible belt display means provide an illusion that they comprise a single belt.

19. The gaming apparatus of claim 16, wherein the flexible belt displays move about a vertical axis.

* * * * *